(12) United States Patent
Ikeda et al.

(10) Patent No.: US 8,329,818 B2
(45) Date of Patent: *Dec. 11, 2012

(54) MODIFIED ETHYLENE-VINYL ALCOHOL COPOLYMER AND METHOD FOR THE PRODUCTION THEREOF

(75) Inventors: Kaoru Ikeda, Okayama (JP); Shinji Tai, Okayama (JP); Kouta Isoyama, Okayama (JP); Tomoyuki Watanabe, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 25 days.

This patent is subject to a terminal disclaimer.

(21) Appl. No.: 12/776,598

(22) Filed: May 10, 2010

(65) Prior Publication Data

US 2010/0280178 A1 Nov. 4, 2010

Related U.S. Application Data

(62) Division of application No. 10/477,710, filed as application No. PCT/JP02/04607 on May 13, 2002, now Pat. No. 7,811,646.

(30) Foreign Application Priority Data

May 14, 2001 (JP) ................................. 2001-143111
Dec. 5, 2001 (JP) ................................. 2001-371911

(51) Int. Cl.
  *C08F 8/00* (2006.01)
  *C08F 16/06* (2006.01)
  *C08F 18/08* (2006.01)
(52) U.S. Cl. ...... 525/60; 525/61; 525/328.8; 525/330.3; 525/330.6; 525/385
(58) Field of Classification Search ............ 525/60, 525/61, 328.8, 330.3, 330.6, 385
See application file for complete search history.

(56) References Cited

U.S. PATENT DOCUMENTS

| | | | |
|---|---|---|---|
| 1,971,662 A | 8/1934 | Schmidt et al. | |
| 2,434,179 A * | 1/1948 | Sharkey | 525/60 |
| 3,025,267 A | 3/1962 | Calfee | |
| 3,025,268 A | 3/1962 | Des Deex | |
| 3,042,666 A | 7/1962 | Gentles | |
| 3,052,652 A | 9/1962 | Halpern | |
| 3,106,543 A | 10/1963 | Milne | |
| 3,707,567 A | 12/1972 | Wingler, et al. | |
| 3,779,967 A * | 12/1973 | Camp | 252/8.61 |
| 3,842,147 A | 10/1974 | Tomatu et al. | |
| 4,576,988 A | 3/1986 | Tanaka et al. | |
| 4,735,986 A | 4/1988 | Iacoviello | |
| 4,746,700 A | 5/1988 | Takida | |
| 5,385,974 A * | 1/1995 | Ohmae et al. | 525/58 |
| 5,460,760 A | 10/1995 | Tsai et al. | |
| 5,846,620 A | 12/1998 | Compton | |
| 6,451,967 B1 * | 9/2002 | Ninomiya et al. | 528/503 |
| 6,533,964 B1 * | 3/2003 | Hata et al. | 252/511 |
| 7,534,829 B2 * | 5/2009 | Tai et al. | 524/503 |
| 7,600,546 B2 | 10/2009 | Fujino et al. | |
| 2002/0176953 A1 * | 11/2002 | Tsai et al. | 428/35.4 |
| 2004/0089388 A1 | 5/2004 | Fujino et al. | |
| 2005/0147778 A1 | 7/2005 | Tai et al. | |

FOREIGN PATENT DOCUMENTS

| | | |
|---|---|---|
| CN | 11 44502 | 3/1997 |
| CN | 1144502 | 3/1997 |
| DE | 199 25 133 A1 | 12/2000 |
| DE | 19925133 * | 12/2000 |
| EP | 0 585 929 A2 | 3/1994 |
| EP | 1 090 932 | 4/2001 |
| EP | 1 403 289 | 9/2004 |
| FR | 1 481 785 | 5/1967 |
| GB | 864 097 | 3/1961 |
| GB | 958893 | 5/1964 |
| JP | 50-12186 | 6/1973 |
| JP | 49-16279 | 4/1974 |
| JP | 53-35993 | 9/1978 |
| JP | 60-144304 | 7/1985 |
| JP | 60-197704 | 10/1985 |
| JP | 63-8448 * | 1/1988 |
| JP | 30227307 | 10/1991 |
| JP | 05-320330 | 12/1993 |
| JP | 10-338714 | 12/1998 |
| JP | 2000-219738 | 6/2000 |
| JP | 2002-137474 | 5/2002 |
| WO | WO 95/26864 | 10/1995 |
| WO | WO00/56780 | 9/2000 |
| WO | 03/072653 | 9/2003 |

OTHER PUBLICATIONS

"Polyvinyl alcohol—developments," Ed. C. A. Finch, John Wiley & Sons, Ltd., Chichester, England, pp. xix-xx and 239, 1992.
U.S. Appl. No. 12/297,472, filed Oct. 17, 2008, Ikeda, et al.

* cited by examiner

*Primary Examiner* — Roberto Rabago
(74) *Attorney, Agent, or Firm* — Oblon, Spivak, McClelland, Maier & Neustadt, L.L.P.

(57) ABSTRACT

Provided is a modified ethylene-vinyl alcohol copolymer (C) having an ethylen content of 5 to 55 mol %, which contains a specific structural unit (I) in an amount of 0.3 to 40 mol % and may be obtained by reacting an ethylene-vinyl alcohol copolymer (A) with a monofunctional epoxy compound (B) having a molecular weight of not more than 500. This can be produced by a method for producing the modified ethylene-vinyl alcohol copolymer (C) which comprises melting and kneading an ethylene-vinyl alcohol copolymer (A) with a monofunctional epoxy compound (B) in an extruder. The modified ethylene-vinyl alcohol copolymer (C) is superior to a unmodified ethylene-vinyl alcohol copolymer (A) in transparency, stretchability, flexibility and flexing resistance due to the specific structural unit (I) incorporated therein, and thus, can be used as a barrier material in various applications requiring the above performance capabilities.

23 Claims, 10 Drawing Sheets

Parison body side

Parison body side

MODIFIED ETHYLENE-VINYL ALCOHOL COPOLYMER AND METHOD FOR THE PRODUCTION THEREOF

TECHNICAL FIELD

The present invention relates to a modified ethylene-vinyl alcohol copolymer which superior in barrier property, transparency, stretchability, flexibility and flexing resistance, and to a method for the production thereof.

BACKGROUND ART

An ethylene-vinyl alcohol copolymer, which henceforth may be abbreviated as EVOH, is superior in transparency and gas barrier property, but it has defect of being poor in stretchability, flexibility and flexing resistance. Known is a method of blending a flexible resin such as an ethylene-vinyl acetate copolymer and an ethylene-propylene copolymer to an EVOH to improve the defect. However, this method has a defect that transparency deteriorates greatly.

In addition, known is a melt-molding material which is superior in stress cracking resistance, polar solvent resistance and water resistance and has both good barrier properties to gas such as oxygen and superior mold abilities, especially stretchability, which comprises a silicon-containing EVOH having an ethylene content of 25-60 mol %, a degree of saponification of 95 mol % or more and a silicon content of 0.0005-0.2 mol % (see JP-A-60-144304).

JP-A-50-12186 discloses a method for producing a modified EVOH with an improved mold-workability, the method being characterized by reacting 0.01-0.8 parts by weight of polyfunctional epoxy compound with 100 parts by weight of EVOH having an ethylene content of 20-90 mol % and a degree of saponification of 95% or more.

However, in the conventional technology mentioned above, none of the stretchability, flexibility and flexing resistance which EVOH has is necessarily sufficient. Furthermore, the stretchability, flexibility and flexing resistance of EVOH and the transparency of EVOH are not satisfied at the same time.

In JP-A-50-12186, an improvement in neck-in (a phenomenon that a product width becomes narrower than die slit width) which occurs when an EVOH is shaped into a film through a T-die is disclosed as an improvement in mold-workability. However, there is no description about the improvement in stretchability, flexibility and flexing resistance, which is the object of the present invention. In addition, no effects of improving in stretchability, flexibility and flexing resistance are not obtained with the EVOH described in the above-cited publication, which was reacted with a specific amount of polyfunctional epoxy compound. Furthermore, in the case of using a polyfunctional epoxy compound, it is difficult to produce an EVOH whose amount of modification with an epoxy compound is within the specific range specified in the present invention.

An object of the present invention is to provide a modified ethylene-vinyl alcohol copolymer which is superior in barrier property, transparency, stretchability, flexibility and flexing resistance and a barrier material comprising the same. In addition, the invention provides a method for producing such a modified ethylene-vinyl alcohol copolymer.

DISCLOSURE OF THE INVENTION

The above-mentioned problem is solved by providing a modified ethylene-vinyl alcohol copolymer (C) having an ethylene content of 5-55 mol % and containing 0.3-40 mol % of the following structural unit (I):

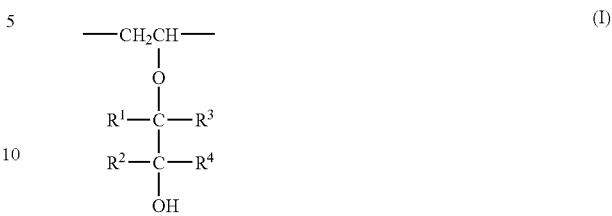

wherein $R^1$, $R^2$, $R^3$ and $R^4$ denote a hydrogen atom, an aliphatic hydrocarbon group having 1-10 carbon atoms, an alicyclic hydrocarbon group having 3-10 carbon atoms or an aromatic hydrocarbon group having 6-10 carbon atoms; $R^1$, $R^2$, $R^3$ and $R^4$ may be the same group or may differ; $R^3$ and $R^4$ may be combined together; and $R^1$, $R^2$, $R^3$ and $R^4$ may have a hydroxyl group, a carboxyl group or a halogen atom.

In a preferable embodiment, provided is a modified ethylene-vinyl alcohol copolymer (C) wherein both $R^1$ and $R^2$ are hydrogen atoms. In a more preferable embodiment, provided is a modified ethylene-vinyl alcohol copolymer (C) wherein one of said $R^3$ and $R^4$ is an aliphatic hydrocarbon group having 1-10 carbon atoms and the other is a hydrogen atom. In another more preferable embodiment, provided is a modified ethylene-vinyl alcohol copolymer (C) wherein one of said $R^3$ and $R^4$ is a substituent represented by $(CH_2)_iOH$, wherein i is an integer of 1-8, and the other is a hydrogen atom.

In a preferable embodiment, provided is a modified ethylene-vinyl alcohol copolymer (C) wherein the copolymer contains 0.1-20 μmol/g of an ion of a metal which belongs to any of Groups 3-12 of the periodic table. In a more preferable embodiment, provided is a modified ethylene-vinyl alcohol copolymer (C) containing a sulfonic acid ion. In a more preferable embodiment, provided is a modified ethylene-vinyl alcohol copolymer (C) wherein the content of alkali metal ion is 1 to 50 times (in molar ratio) the content of the sulfonic acid ion.

In a preferable embodiment, provided is a modified ethylene-vinyl alcohol copolymer (C) wherein the copolymer has an oxygen transmission rate at 20° C. and 65% RH of not more than 100 cc·20 μm/m²·day·atm. In a preferable embodiment, provided is a modified ethylene-vinyl alcohol copolymer (C) wherein the copolymer has a carbon dioxide gas transmission rate at 20° C. and 65% RH of not more than 500 cc·20 μm/m²·day·atm. In a preferable embodiment, provided is a modified ethylene-vinyl alcohol copolymer (C) which has a Young's modulus in a tensile strength/elongation measurement at 23° C. and 50% RH of not more than 140 kgf/mm². Moreover, in a preferable embodiment, provided is a modified ethylene-vinyl alcohol copolymer (C) which has, in a tensile strength/elongation measurement at 23° C. and 50% RH, a tensile strength at yield of 0.5-7 kgf/mm² and a tensile elongation at break of not less than 150%.

In addition, the problem that the present invention intends to solve can be achieved also by providing a method for producing a modified ethylene-vinyl alcohol copolymer (C) comprising reacting an ethylene vinyl alcohol copolymer (A) with a monofunctional epoxy compound (B) having a molecular weight of not more than 500.

In a preferable embodiment, provided is a method for producing a modified ethylene-vinyl alcohol copolymer (C) wherein the method comprises reacting 100 parts by weight of the ethylene-vinyl alcohol copolymer (A) with 1-50 parts by weight of the monofunctional epoxy compound (B).

In a preferable embodiment, provided is a method for producing a modified ethylene-vinyl alcohol copolymer (C) wherein the ethylene-vinyl alcohol copolymer (A) has an ethylene content of 5-55 mol % and a degree of saponification of not less than 90%.

In a preferable embodiment, provided is a method for producing a modified ethylene-vinyl alcohol copolymer (C) wherein the ethylene-vinyl alcohol copolymer (A) has an alkali metal salt content of not more than 50 ppm in terms of metal element. In addition, in a preferable embodiment, provided is a method for producing a modified ethylene-vinyl alcohol copolymer (C) wherein the ethylene-vinyl alcohol copolymer (A) has an alkaline earth metal salt content of not more than 20 ppm in terms of metal element.

In a preferable embodiment, provided is a method for producing a modified ethylene-vinyl alcohol copolymer (C) wherein the monofunctional epoxy compound (B) is an epoxy compound having 2-8 carbon atoms.

In a preferable embodiment, provided is a method for producing a modified ethylene-vinyl alcohol copolymer (C) wherein the reaction between the ethylene-vinyl alcohol copolymer (A) and the monofunctional epoxy compound (B) is carried out in an extruder. In a more preferable embodiment, provided is a method for producing a modified ethylene-vinyl alcohol copolymer (C) wherein the monofunctional epoxy compound (B) is added to the ethylene-vinyl alcohol copolymer (A) in a molten state in the extruder.

In a preferable embodiment, provided is a method for producing a modified ethylene-vinyl alcohol copolymer (C) wherein the ethylene-vinyl alcohol copolymer (A) and the monofunctional epoxy compound (B) are melt kneaded in the extruder in the presence of a catalyst (D) containing an ion of a metal which belongs to any of Groups 3-12 of the periodic table.

In a preferable embodiment, provided is a method for producing a modified ethylene-vinyl alcohol copolymer (C) wherein the catalyst (D) contains a zinc ion. In preferable embodiment, provided is a method for producing a modified ethylene-vinyl alcohol copolymer (C) wherein the catalyst (D) contains a sulfonic acid ion. In a preferable embodiment, provided is a method for producing a modified ethylene-vinyl alcohol copolymer (C) wherein 0.1-20 μmol/g, in terms of molar number of metal ion based on the weight of the ethylene-vinyl alcohol copolymer (A), of the catalyst (D) is caused to be present. In addition, in a preferable embodiment, provided is a method for producing a modified ethylene-vinyl alcohol copolymer (C) wherein a mixture of the monofunctional epoxy compound (B) and the catalyst (D) is added to the ethylene-vinyl alcohol copolymer (A) in a molten state.

In a preferable embodiment, provided is a method for producing a modified ethylene-vinyl alcohol copolymer (C) wherein the ethylene-vinyl alcohol copolymer (A) and the monofunctional epoxy compound (B) are melt kneaded in the presence of the catalyst (D) and, following an addition of a catalyst deactivator (E), the melt kneading is further carried out. In a more preferable embodiment, provided is a method for producing a modified ethylene-vinyl alcohol copolymer (C) wherein the catalyst deactivator (E) is a chelating agent. In a preferable embodiment, provided is a method for producing a modified ethylene-vinyl alcohol copolymer (C) wherein the ratio (E/D) of the molar number of the catalyst deactivator (E) to the molar number of the metal ion contained in the catalyst (D) is 0.2-10. In addition, in a preferable embodiment, provided is a method for producing a modified ethylene-vinyl alcohol copolymer (C) wherein the ethylene-vinyl alcohol copolymer (A) and the monofunctional epoxy compound (B) are melt kneaded in the presence of the catalyst (D) and, following a removal of unreacted monofunctional epoxy compound (B), the catalyst deactivator (E) is added.

In a preferable embodiment, provided is a method for producing a modified ethylene-vinyl alcohol copolymer (C) wherein the modified ethylene-vinyl alcohol copolymer (C) is a modified ethylene-vinyl alcohol copolymer having an ethylene content of 5-55 mol % and containing 0.3-40 mol % of the following structural unit (I):

wherein $R^1$, $R^2$, $R^3$ and $R^4$ denote a hydrogen atom, an aliphatic hydrocarbon group having 1-10 carbon atoms, an alicyclic hydrocarbon group having 3-10 carbon atoms or an aromatic hydrocarbon group having 6-10 carbon atoms; $R^1$, $R^2$, $R^3$ and $R^4$ may be the same group or may differ; $R^3$ and $R^4$ may be combined together; and $R^1$, $R^2$, $R^3$ and $R^4$ may have a hydroxyl group, a carboxyl group or a halogen atom.

In a preferable embodiment, the modified ethylene-vinyl alcohol copolymer (C) is used as a barrier material.

In preferable embodiment, the modified ethylene-vinyl alcohol copolymer (C) is used in the form of a composition comprising it.

In preferable embodiment, the modified ethylene-vinyl alcohol copolymer (C) is used in the form of an extrusion molded article, a film, a sheet, a drawn film, a thermoformed article, a heat shrinkable film, wallpaper, a decoration board, a pipe, a hose, a profile extruded article, an extrusion blow molded article or a flexible packaging material.

In a preferable embodiment, provided is a multilayer structure in which the modified ethylene-vinyl alcohol copolymer (C) and a resin other than the modified ethylene-vinyl alcohol copolymer (C) are laminated. In a more preferable embodiment, provided is a multilayer structure wherein the resin other than the modified ethylene-vinyl alcohol copolymer (C) is at least one selected from the group consisting of polyolefin, polyamide, polyester, polystyrene, polyurethane, polyvinylidene chloride, polyvinyl chloride, polyacrylonitrile and polycarbonate. In another more preferable embodiment, provided is a multilayer structure wherein the resin other than the modified ethylene-vinyl alcohol copolymer (C) is an elastomer.

In a preferable embodiment, provided is a coextruded film or coextruded sheet comprising the multilayer structure.

In a preferable embodiment, provided is a multilayer pipe comprising the multilayer structure. In a more preferable embodiment, provided is a fuel pipe or pipe for hot water circulation comprising the multilayer pipe.

In a preferable embodiment, provided is a multilayer hose comprising the multilayer structure. In a more preferable embodiment, provided is a fuel hose comprising the multilayer hose.

In a preferable embodiment, provided is a coextrusion blow molded container comprising of the above multilayer structure.

In a preferable embodiment, provided is a coinjection blow molded container comprising the multilayer structure. In a more preferable embodiment, provided is a coinjection blow molded container wherein the resin other than the modified ethylene-vinyl alcohol copolymer (C) is at least one selected from the group consisting of polyester, polypropylene and polyethylene. In addition, in another more preferable embodiment, provided is a coinjection blow molded container wherein layers comprising the resin other than the modified ethylene-vinyl alcohol copolymer (C) are disposed in direct contact with both surfaces of a layer comprising the modified ethylene-vinyl alcohol copolymer (C).

In the following, the present invention is described in detail.

The modified EVOH (C) of the present invention is a modified ethylene-vinyl alcohol copolymer (C) having an ethylene content of 5-55 mol % and containing 0.3-40 mol % of the following structural unit (I):

wherein $R^1$, $R^2$, $R^3$ and $R^4$ denote a hydrogen atom, an aliphatic hydrocarbon group having 1-10 carbon atoms (e.g., an alkyl group and an alkenyl group), an alicyclic hydrocarbon group having 3-10 carbon atoms (e.g., a cycloalkyl group and a cycloalkenyl group) and an aromatic hydrocarbon group having 6-10 carbon atoms (e.g., a phenyl group); $R^1$, $R^2$, $R^3$ and $R^4$ may be the same group or may differ; $R^3$ and $R^4$ may be combined together, provided that the case where both $R^3$ and $R^4$ are hydrogen atoms is excluded; and $R^1$, $R^2$, $R^3$ and $R^4$ may have other groups, for example, a hydroxyl group, a carboxyl group and a halogen atom.

In a more preferable embodiment, both $R^1$ and $R^2$ are hydrogen atoms. In a more preferable embodiment, both $R^1$ and $R^2$ are hydrogen atoms and one of $R^3$ and $R^4$ is an aliphatic hydrocarbon group having 1-10 carbon atoms and the other is a hydrogen atom. Preferably, the aliphatic hydrocarbon group is an alkyl group or an alkenyl group. From a viewpoint of attaching great importance to the gas barrier properties required when the modified EVOH (C) is used as a barrier material, it is more preferable that one of $R^3$ and $R^4$ be a methyl group or an ethyl group and the other be a hydrogen atom.

In addition, from a viewpoint of the gas barrier properties required when the modified EVOH (C) is used as a barrier material, it is preferable also that one of $R^3$ and $R^4$ be a substituent represented by $(CH_2)_i OH$, wherein i is an integer of 1-8, and the other be a hydrogen atom. When much importance is attached to the gas barrier properties as a barrier material, in the substituent represented by $(CH_2)_i OH$, i is preferably an integer of 1-4, more preferably 1 or 2, and still more preferably 1.

The amount of the structure unit (I) contained in the modified EVOH (C) of the present invention must fall within the range of 0.3-40 mol %. The lower limit of the amount of the structure unit (I) is preferably not less than 0.5 mol %, more preferably not less than 1 mol %, and still more preferably not less than 2 mol %. On the other hand, the upper limit of the amount of the structure unit (I) is not more than 35 mol %, more preferably not more than 30 mol %, and still more preferably not more than 25 mol %. A modified EVOH (C) superior simultaneously in gas barrier properties, transparency, stretchability, flexibility and flexing resistance can be obtained when the amount of the structure unit (I) contained therein falls within the range mentioned above.

The ethylene content of the modified EVOH (C) of the present invention is preferably 5-55 mol %. From a viewpoint where the modified EVOH (C) of the present invention becomes superior in stretchability, flexibility and flexing resistance, the lower limit of the ethylene content of the modified EVOH (C) is more preferably not less than 10 mol %, still more preferably not less than 20 mol %, particularly preferably not less than 25 mol %, and more preferably not less than 31 mol %.

On the other hand, from a viewpoint of the gas barrier property of the modified EVOH (C) of the present invention, the upper limit of the ethylene content of the modified EVOH (C) is more preferably not more than 50 mol %, still more preferably not more than 45 mol %. When the ethylene content is less than 5 mol %, the melt moldability may become poor, whereas when it exceeds 55 mol %, the gas barrier properties may be insufficient.

The constituents of the modified EVOH (C) of the present invention other than the structure units (I) and the ethylene units are mainly vinyl alcohol units. The vinyl alcohol units are usually vinyl alcohol units which had not reacted with monofunctional epoxy compounds (B) contained in a starting EVOH (A). Unsaponified vinyl acetate units which may be contained in the EVOH (A) are usually contained in the modified EVOH (C) as they are. Measurements of NMR and melting point showed that the modified EVOH (C) is a random copolymer which contains these constituents. Furthermore, other constituents may also be contained unless the object of the present invention is affected.

A preferable melt flow rate (MFR) (measured at 190° C. under a load of 2160 g) of the modified EVOH (C) of the present invention is 0.1-30 g/10 min, more preferably 0.3-25 g/10 min, and still more preferably 0.5-20 g/10 min. It is noted that when the melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.

The method for producing the modified EVOH (C) is not limited particularly. The method that the present inventors recommend is a method in which the modified EVOH (C) is obtained by reacting an ethylene vinyl alcohol copolymer (A) with a monofunctional epoxy compound (B) having a molecular weight of not more than 500.

In addition, the problem that the present invention intends to solve can be achieved also by providing a method for producing a modified ethylene-vinyl alcohol copolymer (C) comprising reacting an ethylene vinyl alcohol copolymer (A) with a monofunctional epoxy compound (B) having a molecular weight of not more than 500.

As the EVOH (A) for use in the present invention, preferred is one obtained by saponifying an ethylene-vinyl ester copolymer. A typical vinyl ester used in the production of EVOH is vinyl acetate. However, other fatty acid vinyl esters (e.g., vinyl propionate and vinyl pivalate) may also be employed. Unless the object of the present invention is affected, it is also permitted to copolymerize other comonomers, for example, α-olefins such as propylene, butylene, isobutene, 4-methyl-1-pentene, 1-hexene and 1-octene; unsaturated carboxylic acids or esters thereof such as (meth) acrylic acid, methyl(meth)acrylate and ethyl(meth)acrylate; vinylsilane compounds such as vinyltrimethoxysilane; unsaturated sulfonic acids or salts thereof; alkylthiols; and vinylpyrrolidones such as N-vinylpyrrolidone.

When an EVOH resulting from copolymerization using a vinylsilane compound as a comonomer component is used as the EVOH (A), it is preferable that the EVOH contain that compound copolymerized in an amount of 0.0002-0.2 mol %. When the EVOH contains a vinylsilane compound as a comonomer component in an amount within that range, the compatibility in melt viscosity between a substrate resin and the modified EVOH (C) may be improved, thereby enabling to produce homogeneous multilayer coextrusion film articles. In particular, when using a substrate resin with a high melt viscosity, it becomes easy to obtain homogeneous multilayer coextrusion film articles. The vinylsilane compound includes, for example, vinyltrimethoxysilane, vinyltriethoxysilane, vinyltri(β-methoxy-ethoxy)silane and γ-methacryloxypropylmethoxysilane. Above all, preferred are vinyltrimethoxysilane and vinyltriethoxysilane.

The ethylene content of the EVOH (A) for use in the present invention is preferably 5-55 mol %. From a viewpoint where the modified EVOH (C) of the present invention becomes superior in stretchability, flexibility and flexing resistance, the lower limit of the ethylene content of the EVOH (A) is more preferably not less than 10 mol %, still more preferably not less than 20 mol %, particularly preferably not less than 25 mol %, and more preferably not less than 31 mol %. On the other hand, from a viewpoint of the gas barrier property of the modified EVOH (C) of the present invention, the upper limit of the ethylene content of the EVOH (A) is more preferably not more than 50 mol %, still more preferably not more than 45 mol %. When the ethylene content is less than 5 mol %, the melt moldability may become poor, whereas when it exceeds 55 mol %, the gas barrier property may be insufficient.

When the EVOH (A) for use in the invention comprises a mixture of two or more EVOHs of different ethylene contents, an average value calculated from the blend proportions in weight of the EVOHs shall be the ethylene content of the EVOH (A).

The degree of saponification of the vinyl ester moiety in the EVOH (A) for use in the present invention is preferably not less than 90%. The degree of saponification of the vinyl ester moiety is more preferably not less than 95%, still more preferably not less than 98%, and most suitably not less than 99%. A degree of saponification of less than 90% may result in deterioration of gas barrier properties, especially gas barrier properties at high humidity, as well as in an unsatisfactory thermostability which may result in easy formation of gels and pimples in molded articles.

When the EVOH (A) comprises a mixture of two or more EVOHs of different degrees of saponification, an average value calculated from the blend proportions in weight of the EVOHs shall be the degree of saponification of the EVOH (A).

The ethylene content and the degree of saponification of the EVOH (A) can be determined by the nuclear magnetic resonance (NMR).

Furthermore, an EVOH containing a boron compound blended therein may also be employed as the EVOH (A) unless the object of the present invention is affected. The boron compound includes, for example, boric acids, borates, salts of boric acids and boron hydrides. Concretely, the boric acid include orthoboric acid, metaboric acid, tetraboric acid, etc.; the borates include triethyl borate, trimethyl borate, etc.; the salts of boric acids include alkali metal salts and alkaline earth metal salts of various boric acids such as those mentioned above, as well as borax, etc. Of those compounds, preferred is orthoboric acid, which may be referred to as boric acid hereinafter.

When the EVOH containing a boron compound blended therein is employed as the EVOH (A), its boron compound content is preferably 20-2000 ppm and more preferably 50-1000 ppm in terms of boron element. Blending the boron compound in an amount within such ranges can afford an EVOH the torque variation of which is restrained during its melting by heating. However, if the boron compound content is smaller than 20 ppm, such an effect will be reduced, whereas if larger than 2000 ppm, a resulting EVOH will gel easily and it may be of poor moldability.

In addition, an EVOH (A) containing a phosphoric acid compound may be employed as the EVOH (A). This may successfully stabilize the qualities (e.g., coloration) of the resin. The phosphoric acid compound for use in the present invention is not restricted particularly. Various acids, such as phosphoric acid and phosphorous acid, and their salts may be used. The salts of phosphoric acids may be in any form of primary phosphate, secondary phosphate and tertiary phosphate, but primary phosphates are preferred. The cation species is not also specifically restricted. However, alkali metal salts are preferred. Of these salts, sodium dihydrogenphosphate and potassium dihydrogen phosphate are preferable. When an EVOH (A) containing a phosphoric acid compound is used, the content of the phosphoric acid compound is preferably not more than 200 ppm, more preferably 5-100 ppm, and most preferably 5-50 ppm in terms of phosphate radical.

However, when the EVOH (A) and the monofunctional epoxy compound (B) are reacted together in the presence of a catalyst (D) containing an ion of a metal which belongs to any of Groups 3-12 of the periodic table as described later, it is desirable that the content of the phosphoric acid compound be as small as possible because the salts of phosphric acid will deactivate the catalyst. In this case, the content of the phosphoric acid compound in the EVOH (A) is preferably not more than 200 ppm, more preferably not more than 100 ppm, and most preferably not more than 50 ppm in terms of phosphate radical.

Moreover, as described later, the modified EVOH (C) of the present invention is obtained preferably by carrying out a reaction between an EVOH (A) and a monofunctional epoxy compounds (B) having a molecular weight of not more than 500 in an extruder. During the reaction, the EVOH is exposed to a heating condition. If the EVOH (A) contains an excess amount of alkali metal salt and/or alkaline earth metal salt at this time, the resulting modified EVOH (C) may suffer from coloration. In addition, problems such as decrease in viscosity of the modified EVOH (C) may arise, resulting in deterioration of moldability thereof. In addition, when a catalyst (D) is used as described later, it is desirable that the amounts of those salts to be added be as small as possible because they will deactivate the catalyst (D).

In order to avoid the above-mentioned problem, it is preferable that the content of the alkali metal salt contained in the EVOH (A) be not more than 50 ppm in terms of the metal elements. In a more preferable embodiment, the content of the alkali metal salt contained in the EVOH (A) is not more than 30 ppm, more preferably not more than 20 ppm in terms of the metal elements. From the same viewpoint, the content of the alkaline earth metal salt contained in the EVOH (A) is preferably not more than 20 ppm, more preferably not more than 10 ppm, and still more preferably not more than 5 ppm in terms of the metal elements. It is most preferable that substantially no alkaline earth metal salt be contained in the EVOH (A).

In addition, an EVOH containing a heat stabilizer, an antioxidant or the like incorporated therein may be used as the EVOH (A) unless the object of the present invention is affected.

The EVOH (A) for use in the present invention preferably has an intrinsic viscosity of not less than 0.06 L/g. The intrinsic viscosity of the EVOH (A) is more preferably within the range of 0.07-0.2 L/g, still more preferably 0.075-0.15 L/g, and particularly preferably 0.080-0.12 L/g. If the intrinsic viscosity of the EVOH (A) is less than 0.06 L/g, the stretchability, flexibility and flexing resistance may deteriorate. On the other hand, if the intrinsic viscosity of the EVOH (A) exceeds 0.2 L/g, gels and pimples may form easily in a molded article comprising the modified EVOH (C).

A preferable melt flow rate (MFR) (measured at 190° C. under a load of 2160 g) of the EVOH (A) for use in the present invention is 0.1-30 g/10 min, more preferably 0.3-25 g/10 min, and still more preferably 0.5-20 g/10 min. It is noted that when a melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C. Two or more EVOHs of different MFRs may be mixed and used.

The monofunctional epoxy compound (B) having a molecular weight of not more than 500 for use in the present invention must be a monofunctional epoxy compound. In other words, it must be an epoxy compound which has only one epoxy group in its molecule. When a polyfunctional epoxy compound of two or more functionalities is used, the effect of the present invention can not be obtained. It is to be noted that during the production of the monofunctional epoxy compound, a very small amount of polyfunctional epoxy compound may be contained. Unless the effect of the present invention is affected, a monofunctional epoxy compound containing a very small amount of polyfunctional epoxy compound can be used as the monofunctional epoxy compound (B) having a molecular weight of not more than 500 in the present invention.

The monofunctional epoxy compound (B) having a molecular weight of not more than 500 for use in the present invention is not limited particularly. Specifically, compounds represented by the following formulae (III) through (IX) can be used suitably:

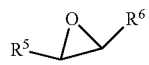 (III)

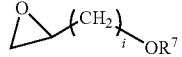 (IV)

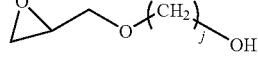 (V)

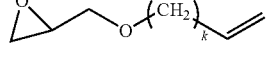 (VI)

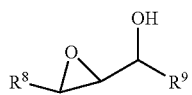 (VII)

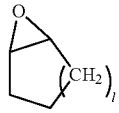 (VIII)

(IX)

wherein $R^5$, $R^6$, $R^7$, $R^8$ and $R^9$ each represent a hydrogen atom, an aliphatic hydrocarbon group (e.g., alkyl group, alkenyl group or the like) having 1-10 carbon atoms, an alicyclic hydrocarbon group (e.g., cycloalkyl group, cycloalkenyl group or the like) having 3-10 carbon atoms, and an aromatic hydrocarbon group having 6-10 carbon atoms (e.g., phenyl group or the like); and i, j, k, l and m each denote an integer of 1-8.

Examples of the monofunctional epoxy compound (B) having a molecular weight of not more than 500 represented by formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 1-phenyl-1,2-epoxypentane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane and 6-phenyl-1,2-epoxyhexane.

Examples of the monofunctional epoxy compound (B) having a molecular weight of not more than 500 represented by the formula (IV) include metyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-3-octyloxypropane, 1,2-epoxy-3-phenoxypropane, 1,2-epoxy-3-benzyloxypropane, 1,2-epoxy-4-methoxybutane, 1,2-epoxy-4-ethoxybutane, 1,2-epoxy-4-propoxybutane, 1,2-epoxy-4-butoxybutane, 1,2-epoxy-4-pentyloxybutane, 1,2-epoxy-4-hexyloxybutane, 1,2-epoxy-4-heptyloxybutane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butyloxyheptane, 1,2-epoxy-8-methoxyheptane, 1,2-epoxy-8-ethoxyheptane, 1,2-epoxy-8-butoxyheptane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol and 10,11-epoxy-1-undecanol.

Examples of the monofunctional epoxy compound (B) having a molecular weight of not more than 500 represented by the formula (V) include ethylene glycol monoglycidyl ether, propanediol monoglycidyl ether, butanediol monoglycidyl ether, heptanediol monoglycidyl ether, hexanediol monoglycidyl ether, heptanediol monoglycidyl ether and octanediol monoglycidyl ether.

Examples of the monofunctional epoxy compound (B) having a molecular weight of not more than 500 represented by the formula (VI) include 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene and 8-(2,3-epoxy)propoxy-1-octene.

Examples of the monofunctional epoxy compound (B) having a molecular weight of not more than 500 represented by the formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol and 1,2-epoxy-3-decanol.

Examples of the monofunctional epoxy compound (B) having a molecular weight of not more than 500 represented by the formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane and 1,2-epoxycyclododecane.

Examples of the monofunctional epoxy compound (B) having a molecular weight of not more than 500 represented by the formula (IX) include 3,4-epoxycyclopentene, 3,4-epoxycyclohexene, 3,4-epoxycycloheptene, 3,4-epoxyycloctene, 3,4-epoxycyclononene, 1,2-epoxycyclodecene, 1,2-epoxycycloundecene and 1,2-epoxycyclododecene.

Epoxy compounds having 2-8 carbon atoms are particularly preferred as the monofunctional epoxy compound (B) having a molecular weight of not more than 500 used for the present invention. The number of carbon atoms of the monofunctional epoxy compound (B) is preferably 2-6, more preferably 2-4 from the viewpoints of easiness of the handling of a compound and reactivity with EVOH (A). Moreover, it is preferable that the monofunctional epoxy compound (B) be a compound represented by the formula (III) or (IV). From the viewpoints of the reactivity with EVOH (A) and the gas barrier properties of a modified EVOH (C) to be obtained, 1,2-epoxybutane, 2,3-epoxybutane, epoxypropane, epoxyethane and glycidol are particularly preferable. Above all, epoxypropane and glycidol are preferable. In the applications in which sanitariness is required, such as food packaging, drink packaging and drug packaging, it is desirable to use 1,2-epoxybutane, 2,3-epoxybutane, epoxypropane and epoxyethane as the epoxy compound (B). Above all, epoxypropane is preferably employed.

A modified EVOH (C) is obtained by reacting the EVOH (A) and the monofunctional epoxy compound (B). A preferable mixing ratio of the EVOH (A) and the monofunctional epoxy compound (B) is 1-50 parts by weight of (B) to 100 parts by weight of (A), more preferably 2-40 parts by weight of (B) to 100 parts by weight of (A), and particularly preferably 5-35 parts by weight of (B) to 100 parts by weight of (A).

The method for producing the modified EVOH (C) by reacting the EVOH (A) with the monofunctional epoxy compound (B) having a molecular weight of not more than 500 is not limited particularly; examples of preferable methods include a production method in which the EVOH (A) and the monofunctional epoxy compound (B) are reacted together in a solution, and a production method in which the EVOH (A) and the monofunctional epoxy compound (B) are reacted together within an extruder.

In the production method using a solution reaction, the modified EVOH (C) is obtained by reacting the monofunctional epoxy compound (B) with a solution of the EVOH (A) in the presence of an acid catalyst or an alkali catalyst. In addition, the modified EVOH (C) can be produced also by dissolving the EVOH (A) and the monofunctional epoxy compound (B) in a reaction solvent and then performing a heat treatment. As the reaction solvent, preferable are polar aprotic solvents, which are good solvents of the EVOH (A), such as dimethylsulfoxide, dimethylformamide, dimethylacetamide and N-methylpyrrolidone.

The reaction catalyst includes acid catalysts such as p-toluenesulfonic acid, methanesulfonic acid, trifluoromethane sulfonic acid, sulfuric acid and boron trifluoride and alkali catalysts such as sodium hydroxide, potassium hydroxide, lithium hydroxide and sodium methoxide. Among these, acid catalysts are preferably employed. The amount of the catalyst is appropriately 0.0001-10 parts by weight to 100 parts by weight of the EVOH (A). The reaction temperature is appropriately within the range of room temperature to 150° C.

In the production method in which the EVOH (A) and the monofunctional epoxy compound (B) are reacted together within an extruder, there are no particular limitations for extruder to use, but it is preferable to react the EVOH (A) and the monofunctional epoxy compound (B) at a temperature of about 180° C.-300° C. by use of a single screw extruder, twin screw extruder or a multi-screw extruder having two or more screws. As described below, during the reaction performed within an extruder, it is preferable to employ a relatively low melting temperature in the case of causing a catalyst (D) to be present. On the other hand, when no catalyst (D) is employed, a desirable temperature is about 200° C.-300° C.

When a twin screw extruder or a multi-screw extruder having two or more screws is used, modification of the screw structure easily increases the pressure within the reaction section and makes it possible to perform a reaction between the EVOH (A) and the monofunctional epoxy compound (B) efficiently. In the case of using a single screw extruder, it is possible to increase the pressure within the reaction section by connecting two or more extruders and disposing a valve in a resin passageway between the extruders. Alternatively, the production may be carried out by connecting two or more twin screw extruders or multi-screw extruders having two or more screws.

In comparison of the production method by a solution reaction to that using a reaction within an extruder, the method using a solution reaction requires a solvent to dissolve the EVOH (A) and also requires recovery and removal of the solvent after the reaction. Therefore, such a method is to have a complicated process. In order to enhance the reactivity between the EVOH (A) and the monofunctional epoxy compound (B), it is desirable to hold the reaction system under heat and/or pressure conditions. In comparison to the solution reaction, it is easy, in the reaction within an extruder, to maintain the heat and/or pressure conditions of the reaction system. From such a viewpoint, the reaction within an extruder is of great merit.

Furthermore, when performing the reaction between the EVOH (A) and the monofunctional epoxy compound (B) by a solution reaction, it isn't necessarily easy to control the reaction and, therefore, the reaction may proceed excessively. In other words, although the modified EVOH (C) having the structural unit (I) is obtained as a result of the reaction between the EVOH (A) and the monofunctional epoxy compound (B), a product having a structural unit different than that specified in the present invention may be obtained through a further reaction of a hydroxyl group contained in the structural unit (I) with a monofunctional epoxy compound (B).

Specifically, when the monofunctional epoxy compound (B) is ethylene oxide, the above-mentioned excessive proceeding of the reaction will result in the formation of an EVOH having a structural unit (II) shown below:

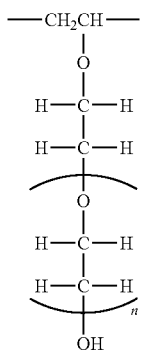

wherein n denotes a natural number of 1 or more.

The present inventors studied and made it clear that the increase in the ratio of the above-mentioned structural unit (II) contained, which unit is different from the structural unit (I) specified in the present invention, results in the reduction in the gas barrier property of the modified EVOH (C) to be obtained. Furthermore, they found that the occurrence of such a side reaction could be restrained for effectively when the reaction between the EVOH (A) and the monofunctional epoxy compound (B) is performed in an extruder. From such a viewpoint, preferred is the method in which the modified EVOH (C) is produced by performing the reaction between the EVOH (A) and the monofunctional epoxy compound (B) in an extruder.

In addition, in the method using a solution reaction, heating the reaction system may cause the vaporization of the monofunctional epoxy compound (B) to the outside of the system because the monofunctional epoxy compound (B) having a molecular weight of not more than 500 used in the present invention does not always have a high boiling point. However, it is possible to inhibit the vaporization of the monofunctional epoxy compound (B) to the outside of the system by reacting the EVOH (A) with the monofunctional epoxy compound (B) in an extruder. In particular, when the monofunctional epoxy compound (B) is supplied under pressure during its addition to the extruder, it is possible to increase the reactivity between the EVOH (A) and the monofunctional epoxy compound (B) and, at the same time, to inhibit remarkably the vaporization of the monofunctional epoxy compound (B) to the outside of the system.

The method of mixing the EVOH (A) and the monofunctional epoxy compound (B) during the reaction in an extruder is not limited particularly. Preferable examples include a method in which the monofunctional epoxy compound (B) is spraied to the EVOH (A) before being fed to the extruder and a method in which the EVOH (A) is fed to the extruder and is brought into contact with the monofunctional epoxy compound (B) in the extruder. Among these, preferred is the method in which the EVOH (A) is fed into an extruder and then it is brought into contact with the monofunctional epoxy compound (B) within the extruder from a viewpoint that the vaporization to the monofunctional epoxy compound (B) to the outside of the system can be inhibited. In addition, the position where the monofunctional epoxy compound (B) is added to the extruder is optional. However, from the viewpoint of reactivity between the EVOH (A) with the epoxy compound (B), it is desirable to add the monofunctional epoxy compound (B) to molten EVOH (A).

A production method using a reaction between the EVOH (A) and the monofunctional epoxy compound (B) within an extruder which is recommended by the present inventor comprises (1) a step of melting the EVOH (A), (2) a step of adding the monofunctional epoxy compound (B) and (3) a step of removing unreacted monofunctional epoxy compound (B) through a vent or the like. From the viewpoint of performing a reaction smoothly, it is preferable to remove moisture and oxygen from the system. For this purpose, moisture and oxygen may be removed through a vent or the like before the addition of the monofunctional epoxy compound (B) to the extruder.

In addition, in the step of adding the monofunctional epoxy compound (B), it is preferable to supply the monofunctional epoxy compound (B) under pressure as described previously. At this time, if the pressure is not high enough, the reactivity may decrease and problems such as variation in discharge rate will arise. A necessary pressure varies greatly depending upon the boiling point of the monofunctional epoxy compound (B) and the extrusion temperature, but it is, in usual, preferably within the range of 0.5-30 MPa and more preferably within the range of 1-20 MPa.

In the production method of the present invention, it is preferable to melt-knead the EVOH (A) and the monofunctional epoxy compound (B) in an extruder in the presence of a catalyst (D) containing an ion of a metal which belongs to Groups 3-12 of the periodic table. To cause the catalyst (D) containing an ion of a metal which belongs to Groups 3-12 of the periodic table to be present makes it possible to react the EVOH (A) with the monofunctional epoxy compound (B) efficiently even if the melt-kneading is carried out at a lower temperature. In other words, it is possible to obtain a highly modified EVOH (C) easily through a melt-kneading at a relatively low temperature. The EVOH is a resin the melt stability of which at high temperatures is not very good. Therefore, from the viewpoint that the degradation of a resin can be prevented, it is desirable that melt kneading can be carried out at such a low temperature. When the EVOH (A) and the monofunctional epoxy compound (B) are reacted together without using the catalyst (D), a resulting modified EVOH (C) tends to have an MFR lower than that of the starting EVOH (A). However, when using the catalyst (D), the MFR does not change very much.

The catalyst (D) used in the present invention contains an ion of a metal which belongs to Groups 3-12 of the periodic table. What is the most important for the metal ion used for the catalyst (D) is to have a moderate Lewis acidity. From this standpoint, ions of metals which belong to Groups 3-12 of the periodic table are used. Among these, ions of metals which belong to Group 3 or 12 of the periodic table are preferable due to their moderate Lewis acidities; ions of zinc, yttrium and gadolinium are more preferable. Above all, a catalyst (D) containing a zinc ion is most suitable because it has an extremely high catalytic activity and a modified EVOH (C) superior in thermostability would be obtained.

The ion of a metal which belongs to Groups 3-12 of the periodic table is added preferably in an amount of 0.1-20 μmol/g, in terms of molar number of metal ion based on the weight of the EVOH (A). When too much ion is added, the EVOH may gelate during its melt-kneading. Therefore, the amount of the ion is more preferably not more than 10 μmol/g. On the other hand, when a too small amount of ion is added, no satisfactory effect of the addition of the catalyst (D) may be obtained. Therefore, the amount of the ion is more preferably not less than 0.5 μmol/g. It is to be noted that an appropriate amount of the ion of a metal which belongs to Groups 3-12 of the periodic table may vary depending upon the kind of the metal to be employed and the kind of the anion described later and, therefore, should be adjusted appropriately in view of these factors.

The anion species in the catalyst (D) containing an ion of a metal which belongs to Groups 3-12 of the periodic table is not limited particularly, but it is desirable for the catalyst to contain a monovalent anion the conjugate acid of which is a strong acid as strong as or stronger than sulfuric acid. This is because an anion the conjugate acid of which is a strong acid is usually hard to react with a monofunctional epoxy compound (B) because of its low nucleophilicity and the anion can prevent the loss of catalytic activity caused by consumption of anionic species through a nucleophilic reaction. In addition, that is also because when having such an anion as a counter ion, the catalyst (D) has an improved Lewis acidity and, therefore, its catalytic activity is improved.

Examples of the monovalent anion the conjugate acid of which is a strong acid as strong as or stronger than sulfuric acid include sulfonate ions such as methanesulfonate ion, ethanesulfonate ion, trifluoromethanesulfonate ion, benzenesulfonate ion and toluenesulfonate ion; halide ion such as chloride ion, bromide ion and iodide ion; perchlorate ion; anions having four or more fluorine atoms such as tetrafluoroborate ion ($BF_4^-$), hexafluorophosphate ion ($PF_6^-$), hexafluoroarsinate ion ($AsF_6^-$) and hexafluoroantimonate ion; ions of tetraphenyl borate derivatives such as tetrakis (pentafluorophenyl)borate ion; and ions of carborane derivatives as tetrakis (3,5-bis (trifluoromethyl)phenyl)borate, bis (undecahydride-7,8-dicarbaundecaborate)cobalt (III) ion, bis (undecahydride-7,8-dicarbaundecaborate)iron (III) ion.

When using a catalyst (D) including an anionic species such as, for example, hexafluorophosphate or tetrafluoroborate of the anionic species mentioned above, the anion species itself is thermostable and has a very low nucleophilicity. However, the anion species may react with a hydroxy group in an EVOH to form hydrogen fluoride, giving a bad influence to the thermostability of a resin. In addition, carborane derivative ions of cobalt or the like do not react with EVOH and their anionic species themselves are thermostable. However, they are very expensive.

A sulfonate ion is preferable as the anionic species of the catalyst (D) because it does not react with an EVOH, it is thermostable as an anionic species itself and also it is appropriately priced. Examples of suitable sulfonic acid ions include methanesulfonate ion, trifluoromethanesulfonate ion, benzenesulfonate ion and toluenesulfonate ion. Trifluoromethanesulfonate ion is most suitable.

The following formula (X) shows a presumed mechanism of the reaction between the EVOH (A) and the monofunctional epoxy compound (B) when a zinc ion and a trifluoromethanesulfonate ion are used, respectively, as the cationic species and the anionic species of the catalyst (D).

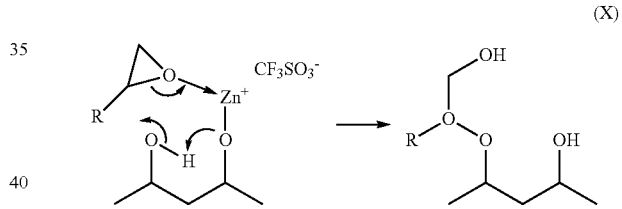

(X)

Briefly speaking, it is presumed that the oxygen atom of the epoxy group of the monofunctional epoxy compound (B) coordinates to the zinc ion bonding to the hydroxyl group of the EVOH in the form of a metal alkoxide and, via a 6 membered-ring transition state, the epoxy ring opens. Because the conjugate acid of a trifluoromethanesulfonate ion, which is the counter ion of a zinc ion in the transition state, is a strong acid, the Lewis acidity of the zinc ion becomes high and the catalytic activity improves. On the other hand, because the trifluoromethanesulfonate ion itself which is present as a counter ion never reacts with a hydroxyl group of the EVOH or an epoxy group of the monofunctional epoxy compound (B) and is thermostable. Therefore, the ring-opening reaction proceeds smoothly without causing any side reaction.

As described above, it is preferable that the catalyst (D) used in the present invention contain a monovalent anion the conjugate acid of which is a strong acid as strong as or stronger than sulfuric acid, but it is not necessary that all the anionic species in the catalyst (D) be the same anionic species. It is rather desirable that the catalyst (D) also contain an anion the conjugate acid of which is a weak acid. If the reaction mechanism represented by the formula (X) is true, when an EVOH reacts with a catalyst (D) to form a metal alkoxide, one of the anions is liberated as a conjugate acid into the system. If this is a strong acid, it may react with a monofunctional epoxy compound (B) and at the same time it may give a bad influence to the melt stability of the EVOH.

Examples of the anion the conjugate ion of which is a weak acid include alkyl anion, aryl anion, alkoxide, aryloxy anion, carboxylate and acetylacetonato and its derivative. Above all, alkoxide, carboxylate and acetylacetonato and its derivative are suitably employed.

It is desirable that the molar number of the anion the conjugate acid of which is as strong as or stronger than sulfuric acid be 0.2-1.5 times the molar number of the metal ions in the catalyst (D). When the above-mentioned molar ratio is less than 0.2 times, the catalytic activity may be insufficient. The molar ratio is more preferably not less than 0.3 times, and still more preferably not less than 0.4 times. On the other hand, when the above-mentioned molar ratio exceeds 1.5 times, the EVOH may gelate. The molar ratio is more preferably not more than 1.2 times. The molar ratio is most preferably 1 time. In addition, when the EVOH (A), which is a raw material, contains an alkali metal salt such as sodium acetate, the molar number of the anion the conjugate acid of which is as strong as or stronger than sulfuric acid may be increased by an amount corresponding to the anion neutralized and consumed by the salt.

The method for preparing the catalyst (D) is not limited particularly, but an example of a preferable method is a method in which a compound of a metal which belongs to Groups 3-12 of the periodic table is dissolved or dispersed in a solvent and then a strong acid (e.g., sulfonic acid) the conjugate acid of which is as strong as or stronger than sulfuric acid is added to the resulting solution or suspension. Examples of the compound of a metal which belongs to Group 3-12 of the periodic table to be used as a raw material include alkyl metal, aryl metal, metal alkoxide, metal aryloxide, metal carboxylate and metal acetylacetonato. When the strong acid is added to the solution or suspension of the compound of a metal which belongs to Group 3-12 of the periodic table, it is preferable that the strong acid be added in small portions. The thus obtained solution containing the catalyst (D) may be introduced directly to an extruder.

As the solvent in which the compound of the metal which belongs to Group 3-12 of the periodic table is dissolved or dispersed, organic solvents, especially ether solvents, are preferable. This is because these are hard to react even at a temperature in the extruder and at the same time they have a good solubility of the metal compound. Examples of the ether solvents include dimethyl ether, diethyl ether, tetrahydrofuran, dioxane, 1,2-dimethoxyethane, diethoxyethane, diethylene glycol dimethyl ether and trienthylene glycol dimethyl ether. As a solvent to be used, preferred are those which are superior in solubility of metal compounds, are of low boiling point, and can be removed almost completely through a vent formed in an extruder. From this standpoint, diethylene glycol dimethyl ether, 1,2-dimethoxyethane and tetrahydrofuran are particularly preferable.

In addition, in the above-mentioned method for the preparation of the catalyst (D), an ester of a strong acid (e.g., sulfonate) may be used instead of the strong acid to add. The ester of a strong acid may cause no reaction with the metal compound at room temperature because it generally has a reactivity lower than that of the strong acid itself. However, when it is introduced into an extruder of high temperature which is held at about 200° C., a catalyst (D) having an activity in the extruder can be formed.

As a method for preparing the catalyst (D), the alternate method described below may be adopted. First, a water-soluble compound of a metal which belongs to Group 3-12 of the periodic table and a strong acid (e.g., sulfonic acid) the conjugate acid of which is as strong as or stronger than sulfuric acid are mixed in an aqueous solution to form a aqueous catalyst solution. At this time, the aqueous solution may contain an appropriate amount of alcohol. An EVOH (A) containing the catalyst (D) can be obtained by bringing the resulting aqueous catalyst solution into contact with the EVOH (A) and then drying. Specifically, a preferable method is one in which pellets of the EVOH (A), especially porous hydrous pellets, are immersed in the aqueous catalyst solution. In this case, the dry pellets thus obtained may be introduced into an extruder.

When a catalyst (D) is used, it is preferable to set the temperature in the extruder to 180-250° C. In this case, the catalyst (D) is present during the reaction between the EVOH (A) and the monofunctional epoxy compound (B). The reaction between the EVOH (A) and the monofunctional epoxy compound (B) can, therefore, be allowed to proceed efficiently even if melt-kneading is carried out at a relatively low temperature. When the temperature exceeds 250° C., EVOH may deteriorate; the temperature is more preferably not higher than 240° C. On the other hand, when the temperature is lower than 180° C., the reaction between the EVOH (A) and the monofunctional epoxy compound (B) may not proceed sufficiently; the temperature is more preferably not lower than 190° C.

The method for causing the catalyst (D) to be present when reacting the EVOH (A) and the monofunctional epoxy compound (B) together is not limited particularly. A preferable method is one in which a solution of the catalyst (D) is prepared and then the solution is added to an extruder. The method for preparing the solution of the catalyst (D) is the same as that mentioned previously. According to this method, can be achieved a productivity higher than that achieved by the alternate method described later. In addition, because the catalyst (D) can be supplied steadily, it is possible to stabilize the quality of products. The position where the solution of the catalyst (D) is introduced into an extruder is not limited particularly. However, it is preferable to add the solution at a position where the EVOH (A) is in a completely molten state because the solution can be mixed uniformly. In particular, it is desirable to add the solution at or about the position where the monofunctional epoxy compound (B) is added. This is because when the catalyst (D) and the monofunctional epoxy compound (B) are added almost simultaneously, the degradation of the EVOH (A) resulting from the influence of the catalyst (D), which is a Lewis acid, can be kept to a minimum and a sufficient reaction time can be secured. Therefore, the most suitable way is to prepare a mixed liquid of a solution of the catalyst (D) and the monofunctional epoxy compound (B) in advance, followed by adding it at a single position into an extruder.

An alternative method for causing the catalyst (D) to be present during the melt-kneading may be a method in which hydrous pellets of the EVOH (A) are immersed in a solution of the catalyst (D) and then dried. What were described previously about the alternative method for the preparation of the catalyst (D) are also applicable to this method. In this case, the resulting dry pellets are to be introduced into the extruder from a hopper. However, the problem is that an expensive catalyst is processed as waste liquid and this is liable to cause an increase in cost. Another alternative method is a method comprising impregnating dried pellets with a catalyst in a liquid state or mixing dried pellets with a catalyst in a solid state and then, as required, drying the pellets. A problem with this method is that the increase of the number of steps is liable to result in the increase in cost. In addition, it is not necessarily easy to blend the catalyst uniformly. In any of the above alternative methods, the EVOH (A) may deteriorate in the course of melt-kneading under conditions where no monofunctional epoxy compound (B) is present and only the catalyst (D), which is a Lewis acid, is present.

As described above, to melt-knead the EVOH (A) and the monofunctional epoxy compound (B) together in the presence of the catalyst (D) in an extruder is desirable. It is more desirable to add a catalyst deactivator (E) after the melt-kneading and then carry out additional melt-kneading. When the catalyst (D) is not deactivated, the thermostability of a modified EVOH (C) to be obtained may be poor and some problems may arise in the use thereof depending upon the application.

The catalyst deactivator (E) to be used may be any one which is able to reduce the activity of the catalyst (D) as a Lewis acid and the kind thereof is not restricted particularly. Alkali metal salts are suitably employed. To deactivate a catalyst (D) containing a monovalent anion the conjugate acid of which is a strong acid as strong as or stronger than sulfuric acid, it is required to use an alkali metal salt containing an anion of an acid which is weaker than the conjugate acid of the monovalent anion. This is because when doing so, a counter ion of the ion of a metal belonging to Group 3-12 of the periodic table which constitutes the catalyst (D) is replaced with an ion of a weaker acid, resulting in reduction in the Lewis acidity of the catalyst (D). The cationic species of the alkali metal salt to be used for the catalyst deactivator (E) is not limited particularly and suitable examples thereof include sodium salts, potassium salts and lithium salts. The anionic species is not also limited particularly and suitable examples thereof include carboxylates, phosphates and phosphonates.

Even if a salt such as sodium acetate and dipotassium hydrogenphosphate is used as the catalyst deactivator (E), the thermostability is improved considerably but may be insufficient depending upon the application. This is likely to be because the ion of the metal which belongs to Group 3-12 of the periodic table still has some activity as a Lewis acid and, therefore, can serve as a catalyst with respect to decomposition and gelation of a modified EVOH (C). As a method for further improving this problem, it is desirable to add a chelating agent which strongly coordinates to an ion of a metal which belongs to Group 3-12 of the periodic table. Such a chelating agent can coordinate to the metal ion strongly and, as a result, it can eliminate the Lewis acidity of the ion almost completely and can provide a modified EVOH (C) superior in thermostability. In addition, when the chelating agent is an alkali metal salt, it can neutralize a strong acid which is a conjugate acid of an anion contained in the catalyst (D) as described previously.

Examples of suitable chelating agents to be used as the catalyst deactivator (E) include hydroxycarboxylates, aminocarboxylates and aminophosphonates. Specific examples of the hydroxycarboxylates include disodium citrate, disodium tartrate and disodium malate. Examples of the aminocarboxylates include trisodium nitrilotriacetate, disodium ethylenediaminetetraacetate, trisodium ethylenediaminetetraacetate, tripotassium ethylenediaminetetraacetate, trisodium diethylenetriaminepentaacetate, trisodium 1,2-cyclohexanediaminetetraacetate, monosodium ethylenediaminediacetate, monosodium N-(hydroxyethyl)iminodiacetate. Examples of the aminophosphonates include hexasodium nitrilotrismethylenephosphonate and octasodium ethylenediaminetetra(methylenephosphonate). Above all, polyaminopolycarboxylic acids are suitable and alkali metal salts of ethylenediaminetetraacetic acid are most suitable in view of performance and cost. A presumed reaction mechanism in the case of using trisodium ethylenediaminetetraacetate is shown in the following formula (XI).

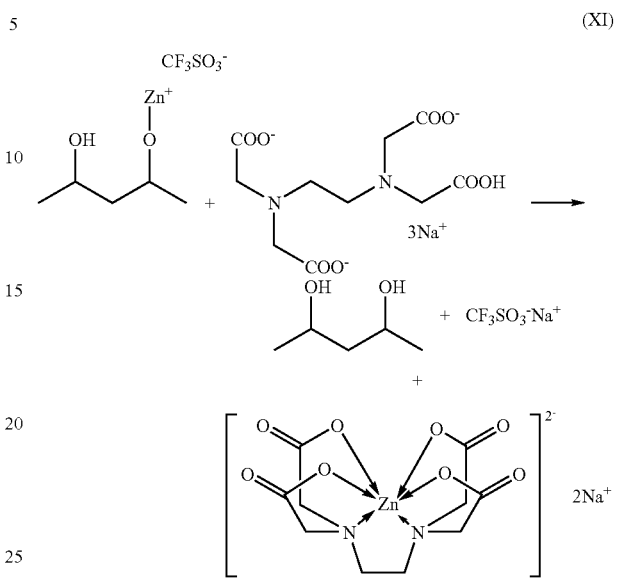

The amount of the catalyst deactivator (E) to be added is not limited particularly and may be adjusted appropriately depending upon the kind of the metal ion contained in the catalyst (D) and the number of coordination sites of the chelating agent. It is suitable to set the amount so that the ratio (E/D) of the molar number of the catalyst deactivator (E) to the molar number of the metal ion contained in the catalyst (D) may become 0.2-10. When the ratio (E/D) is less than 0.2, the catalyst (D) may not be deactivated sufficiently; the ratio is preferably not less than 0.5, more preferably not less than 1. On the other hand, when the ratio (E/D) exceeds 10, a resulting modified EVOH (C) may get colored and the production cost may increase; the ratio is preferably not more than 5, more preferably not more than 3.

The method for introducing the catalyst deactivator (E) into an extruder is not limited particularly, but in order to disperse it uniformly, it is preferable to introduce the catalyst deactivator (E) in the form of a solution thereof to a modified EVOH (C) in a molten state. Taking the solubility of the catalyst deactivator (E), the influence to the peripheral environment, etc. into consideration, it is preferable to add it in the form of an aqueous solution.

The position where the catalyst deactivator (E) is added to the extruder may be any position where the EVOH (A) and the monofunctional epoxy compound (B) have been melt-kneaded in the presence of the catalyst (D). However, it is preferable to add the catalyst deactivator (E) after melt-kneading the ethylene-vinyl alcohol copolymer (A) and the monofunctional epoxy compound (B) in the presence of the catalyst (D) and then removing unreacted monofunctional epoxy compound (B). This is because in the case of adding the catalyst deactivator (E) in the form of an aqueous solution as described previously, addition of the catalyst deactivator (E) before the removal of unreacted monofunctional epoxy compound (B) will result in incorporation of water into a monofunctional epoxy compound (B) which is removed through a vent or the like and used after recovery, causing separation operations to require much labor. In addition, it is also preferable to remove water through a vent or the like after addition of the aqueous solution of the catalyst deactivator (E).

In the production method of the present invention, an example of a suitable production process using a catalyst deactivator (E) is a process comprising the steps of:
(1) melting EVOH (A);
(2) adding a mixture of a monofunctional epoxy compound (B) and a catalyst (D);
(3) removing unreacted monofunctional epoxy compound (B);
(4) adding an aqueous solution of a catalyst deactivator (E); and
(5) removing water under reduced pressure.

It is preferable that the modified EVOH (C) of the present invention contain 0.1-20 µmol/g of an ion of a metal which belongs to any of Groups 3-12 of the periodic table. The metal ion is one which may be contained as a catalyst residue formed when a catalyst (D) was used in the above-mentioned production method. The kinds of preferable metal ions are the same as those recited in the description previously made for the catalyst (D). The content of the ion is more preferably not less than 0.5 µmol/g, and more preferably not more than 10 µmol/g.

In addition, the modified EVOH (C) of the present invention preferably contains a sulfonic acid ion. The sulfonic acid ion is one which may be contained as a catalyst residue formed when a catalyst (D) was used in the above-mentioned production method. The kinds of preferable sulfonic acid ions are the same as those recited in the description previously made for the catalyst (D). The content of the sulfonic acid ion is preferably 0.1-20 µmol/g, and more preferably not less than 0.5 µmol/g and, in addition, more preferably not more than 10 µmol/g.

Furthermore, the content of an alkali metal ion in the modified EVOH (C) is preferably 1-50 times (in molar ratio) the content of the sulfonic acid ion. The alkali metal ion is one which may be contained as a residue formed when the catalyst deactivator (E) was used in the above-mentioned production method and may be contained due to derivation from the starting EVOH (A). If the content of the alkali metal ion is less than 1 time the content of the sulfonic acid ion, the deactivation of the catalyst (D) has not been performed sufficiently and, in such an occasion, some problem in thermostability of the modified EVOH (C) may arise. Therefore, the content of the alkali metal ion is more preferably at least 2 times. On the other hand, if the content of the alkali metal ion exceeds 50 times the content of the sulfonic acid ion, the modified EVOH (C) may get colored. Therefore, the content of the alkali metal ion is preferably 30 times at most.

To the modified EVOH (C) of the present invention, at least one substance selected from the group consisting of alkali metal salts, alkaline earth metal salts, carboxylic acids and phosphoric acid compounds may be added after the formation of the modified EVOH (C) through the reaction between the EVOH (A) and the epoxy compound (B). Generally, for the purpose of improvement in various properties of EVOH, e.g, improvement in adhesiveness and control of coloration, at least one substance selected from the group consisting of alkali metal salts, alkaline earth metal salts, carboxylic acids and phosphonic acid compounds is often added to the EVOH as required. However, as described previously, the addition of various compounds shown above may cause coloration, reduction in viscosity and the like during the reaction between the EVOH (A) and the epoxy compounds (B) in an extruder. Therefore, it is preferable to add at least one substance selected from the group consisting of alkali metal salts, alkaline earth metal salts, carboxylic acids and phosphonic acid compounds to a modified EVOH (C) resulting from a reaction between an EVOH (A) and an epoxy compound (B) followed by removal of the remaining epoxy compound (B) through a vent. When this addition method is adopted, the modified EVOH (C) of the present invention is obtained without occurrence of problems such as coloration and reduction in viscosity.

Various additives may be incorporated to the modified EVOH (C) of the present invention as required. Examples of such additives include antioxidants, plasticizers, heat stabilizers, ultraviolet absorbers, antistatic agents, lubricants, colorants, fillers or other high molecular compound. These may be blended unless the effect of the present invention is affected. The following are specific examples of such additives.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), etc.

Ultraviolet absorber: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, etc.

Plasticizer: dimethyl phthalate, diethyl phthalate, dioctyl phthalate, wax, liquid paraffin, phosphates, etc.

Antistatic agent: pentaerythritol monostearate, sorbitan monopalmitate, sulfated polyolefins, polyethylene oxide, Carbowax, etc.

Lubricant: ethylene bisstearoamide, butyl stearate, etc.

Colorant: carbon black, phthalocyanine, quinacridon, indoline, azo pigments, red oxide, etc.

Filler: glass fiber, asbestos, vallastonite, calcium silicate, etc.

In addition, many other high molecular compounds may be blended in an amount such that the effect of the present invention is not affected.

In addition, to the modified EVOH (C) of the present invention, one kind or two or more kinds of hydrotalcite compound, hindered phenol type heat stabilizer, hindered amine type heat stabilizer, metal salt of higher fatty acid (e.g., calcium stearate and magnesium stearate) may be added to an extent such that the effect of the present invention is not affected (namely, 0.01-1% by weight) in order to improve melt stability or the like.

The modified EVOH (C) of the present invention preferably has an oxygen transmission rate at 20° C. and 65% RH of not more than 100 cc·20 µm/m²·day·atm. The upper limit of the oxygen transmission rate is more preferably not more than 50 cc·20 µm/m²·day·atm, still more preferably not more than 20 cc·20 µm/m²·day·atm, and particularly preferably not more than 10 cc·20 µm/m²·day·atm. The modified EVOH (C) of the present invention is suitably used as a barrier material and is particularly suitably used as a container for food packaging because it is a resin having such a low oxygen transmission rate.

In addition, the modified EVOH (C) of the present invention preferably has a carbon dioxide gas transmission rate at 20° C. and 65% RH of not more than 500 cc·20 µm/m²·day·atm. The upper limit of the carbon dioxide gas transmission rate is more preferably not more than 200 cc·20 µm/m²·day·atm, still more preferably not more than 100 cc·20 µm/m²·day·atm, and particularly preferably not more than 50 cc·20 µm/m²·day·atm. The modified EVOH (C) of the present invention is suitably used as a barrier material and is particularly suitably used as a container for carbonated beverage packaging because it is a resin having such a low carbon dioxide gas transmission rate.

The modified EVOH (C) of the present invention preferably has a Young's modulus in a tensile strength/elongation measurement at 23° C. and 50% RH of not more than 140 kgf/mm$^2$. The upper limit of the Young's modulus of the modified EVOH (C) of the present invention is more preferably not more than 120 kgf/mm$^2$ and still more preferably not more than 100 kgf/mm$^2$. If such a modified EVOH (C) is used, molded articles, such as sheets and films, to be obtained will become flexible and these articles will be fabricated well when they are subjected to stretching or thermoforming. The Young's modulus is usually not less than 1 kgf/mm$^2$. A modified EVOH (C) having a Young's modulus of not more than 140 kgf/mm$^2$ is obtained by making the amount of the structure units (I) contained therein to be 1-40 mol %. The content of the structure units (I) in the modified EVOH (C) is more preferably 1-35 mol %, still more preferably 2-30 mol %, and particularly preferably 4-30 mol %.

The modified EVOH (C) of the present invention preferably has, in a tensile strength/elongation measurement at 23° C. and 50% RH, a tensile strength at yield of 0.5-7.0 kgf/mm$^2$ and a tensile elongation at break of not less than 150% because molded articles thereof such as sheets and films can show a good formability when they are subjected to stretching or thermoforming. The modified EVOH (C) of the present invention more preferably has a tensile strength at yield of 1.0-6.5 kgf/mm$^2$ and a tensile elongation at break of not less than 200%, and still more preferably has a tensile strength at yield of 1.5-6.0 kgf/mm$^2$ and a tensile elongation at break of not less than 250%. The tensile elongation at break is usually not more than 1000%. A modified EVOH (C) having, in a tensile strength/elongation measurement at 23° C. and 50% RH, a tensile strength at yield of 0.5-7.0 kgf/mm$^2$ and a tensile elongation at break of not less than 150% is obtained by making the amount of the structure units (I) contained therein to be 1-40 mol %. The content of the structure units (I) in the modified EVOH (C) is more preferably 1-35 mol %, still more preferably 2-30 mol %, and particularly preferably 4-30 mol %.

The modified EVOH (C) of the present invention is molded into various molded articles such as films, sheets, containers, pipes, hoses and fibers suitably by melt molding. These molded articles may be crushed and molded again for the purpose of recycling. In addition, films, sheets, fibers and the like may be drawn uniaxially or biaxially. As a method of melt molding, available are extrusion molding, melt spinning, injection molding, injection blow molding and the like. The melting temperature of the modified EVOH (C) may vary depending upon the melting point or the like thereof, but it is preferably about 120-270° C.

The modified EVOH (C) of the present invention is used in the form of an extruded article. The method for producing the extruded article is not limited particularly, but preferable examples thereof include film extrusion cast molding, sheet extrusion cast molding, pipe extrusion molding, hose extrusion molding, profile extrusion molding, extrusion blow molding and inflation extrusion molding. Extrusion molded articles obtained by such molding methods can be subjected to secondary processing such as uniaxial or biaxial stretching and thermoforming.

As described previously, conventional EVOHs are superior in transparency and gas barrier properties, but they have drawbacks of being poor in stretchability, flexibility and flexing resistance. On this account EVOH is often required to be laminated with other resin or resins when the EVOH is used for an application where the impact resistance is required, such as a bottle, and for an application where the flexibility and the flexing resistance are required, such as a film and a flexible packaging container. However, the modified EVOH (C) of the present invention can be used in the form of a monolayer molded article even in an application where the impact resistance and/or the flexing resistance is required because it shows superior performances with respect to barrier properties, transparency, stretchability, flexibility and flexing resistance. From a viewpoint of such expansion of applications, the present invention is very significant.

From a viewpoint of effective utilization of the modified EVOH (C) of the present invention which is superior in barrier properties, impact resistance, flexibility and flexing resistance, a film, an extrusion blow molded article (suitably, a bottle, etc.), a flexible packaging container (suitably, a flexible tube, a flexible pouch, etc.), a pipe, a hose and a profile extruded article are desirable as a monolayer molded article of the modified EVOH (C).

In addition, a drawn film is particularly preferable as the above-mentioned film from a viewpoint where the characteristic of the modified EVOH (C) of the present invention of being superior in stretchability can be used. Above all, preferred is a drawn film stretched at least uniaxially two times or more. Furthermore, it is preferable to use the drawn film as a heat shrinkable film.

For improvement in barrier property and shape retainability at high temperature and high humidity and for improvement in shrinkability when used in a heat shrinkable film application or the like, the modified EVOH (C) of the present invention may be provided with a crosslinking structure to an extent where the effect of the present invention is not affected. There are no particular limitations for the method for forming the crosslinking structure and a preferable method is one comprising irradiation with energy rays. Examples of the energy rays include ionizing radiation such as ultraviolet rays, electron beam, X-rays, α-rays and γ-rays. Electron beam is preferred.

An example of the method of irradiation with electron beam include a method in which after a primary processing by extrusion molding, a resulting molded article is introduced to an electron beam irradiation apparatus and then the article is irradiated with electron beam. The amount of the electron beam applied is not limited particularly, but it is preferably within the range of 1-40 Mrad. If the amount of the electron beam applied is less than 1 Mrad, crosslinking will become hard to proceed. On the other hand, if the amount of the electron beam applied exceeds 40 Mrad, deterioration of the molded article becomes easy to proceed. It is more preferable that the amount of the electron beam be within the range of 2-30 Mrad.

For a molded article which requires to be subjected to secondary forming such as stretching (uniaxially or biaxially) and thermoforming after the primary molding, it is preferable to perform the electron beam irradiation between the primary molding and the secondary forming.

In the above-mentioned crosslink treatment, as an electron beam which can be used, those with an energy of 150-10000 KeV released from various kinds of electron beam accelerators such as Cockcroft-Watson type, Van der Graaff type, resonance transformer type, insulated core transformer type, linear accelerator, dynamitron type and high frequency cyclotron are used, but the electron beam used is not limited thereto.

In addition, it is desirable to use a modified EVOH (C) containing a crosslinking aid when performing the above-mentioned crosslink treatment. Preferable examples of the crosslinking aid include allyl compounds and (meth)acrylic compounds having at least two functional groups as multifunctional allyl compounds and multifunctional (meth) acrylic compounds. Specific examples include triaryl cyanurate (TAC), triaryl isocyanurate (TAIC), pentaerythritol tetramethacrylate (PETMA), glutaraldehyde (GA), ethylene glycol dimethacrylate (EGDMA), diallyl maleate (DAM), dipropagyl maleate (DPM), dipropagyl monoallylcyanurate (DPMAC), trimethylolpropane triacrylate (TMPTAT), tetraethylene glycol diacrylate (TEGDA), 1,6 hexaglycol diacrylate, tetramethylol methane tetraacrylate, dipropagyl succinate, diallyl fumarate and diallyphthalate. Among these, triallyl cyanate and triaryl isocyanate are particularly desirable.

The modified EVOH (C) of the present invention is offered for practical use also as a single-layer molded article as described above. However, it is also desirable to use it in the form of a multilayer structure in which the modified EVOH (C) and a resin other than the modified EVOH (C) are laminated. When the modified EVOH (C) of the present invention, which is often used as a barrier material, is designated as Barrier, an adhesive resin is designated as Ad, a resin other than said barrier material is designated as R and a scrap recovery layer is designated as Reg, the layer constitution of the multilayer structure may be, but not limited to, Barrier/R, R/Barrier/R, Barrier/Ad/R, Reg/Barrier/R, R/Ad/Barrier/Ad/R and R/Reg/Ad/Barrier/Ad/Reg/R. In addition, when resins other than the modified EVOH (C) are disposed on both sides of a layer of the modified EVOH (C), the resins may be of the same kind or alternatively of different kinds. Furthermore, a recovered resin may be blended in the resin other than the modified EVOH (C). In the multilayer structures, each layer may be single-layered, or, as the case may be, multilayer.

The method of producing the multilayer structure as above is not specifically defined. For example, employable are a method of melt-extruding, onto a molding (e.g., film or sheet) of the modified EVOH (C), any other resin; a method of melt-extruding the modified EVOH (C) onto a substrate of resin or the like, a method of coextruding the modified EVOH (C) along with any other resin; a method of laminating a molding obtained from the modified EVOH (C) of the present invention and and a film or sheet of another substrate via a known adhesive of, for example, organotitanium compounds, isocyanate compounds and polyester compounds therebetween. Of those, preferred is the method of coextruding the modified EVOH (C) along with any other resin.

As the resin to be laminated with the modified EVOH (C), preferred is at least one selected from the group consisting of polyolefin, polyamide, polyester, polystyrene, polyvinylidene chloride, polyvinyl chloride, polyacrylonitrile, thermoplastic polyurethane and polycarbonate. Among these, polyolefin, polyamide, polystyrene, polyester and thermoplastic polyurethane are preferably used.

The polyolefin for use in the present invention is not specifically defined and may, for example, be a homopolymer or copolymer of an olefin such as linear low density polyethylene, low density polyethylene, medium density polyethylene, high density polyethylene, ethylene-vinyl acetate copolymer, ethylene-propylene copolymer, polypropylene, propylene-α-olefin copolymer (α-olefin having 4-20 carbon atoms), polybutene, polypentene. Examples of the copolymerizing components other than these α-olefins include diolefins, vinyl compounds such as N-vinylcarbazole, vinyl chloride, vinylidene chloride, styrene, acrylonitrile and vinyl ether; unsaturated carboxylic acids, such as maleic acid, acrylic acid, methacrylic acid, ethacrylic acid, fumaric acid and itaconic acid, their esters and anhydrides; and components resulting from addition of a hydroxyl group or an epoxy group to the foregoing components. For example, various copolymers such as copolymers of a graftable monomer and a polyolefin and ionomer resins, which are reaction products of α-olefin/α,β-unsaturated carboxylic acid copolymers with ionic metal compounds, may be used. As the polyolefin, chlorinated polyethylene, chlorinated polypropylene and the like may also be used. These polyolefin resins may be used alone or may be used in combination of two or more. Among the examples shown above, polypropylene, polyethylene, ethylene-propylene copolymer and ethylene-vinyl acetate copolymer are used particularly preferably.

Examples of the polyamide for use in the present invention include polycapramide (nylon-6), poly-ω-aminoheptanoic acid (nylon-7), poly-ω-aminononanoic acid (nylon-9), polyundecamide (nylon-11), polylauryl lactam (nylon-12), polyethylene adipamide (nylon-2,6), polytetramethylene adipamide (nylon-4,6), polyhexamethyleneadipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,6), polydodecamethylene sebacamide (nylon-12,10) or caprolactam/lauryl lactam copolymer (nylon-6/12), caprolactam/ω-aminononanoic acid copolymer (nylon-6/9), caprolactam/hexamethylene adipamide copolymer (nylon-6/6,6), lauryl lactam/hexamethylene adipamide copolymer (nylon-12/6,6), hexamethylene adipamide/hexamethylene sebacamide copolymer (nylon-6,6/6,10), ethylene adipamide/hexamethylene adipamide copolymer (nylon-2,6/6,6), caprolactam/hexamethylene adipamide/hexamethylene sebacamide copolymer (nylon-6/6,6/6,10), polyhexamethylene isophthalamide, polyhexamethylene terephthalamide and hexamethylene isophthalamide/terephthalamide copolymer. These polyamide may be used alone or alternatively may be used in combination of two or more.

Among these polyamides, preferred are polyamides containing a caproamide component, for example, nylon-6, nylon-6, 12, nylon-6/12, nylon-6/6,6.

The polyester for use in the present invention is not specifically defined. Suitable examples thereof include poly(ethylene terephthalate)poly(butylene terephthalate), poly(ethylene terephthalate/isophthalate) and poly(ethylene glycol/cyclohexanedimethanol/terephthalate). Among these, particularly preferred is poly(ethylene terephthalate). In addition, as the polyester, polyesters containing as a copolymerizing component diols, such as ethylene glycol, butylene glycol, cyclohexanedimethanol, neopentyl glycol and pentane diol, and dicarboxylic acids, such as isophthalic acid, benzophenone dicarboxylic acid, diphenyl sulfonedicarboxylic acid, diphenylmethane dicarboxylic acid, propylenebis(phenylcarboxylic acid), diphenyl oxide dicarboxylic acid, oxalic acid, malonic acid, succinic acid, glutaric acid, adipic acid, pimelic acid, suberic acid, azelaic acid, sebacic acid and diethylsuccinic acid, may also be employed.

In addition, it is also preferable to use an elastomer as the resin to be laminated with the modified EVOH (C) of the present invention. The elastomer for use in the present invention is not specifically defined. Suitable examples thereof include polyurethane-based elastomers, polystyrene-based elastomers, polyamide-based elastomers, polyester elastomers, polyolefin-based elastomers, elastomers comprising coplymers of vinyl aromatic compounds with conjugated diene compounds.

The polyurethane-based elastomer for use in the present invention may usually be, but is not limited to, those made up of two or three constituents such as a high molecular diol and organic diisocyanate and/or low molecular diol. Specific examples of each component are as follows.

The high molecular diol is a diol which is a high molecular compound resulting from polycondensation, addition polymerization (for example, ring opening polymerization) or polyaddition, typical examples of which include polyester diol, polyether diol, polycarbonate diol or their cocondensate (for example, polyester and ether diol). These may be used alone or alternatively may be used in combination of two or more.

As the polyester diol, polyester diols obtained from an aliphatic diol such as ethylene glycol, propylene glycol and 1,5-pentane diol or a mixture thereof and an aliphatic or aromatic dicarboxylic acids such as glutaric acid, adipic acid and terephthalic acid or a mixture thereof may be used. Alternatively, polylactone diol such as polycaprolactone glycol, polypropiolactone glycol and polyvalerolactone glycol may be used suitably.

As the polyether diol, polyalkylene ether diol such as polyethylene ether glycol, polytetramethylene ether glycol and polyhexamethylene ether glycol may be used suitably.

Furthermore, as the polycarbonate diol, a polycarbonate diol resulting from condensation polymerization by applying diphenyl carbonate or phosgene to an aliphatic diol having 2-12 carbon atoms such as 1,4-butanediol, 1,5-pentane diol, 1,6-hexane diol, 1,8-octanediol and 1,10-decane diol or a mixture thereof may be used suitably.

It is desirable that the average molecular weight of the high molecule diol be within the range of 500-3000, more preferably within the range of 500-2500. If the average molecular weight is too small, the compatibility with an organic diisocyanate will be too good and the elasticity of a resulting polyurethane will be poor. On the other hand, if the average molecular weight is too large, the compatibility with an organic diisocyanate will be bad and blending in a polymerization process will be unsuccessful, producing gel-like blocks or failing to form stable polyurethane.

Examples of the second raw material, the low molecular diol, include low molecular diols with a molecular weight of less than 500 e.g., aliphatic, alicyclic or aromatic diols such as ethylene glycol, propylene glycol, 1,4-butanediol, 1,5-pentane diol, 3-methylpentane glycol, 1,6-hexane diol and 1,4-bishydroxyethylbenzene. These may be used alone or alternatively may be used in combination of two or more.

Examples of the organic diisocyanate include aromatic, alicyclic or aliphatic diisocyanates such as 4,4-diphenylmethane diisocyanate, tolylene diisocyanate, 1,3- or 1,4-bis(isocyanatemethyl)benzene, 1,3- or 1,4-bis(isocyanatemethyl)cyclohexane, 4,4'-dicyclohexylmethane diisocyanate and isophorone diisocyanate. These organic diisocyanates may be used alone or alternatively may be used in combination of two or more.

The nitrogen content of the polyurethane-based elastomer for use in the present invention is determined through appropriate selection of the proportions of the high molecular diol, low molecular and organic diisocyanate. However, it is preferably within the range of 1-7% in practical use. Moreover, when a thermoplastic polyurethane is used, an appropriate catalyst which promotes the reaction between the organic diisocyanate and the diol may be employed as required. In addition, various additives such as coloring agents, fillers, oxidation inhibitors and ultraviolet absorbers or lubricants may also be added for each purpose.

The polyolefin-based elastomer for use in the present invention may suitably be, but are not limited specifically to, ethylene-propylene copolymer elastomer (EPR). The ethylene-propylene copolymer may be, but is not limited specifically to, random copolymers and block copolymers of ethylene and propylene. As for the content of each constituent, in order for the copolymer to have a sufficient flexibility, it is preferable that one constituent exist in an amount at least 10% by weight or more, more preferably 20% by weight or more.

The elastomer comprising a copolymer of a vinyl aromatic compound and a conjugated diene compound for use in the present invention is not limited specifically. Examples of such a vinyl aromatic compound include styrenes such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene and t-butoxystyrene; aromatic compounds containing a vinyl group such as 1-vinylnaphthalene and 2-vinylnaphthalene; aromatic compounds containing a vinylene group such as indene and acenaphthylene. The vinyl aromatic monomer unit may be of one kind or may be of two or more kinds. However, it is preferably a unit derived from styrene.

In addition, a conjugated diene compound used for copolymer comprising of vinyl aromatic compound and conjugated diene compound is not limited particularly. Examples of the conjugated diene compound include butadiene, isoprene, 2,3-dimethylbutadiene, pentadiene and hexadiene. The conjugated diene compound may be partially or completely hydrogenated. Examples of the partially hydrogenated copolymer of a vinyl aromatic compound and a conjugated diene compound include hydrogenation products of styrene-ethylene.butylene-styrene triblock copolymers (SEBS), styrene-ethylene.propylene-styrene triblock copolymers (SEPS) and styrene-conjugated diene copolymers.

Among the elastomers shown above as examples, use of the polyurethane-based elastomer is preferable because it is superior in interlayer adhesiveness between a layer of the modified EVOH (C) and a layer of the elastomer.

As described previously, a multilayer structure containing a layer comprising the modified EVOH (C) of the present invention is produced suitably by coextrusion of the modified EVOH (C) and another resin. Depending upon the type of the resin which is laminated to the modified EVOH (C), the modified EVOH (C) and the other resin may be laminated via an adhesive resin. The adhesive resin used in this occasion is preferably an adhesive resin comprising a carboxylic acid-modified polyolefin. The carboxylic acid-modified polyolefin here is a modified olefinic polymer having carboxyl groups that prepared by chemically bonding an ethylenic unsaturated carboxylic acid or its anhydride to an olefinic polymer, for example, through addition reaction or grafting reaction. The olefinic polymer here includes polyolefins such as polyethylenes (produced in low-pressure, middle-pressure or high-pressure process), linear low density polyethylenes, polypropylenes and polybutenes; copolymers of olefins with comonomers capable of copolymerizing with the olefins (e.g., vinyl esters and unsaturated carboxylates), such as ethylene-vinyl acetate copolymers and ethylene-ethyl acrylate copolymers. Of those, preferred are linear low density polyethylenes, ethylene-vinyl acetate copolymers (having a vinyl acetate content of from 5 to 55% by weight), and ethylene-ethyl acrylate copolymers (having an ethyl acrylate content of from 8 to 35% by weight); and more preferred are linear low density polyethylenes and ethylene-vinyl acetate copolymers. The ethylenic unsaturated carboxylic acid and its anhydride include ethylenic unsaturated monocarboxylic acids and their esters, ethylenic unsaturated dicarboxylic acids and their mono- or di-esters and anhydrides. Of those, preferred are ethylenic unsaturated dicarboxylic acid anhydrides. Concretely, they include maleic acid, fumaric acid, itaconic acid, maleic anhydride, itaconic anhydride, monomethyl maleate, monoethyl maleate, diethyl maleate and monomethyl fumarate. Above all, most preferred is maleic anhydride.

The amount of the ethylenic unsaturated carboxylic acid or its anhydride to be added to or grafted on the olefinic polymer (that is, the degree of modification) falls between 0.0001 and 15% by weight of the olefinic polymer, preferably between 0.001 and 10% by weight. Addition reaction or grafting reaction of the ethylenic unsaturated carboxylic acid or its anhydride to the olefinic polymer is effected, for example, through radical polymerization in a solvent (e.g., xylene) in the presence of a catalyst (e.g., peroxide). The melt flow rate (MFR) of the thus-prepared carboxylic acid-modified polyolefin, when measured at 190° C. and under a load of 2160 g, is preferably 0.2-30 g/10 min, more preferably 0.5-10 g/10 min. These adhesive resins may be used alone or alternatively may be used in combination of two or more.

When the modified EVOH (C) of the present invention is coextrusion molded with another resin, there are merits described below in comparison with a normal EVOH. One of the merits is that because the modified EVOH (C) of the present invention has superior barrier properties, transparency, stretchability, flexibility and flexing resistance, it is possible to impart such superior physical properties also to multilayer molded articles containing a layer comprising the modified EVOH (C).

Another merit is one derived from the fact that the modified EVOH (C) of the present invention has a lower melting point in comparison with normal EVOHs. The melting point of the modified EVOH (C) varies depending upon the content of the above-mentioned structural unit (I), but the melting point of the modified EVOH (C) having the above structural unit (I) is lower than those of normal unmodified EVOHs.

EVOH is of ten used in the form of a laminate with polyolefin. Such a laminate is often produced by coextrusion molding. However, because an EVOH having an ethylene content of 5-55 mol % is generally a resin having a melting point higher than those of polyolefin and the like, there used to be a necessity, in an occasion where the EVOH and a polyolefin is melt molded by coextrusion molding, of carrying out the molding at a temperature higher than the melting point of the EVOH. In other words, as for the molding temperature of polyolefin, coextrusion molding thereof used to be carried out at a molding temperature which was not always optimum.

However, use of the modified EVOH (C) of the present invention has made it possible to carry out coextrusion molding at a molding temperature near the optimum molding temperature of polyolefin. Because the range of the molding temperature employed in coextrusion molding has been widened, it has become easier to adjust a viscosity matching of a polyolefin and a modified EVOH (C) and it has become possible to obtain coextrusion molded articles at more favorable operating conditions. From such viewpoints, the present invention is of high significance.

In addition, one of the characteristics of the EVOH (C) of the present invention is as follows. That is, when a multilayer structure is produced by coextrusion molding, it is generally desirable that the resins to be laminated together do not differ very much in melt viscosity. On the other hand, one of the suitable application of EVOH is a coextrusion blow molded fuel container. However, such a fuel container usually contains EVOH as a middle layer and high density polyethylene as an inner and outer layers. In addition, as the high density polyethylene, it is desirable to use a high density polyethylene having an MFR of 0.01-0.5 g/10 min (at 190° C. under a load of 2160 g) and it is more desirable to use a high density polyethylene having an MFR of 0.01-0.1 g/10 min from the viewpoints of rigidity, impact resistance, moldability, drawdown resistance, gasoline resistance, etc. Therefore, the EVOH to be laminated with such a high density polyethylene is preferably one which has, at a molding temperature at which coextrusion molding is carried out, a melt viscosity which is not very far from that of the high density polyethylene.

The method for producing such an EVOH having a low melt viscosity may be a method for producing an EVOH with a high degree of polymerization. However, the production of an EVOH with a high degree of polymerization is not always easy and sometimes a sufficient productivity can not be obtained. However, as is clear from the Examples described later, a modified EVOH (C) obtained by reacting an EVOH (A) and a monofunctional epoxy compound (B) using no catalyst (D) has an MFR smaller than that of the EVOH (A) before the modification. In addition, a modified EVOH (C) containing a structure unit (I) has a melting point lower than that of a normal unmodified EVOH. Therefore, it is possible to lower the temperature of an EVOH at the time of coextrusion and also to reduce the MFR during the molding. When a barrier material comprising such a modified EVOH (C) is used, it is possible to carry out multilayer coextrusion molding under more preferable production conditions even when it is coextrusion molded with a polyethylene with a small melt viscosity such as that used for an inner and outer layers of a fuel container.

As described previously, the use of a catalyst (D) can reduce the difference in MFR between a starting EVOH (A) and a resulting modified EVOH (C). In other words, it is also possible to adjust the value of the MFR of a modified EVOH (C) to be obtained depending on whether a catalyst (D) is used or not and, therefore, the modified EVOH (C) can be applied for a wide variety of applications. From such viewpoints, the invention is of high significance.

The method of coextruding the modified EVOH (C) of the present invention and another resin is not limited specifically. Suitable examples thereof include the multimanifold method, the feedblock method and the multislot die method. By such molding methods, a multilayer film, a multilayer sheet, a multilayer pipe, a multilayer hose, a multilayer profile extruded article and the like are produced. In addition, the coextrusion inflation molding method, the coextrusion blow molding method and the like can provide a multilayer film and a multilayer bottle.

The thus-obtained coextruded multilayer structures can be fabricated into various moldings (e.g., films, sheets, tubes or bottles), which include the following:

(1) Multilayer co-stretched sheets or films, which are produced by uniaxially or biaxially stretching multilayer structures (e.g., sheets or films), or biaxially stretching them, and thereafter thermally fixing them.

(2) Multilayer rolled sheets or films, which are produced by rolling multilayer structures (e.g., sheets or films).

(3) Multilayer tray or cup containers, which are produced through vacuum forming, pressure forming, vacuum-pressure forming or isothermal forming of multilayer structures (e.g., sheets or films).

(4) Multilayer bottle or cup containers, which are produced through stretch blow molding of multilayer structures (e.g., pipes).

The method for fabricating the multilayer structures is not limited to the above, and any other known fabricating methods (e.g., blow molding) could be employed.

Because the modified EVOH (C) of the present invention is superior in barrier properties, transparency, stretchability, flexibility and flexing resistance, a multilayer structure containing a layer comprising the modified EVOH (C) of the present invention can be employed for various applications. For example, it is desirably employed for a flexible film, a flexible packaging material, a thermoformed container, a blow molded article (e.g., a multilayer coextrusion blow molded container and a multilayer coinjection blow molded container), a heat shrinkable film (e.g., a skin packaging film), a hose or a balloon. Above all, preferable examples of the applications in which the effect of the flexing resistance can be shown sufficiently include a flexible packaging material (e.g., a flexible pouch and a tube) and a flexible film.

In addition, the modified EVOH (C) of the present invention and a multilayer structure containing a layer comprising the modified EVOH (C) are preferably employed as a wallpaper or a decoration board. Because EVOH has a superior antifouling property and superior barrier properties to a plasticizer, a multilayer structure containing an EVOH layer is suitably employed as a wallpaper. However, a wallpaper is often handled in the form of a roll during its transportation or its storage in a warehouse. When the transportation is repeated many times, the increase infrequency of bending of a wallpaper may render its appearance poor through formation of wrinkles in the EVOH layer or, when the wrinkles are severe, may cause whitening. However, the modified EVOH (C) of the present invention is very suitable for such applications because it has superior flexibility and flexing resistance while holding a superior barrier property to a plasticizer.

Moreover, it is also preferable that a flexible film comprising the modified EVOH (C) of the present invention be laminated with artificial leather or the like to be employed as a book jacket because the flexible film is superior in the antifouling property, flexibility and flexing resistance as described above. It is also preferable to use it for a cover of a book, a cover of a notebook or the like, etc.

Moreover, when the modified EVOH (C) of the present invention is used in the form of a multilayer pipe including a layer comprising the above modified EVOH (C), a multilayer pipe superior in crack resistance can be obtained. In a preferred embodiment, the multilayer pipe is a multilayer pipe comprising a laminate having a middle layer of the modified EVOH (C) and an inner and outer layers of a polyolefin. It is particularly preferable that the multilayer pipe be employed as a fuel pipe or a pipe for warm water circulation. The fuel pipe is available as a fuel pipe for cars and a so-called fuel line for transporting fuel from oil fields. These multilayer pipes are usually used while being joined together through connectors. When the multilayer pipes are joined together through connectors, in many cases, the pipes are expanded slowly first through their several expansions of the diameters of their ends by means of a special expansion jig.

In such a process, a conventional multilayer pipe containing a normal EVOH as a middle layer used to be suffered from cracking in the EVOH in the portion where the diameter of the multilayer pipe has been expanded. In particular, during the task done in an environment where the outdoor temperature is very low, for example, in an area where floor heating pipes are laid, large cracks are sometimes formed in a layer of EVOH. The cracks may reduce the oxygen barrier property in the connected portions of the multilayer pipes. However, because the modified EVOH (C) of the present invention is superior in flexibility, it is possible to inhibit the formation of cracks effectively in a layer of the modified EVOH (C) even during such a step of connecting pipes.

On the other hand, the multilayer pipe is also used as a fuel pipe suitably. In this case, the fuel pipe is employed as a fuel pipe of cars very suitably. It is used as a fuel pipe for supplying fuel from a fuel tank to an engine. In such an embodiment, cracks are easily formed in the barrier layer because a load caused by vibration of an engine or vibration occurring during the running of a car is applied continuously to the fuel pipe. However, because the modified EVOH (C) of the present invention is superior in flexibility, it is possible to inhibit the formation of cracks effectively in a layer of the modified EVOH (C) even when the pipe is used as a fuel pipe.

From the viewpoints described above, it is very advantageous to employ a multilayer structure including a layer of the modified EVOH (C) layer of the present invention in the form of a multilayer pipe. In particular, it is preferable to use the multilayer pipe as a fuel pipe or a pipe for warm water circulation.

In addition, it is also preferable to use the multilayer structure including a layer of the modified EVOH (C) of the present invention as a multilayer hose. Because a hose is softer than a pipe, the multilayer hose can enjoy a great merit derived from the use of the modified EVOH (C) of the present invention which is superior in flexibility. In particular, the multilayer hose is employed as a fuel hose suitably.

In addition, when the multilayer structure including a layer of the modified EVOH (C) of the present invention is used as a multilayer blow molded article, a multilayer blow molded article superior in impact resistance can be obtained. As the blow molded article, a multilayer coextrusion blow molded container is preferable. As the multilayer blow molded container, preferred is one containing a modified EVOH (C) as an intermediate layer and polyolefin as inner and outer layers. In particular, it is preferable to use polyethylene or polypropylene as the polyolefin.

Moreover, the multilayer blow molded container is suitably used as a fuel container for cars or a fuel container for motorcycles. When the multilayer coextrusion blow molded container is used as a fuel container, it is preferable to use a high density polyethylene as the polyolefin. The high density polyethylene may usually be employed after being selected suitably from commercially available products. In particular, from the viewpoints of rigidity, impact resistance, moldability, drawdown resistance, gasoline resistance, etc., the density of the high density polyethylene is preferably 0.95-0.98 $g/cm^3$ and more preferably 0.96-0.98 $g/cm^3$. The melt flow rate (MFR) of the high density polyethylene used for an inner and outer layers of a multilayer fuel container is preferably 0.01-0.5 g/10 min (at 190° C. under a load of 2160 g), and more preferably 0.01-0.1 g/10 min (at 190° C. under a load of 2160 g).

Another preferred embodiment of the multilayer blow molded container using the modified EVOH (C) of the present invention is a coinjection stretch blow molded container.

Thermoplastic polyester (PES) containers as produced through stretch blow molding have various excellent properties including good transparency, good mechanical characteristics and good flavor barrier properties, and are sanitary and safe as releasing few residual monomers and other harmful additives. Therefore, they have many applications in various fields. However, since their gas barrier properties are not always satisfactory, drinks, foods and others in them could be stored only a relatively short period of time.

In order to overcome the drawback, various methods for combining a thermoplastic polyester with an ethylene-vinyl alcohol copolymer with good gas barrier properties to give laminated structures have been proposed. Prior to stretch, blowing, a parison is first formed. For forming the parison, employed are coinjection molding, coextrusion molding, multi-stage injection molding, etc. Of those, coinjection molding is characterized in that it may be effected in simple apparatus, that it gives few scraps such as trimmings and others, and that the moldings produced through it could have a structure with an EVOH layer completely covered with e.g., a PES layer and therefore, even though the moldings have no adhesive resin (Ad) layer between the EVOH layer and the PES layer they could be a multilayer containers with good appearance owing to the contact effect by the ambient atmospheric pressure.

However, when containers filled with drinks, foods and others are shocked, for example, by dropping them, the PES layer and the EVOH layer constituting them are easily delaminated, thereby causing a serious problem of worsening the appearance of the containers. In order to solve this problem, some technologies have been developed. For example, JP-A-11-348194 (EP0949056) discloses a coinjection stretch blow molded container comprising a thermoplastic polyester layer (layer a) and an ethylene-vinyl alcohol copolymer layer (layer b), with the layer a being kept in direct contact with the both surfaces of the layer b, wherein the ethylene-vinyl alcohol copolymer satisfies the following formulae (1) and (2) and its differential scanning calorimetry (DSC) gives a single peak for crystal fusion:

$$25 \leq ETb \leq 48 \quad (1)$$

$$92 \leq SDb \leq 99 \quad (2)$$

wherein:
ETb indicates the ethylene content (mol %) of the ethylene-vinyl alcohol copolymer; and
SDb indicates the degree of saponification (%) of the ethylene-vinyl alcohol copolymer.

JP-A-2001-277341 (EP1120223) discloses a coinjection stretch blow molded container which comprises a thermoplastic polyester layer (layer a) and an ethylene-vinyl alcohol copolymer layer (layer b), with the layer a being kept in direct contact with the both surfaces of the layer b, wherein the above ethylene-vinyl alcohol copolymer is a mixture of two ethylene-vinyl alcohol copolymers (b1, b2) in a ratio by weight (b1/b2) falling between 50/50 and 90/10, and satisfies the following formulas (3) through (8):

$$25 \leq ETb1 \leq 40 \quad (3)$$

$$99 \leq SDb1 \quad (4)$$

$$35 \leq ETb2 \leq 48 \quad (5)$$

$$92 \leq SDb2 \leq 99 \quad (6)$$

$$4 \leq ETb2 - ETb1 \leq 23 \quad (7)$$

$$1 \leq SDb1 - SDb2 \leq 8 \quad (8)$$

wherein:
ETb1 indicates the ethylene content (mol %) of the ethylene-vinyl alcohol copolymer (b1);
SDb1 indicates the degree of saponification (%) of the ethylene-vinyl alcohol copolymer (b1);
ETb2 indicates the ethylene content (mol %) of the ethylene-vinyl alcohol copolymer (b2); and
SDb2 indicates the degree of saponification (%) of the ethylene-vinyl alcohol copolymer (b2).

The delamination resistance of a coinjection stretch blow molded container comprising an EVOH layer and a PES layer has been greatly improved by the above-mentioned technologies in comparison with that conventionally achieved. However, today, the market of the blow molded container has expanded than before and such containers have come to be used for various applications. As a result of such expansion of applications, the blow molded container has increasing demands for further improvement in delamination resistance and for improvement in transparency.

The coinjection stretch blow molded container of the present invention is a multilayer container having a layer of the modified EVOH (C) and a layer of a thermoplastic resin other than the modified EVOH (C). Using such a constitution, it is possible to provide a coinjection stretch blow molded container which is superior in transparency and gas barrier properties as well as in delamination resistance.

As the EVOH (C) used for a coinjection stretch blow molding container, those previously mentioned can be used. When the content of the structural units (I) contained in the modified EVOH (C) is 0.3-40 mol %, the delamination resistance is improved. In other words, even when a coinjection stretch blow molded container is applied with impact or the like, the occurrence of delamination between a layer of the modified EVOH (C) and a layer of a thermoplastic resin other than the modified EVOH (C) can be prevented effectively.

In addition, the use of the modified EVOH (C) can also improve the moldability. The moldability can be judged from the coloration of the appearance of a bottomed parison, the conditions of occurrence of gels and streaks in the bottomed parison and the condition of the edge, which may henceforth be referred to as a leading edge, of the modified EVOH (C) layer in the opening of a container. A schematic view showing a part of a bottomed parison having leading edge in a good condition and a schematic view showing a part of a bottomed parison having a leading edge in a bad condition are shown in FIG. 10 and FIG. 11, respectively. In the opening 11 of the container, a boundary between the multilayer portion 12 of PES/EVOH and the single layer portion 13 of PES is the leading edge 14. A desirable condition of the leading edge is a condition where the line of the leading edge is approximately horizontal when the bottomed parison is placed with its bottom portion down.

In the coinjection stretch blow molded container of the present invention, the thermoplastic resin other than the modified EVOH (C) to be laminated with the modified EVOH (C) is not specifically limited but it is preferable to use at least one selected from the group consisting of polyester, polypropylene and polyethylene. It is more preferable to use a high density polyethylene as the polyethylene.

So far as the object of the invention is not affected, the layer of the thermoplastic resin may be composed of plural layers and may have a layer of a resin composition comprising a blend of the thermoplastic resin and a modified EVOH (C) (such as a recovery layer); but a layer constitution comprising exclusively a layer of the modified EVOH (C) and a layer of the thermoplastic resin is preferable, and a layer constitution in which layers of the thermoplastic resin are disposed on both sides of a layer of the modified EVOH (C) is more preferable. Specifically, when a layer of the modified EVOH (C) is designated as C, and a layer of the thermoplastic resin is designated as T, examples of suitable layer constitutions include (outer) T/C/T (inner), (outer) T/C/T/C/T (inner) and the like. In the above description, (inner) indicates the inner layer, i.e., a layer that contacts with the content.

As the polyester (PES) to be used as the thermoplastic resin, condensation polymers including aromatic dicarboxylic acids or alkyl esters thereof and diols as main components are used. In particular, PES including ethylene terephthalate as the main component is preferable in attaining the purpose of the present invention. Concretely, the total proportion of the terephthalic acid unit and the ethylene glycol unit is preferably 70 mol % or more, more preferably 90 mol % or more. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal shrinkage is so large that it may not be put in practical use. Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems are not caused. The proportion (mol %) thereof is preferably 30 mol % or less, more preferably 20 mol % or less, and even more preferably 10 mol % or less, of the total moles of all the structural units of the PES. Examples of such a bifunctional compound unit include a dicarboxylic acid unit, a diol unit, and a hydroxycarboxylic acid unit. Such bifunctional compound units may either be aliphatic, alicyclic, or aromatic bifunctional compound units. Specific examples thereof include a neopentyl glycol unit, a cyclohexanedimethanol unit, a cyclohexanedicarboxylic acid unit, an isophthalic acid unit, and a naphthalenedicarboxylic acid unit.

Among these, an isophthalic acid unit is advantageous since the resultant PES provides a broad range of conditions under which good products can be produced and provides good moldability. This results in a lowered defective production rate. This is also advantageous in that the molded article is prevented from whitening caused by a suppressed crystallization rate. Also preferable are a 1,4-cyclohexanedimethanol unit and 1,4-cyclohexanedicarboxylic acid unit because the resultant molded article has even better strength against dropping. Naphthalene dicarboxylic acid unit is also preferable in that the resultant PES has a high glass transition temperature and the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8% by weight based on the weight of dicarboxylic acid.

Among these, antimony compounds are preferable in view of the cost of the catalyst, and antimony trioxide is especially preferable. On the other hand, germanium compounds are preferable in that the resultant PES has a good color tone, and germanium dioxide is especially preferable. In view of moldability, the germanium compounds are more preferable than the antimony compounds. The PES obtained by the polymerization reaction with an antimony compound as a catalyst has a higher crystallization rate than the case using a germanium compound as a catalyst. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape for molded bottles may not be obtained. This narrows the range of conditions under which good products can be produced, which tends to increase the rate of production of defective products.

In particular, when polyethylene terephthalate containing no copolymerized component except for diethylene glycol units as a by-product is used as the PES used for the present invention, it is preferable to use a germanium compound as the catalyst to suppress the crystallization rate when producing the PES.

The method for producing the coinjection blow molded container of the present invention including at least one layer made of the modified EVOH (C) and at least one PES layer is not specifically defined. In coinjection blow molding, the container is produced by subjecting a container precursor (parison) obtained by coinjection molding to stretch blow molding.

In the coinjection molding, in general, the resins to constitute each layer of the multilayer structure are guided to a concentric nozzles from two or more injection cylinders and are injected into a single mold simultaneously or alternately at non-synchronized timings, and one clamping operation is performed for molding. For example, parisons are produced by, but not limited to, the following methods: (1) PES layer for the inner and outer layers is first injected, and then a modified EVOH (C) for the interlayer is injected to give a three-layer container of PES/modified EVOH (C)/PES; or (2) PES layer for the inner and outer layers is first injected, then a modified EVOH (C) is injected while, at the same time or after the modified EVOH (C) injection, PES layer is again injected to give a five-layer container of PES/modified EVOH (C)/PES/modified EVOH (C)/PES. In addition, in the above-mentioned layer constitution, an adhesive resin layer may be disposed between the modified EVOH (C) layer and the PES layer, if necessary.

A multilayer container containing at least one layer comprising the modified EVOH (C) and at least one PES layer, which is one of the preferable embodiments of the present invention, can have a high transparency and is excellent in ability to maintain the quality of a content. It, therefore, is best suited to food packaging and the like. Regarding the layer structure of the multilayer container, an adhesive resin layer may be provided between the modified EVOH (C) layer and the PES layer as described previously. However, the multilayer container in which the PES layers are in direct contact with both surfaces of the modified EVOH (C) layer is particularly preferable because the following advantages of the present invention can be provided to a sufficient extent: a better transparency can be obtained and the resistance to impact delamination between the modified EVOH (C) layer and the PES layer is excellent.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded articles may have non-molten substances (fish eyes), by which their appearance may be worsened, moreover, which may cause the degradation of the mechanical strength of the molded articles. In some extreme cases, the screw torque for the injection of the resin composition may increase, so that the molding machine may have operational malfunctions. If the injection temperature for PES exceeds 330° C., PES may be highly decomposed, which may lead to a lowered molecular weight, so that the mechanical strength of the molded articles may be lowered. Moreover, the PES decomposition gives off some vapors of acetaldehyde and the like, and thus the properties of the materials to be filled in the molded articles may be worsened. Moreover, the oligomers resulting from the PES decomposition may contaminate the mold significantly, and the resultant molded articles may have a poor appearance.

The modified EVOH (C) is preferably injected at a temperature in the range of 160 to 240° C., more preferably 175 to 230° C., and even more preferably 185 to 225° C. If the injection temperature for the modified EVOH (C) is lower than 160° C., the modified EVOH (C) is not sufficiently melted, and the resulting molded articles may have non-molten substances (fish eyes), and thus their appearance may be worsened. In some extreme cases, the screw torque for the injection of the resin composition may increase, so that the molding machine may have operational malfunctions. On the other hand, if the injection temperature for the modified EVOH (C) exceeds 250° C., oxidation of the PES may proceed, so that the gas barrier properties of the modified EVOH (C) may be degraded. In addition, the molded articles may be unfavorably colored and contain gelled materials, so that the appearance of the resulting molded articles may be poor. Moreover, the flowability will be disordered or blocked by a decomposition gas and the gelled materials, so that the layer of the modified EVOH (C) may have failed areas. In some extreme cases, the gelled materials may make it impossible to continue the injection molding operation. In order to suppress the progress of the oxidation of the composition during melting, it is preferable to seal the supply hopper with nitrogen.

The temperature of the hot runner parts through which PES and the modified EVOH (C) run is preferably in the range of 220 to 300° C., more preferably 240 to 280° C., even more preferably 250 to 270° C. If the temperature of the hot runner parts is lower than 220° C., the PES crystallizes and solidifies in the hot runner parts. If so, the molding operation may become difficult. If the temperature of the hot runner parts exceeds 300° C., oxidation of the PES proceeds so that the gas barrier properties of the modified EVOH (C) may be degraded. In addition, the molded articles may be unfavorably colored and contain gelled materials, so that the appearance of the resulting molded articles may be poor. Moreover, the flow of the modified EVOH (C) will be disordered or blocked by the decomposition gas and by the gelled materials, so that the layer of the modified EVOH (C) may have failed areas. In some extreme cases, the gelled materials may make it impossible to continue the injection molding operation.

The mold temperature is preferably in the range of 0 to 70° C., more preferably 5 to 50° C., even more preferably 10 to 30° C. With this, the crystallization of the PES and the modified EVOH (C) of the parisons can be suppressed and they are uniformly stretched, so that molded articles having improved delamination resistance, transparency, and good shape retentivity can be obtained. If the mold temperature is lower than 0° C., the dew formed around the mold may worsen the appearance of the parisons, and thus good molded articles may not be obtained. On the other hand, if the mold temperature is higher than 70° C., the crystallization of the PES and the modified EVOH (C) which constitute a parison will not be suppressed and the parison can not be stretched uniformly. As a result, a molded article to be obtained will have reduced delamination resistance and reduced transparency. Moreover, it will become difficult to obtain a molded article of an intended shape.

The total thickness of the thus obtained parison is preferably in the range of 2 to 5 mm, and the total thickness of the modified EVOH (C) layer or layers is preferably in the range of 10 to 500 μm in total.

The above parison is directly in its high-temperature state, or after having been re-heated with heating means such as a block heater, an infrared heater, or the like, transferred to the next stretch blowing stage. In the stretch blowing stage, the heated parison is stretched one- to five-fold in the machine direction, and thereafter blown one- to four-fold with compressed air or the like so that the injection-blown molded multilayer container of the present invention can be produced. The temperature of the parison is preferably in the range of 75 to 150° C., more preferably 85 to 140° C., even more preferably 90 to 130° C., and still more preferably 95 to 120° C. If the temperature of the parison exceeds 150° C., the PES easily crystallizes, so that the resultant container is whitened and its appearance may become poor. In addition, the delamination of the stretch-blown container will increase unfavorably. On the other hand, if the temperature of the parison is less than 75° C., the PES may be crazed to be pearly, so that the transparency may be lost.

The total thickness of the body part of the thus obtained multilayer container of the present invention is generally in the range of 100 to 2000 μm, preferably 150 to 1000 μm, and may vary depending on the use of the container. In this case, the total thickness of the modified EVOH (C) layer is preferably in the range of 2 to 200 μm, more preferably 5 to 100 μm.

In the manner described above, a multilayer container comprising of a layer of the modified EVOH (C) and a PES layer, which is one preferred embodiment of the present invention, can be obtained. The containers can have a good transparency and also have excellent gas barrier properties. The containers are therefore suitable for packaging materials susceptible to degradation in the presence of oxygen, such as foods and medicines. Especially, they can be used most suitably as containers for drinks such as beer.

In addition, another preferred embodiment of the present invention is a multilayer container including at least one layer of a modified EVOH (C) and at least one layer of polypropylene. As the polypropylene for use in the present invention can be used random or block copolymers with other olefin compound such as ethylene or the like, in addition to homopolypropylene. Among them, copolymers with ethylene are preferred from the viewpoints of transparency and outer appearance of molded products. In addition, the melt index of the polypropylene is preferably 0.1 to 100 g/10 min (at 230° C. under a load of 2160 g), more preferably 0.2 to 50 g/10 min, and most preferably 0.5 to 20 g/10 min.

As to conditions for injection molding, the molding temperature of the polypropylene is preferably within the range of 180 to 250° C., and more preferably 200 to 250° C., from the viewpoint of fluidity of the polypropylene on melting as well as the appearance and strength of a container to be obtained. The production conditions employed for producing the multilayer parison including a layer of polypropylene and a layer of a modified EVOH (C) and the production conditions employed for the stretch blow molding of the multilayer parison are the same as those employed for the production of a coinjection blow molded container including a PES layer and a modified EVOH (C) layer previously described.

The thus obtained coinjection stretch blow molded container of the present invention including a polypropylene layer and a modified EVOH (C) layer is superior in flavor retainability, organic solvent resistance and delamination resistance. This multilayer container is suitable for storing various contents for a long time, and is useful as a container for storing various drinks including customarily hot-filled red tea, foods, cosmetics, blood samples and the like.

BEST MODE FOR CARRYING OUT THE INVENTION

Figure 1:
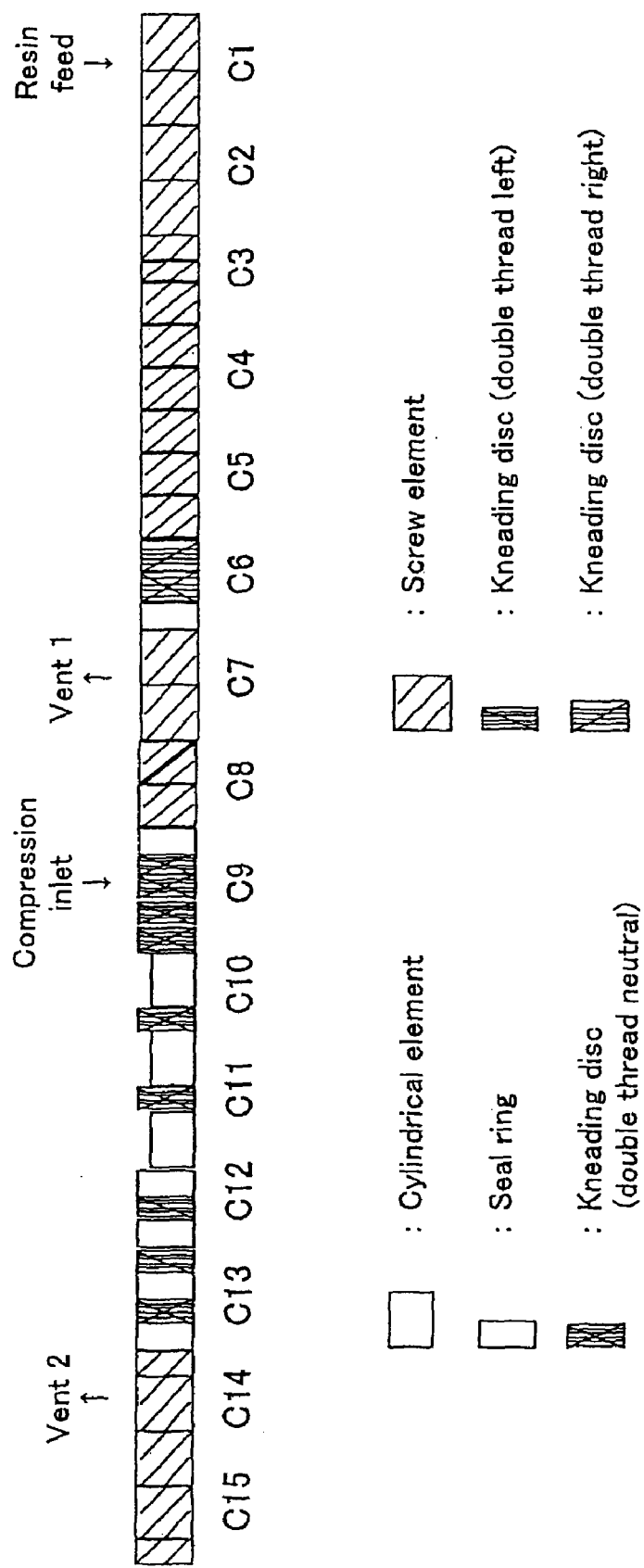
FIG. 1 is a schematic view of the constitution of the extruder used for the production of modified EVOHs (C) in Examples 1-5 and Comparative Examples 3 and 4.

The invention will now be described in more detail with reference to the following Examples, but these Examples should not be construed to limit the invention at all. The analysis for EVOH (A) and modified EVOH (C) were conducted according to the following methods.

(1) Ethylene Content and Degree of Saponification of EVOH (A)

The ethylene content and the degree of saponification of EVOH were calculated based on the spectrum obtained by $^1$H-NMR (nuclear magnetic resonance) measured using a deuterated dimethyl sulfoxide as a solvent ("JNM-GX-500 Model" manufactured by JEOL Ltd. was used for measurement).

(2) Intrinsic Viscosity of EVOH (A)

0.20 g of dry pellets of dry EVOH (A) were weighed precisely. The pellets were dissolved in 40 ml of hydrous phenol (water/phenol=15/85: weight ratio) by heating at 60° C. for 3-4 hours and then measured with an Ostwald viscometer (t0=90 sec) at a temperature of 30° C. The intrinsic viscosity [η] was determined from the following formula.

$[\eta]=(2\times(\eta sp-1\eta rel))^{1/2}/C(L/g)$

ηsp=t/t0−1 (specific viscosity)
ηrel=t/t0 (relative viscosity)
C: EVOH concentration (g/L)
t0: The time when a blank (hydrous phenol) passes the viscometer
t: The time when the hydrous phenol solution containing a dissolved sample passes the viscometer (3) Quantification of Content of Acetic Acid in EVOH (A)

Into 100 ml of ion-exchange water were added 20 g of dried pellets of EVOH (A) as a sample, and the mixture was heated and extracted at 95° C. for 6 hours. The extract was subjected to neutralization titration with a 1/50 N aqueous NaOH solution using phenolphthalein as an indicator. Thus, the content of acetic acid was determined.

(4) Quantifications of Na Ion, K Ion, Mg Ion and Ca Ion in EVOH (A) and Modified EVOH (C)

Into 50 ml of a 0.01 N aqueous hydrochloric acid solution were added 10 g of dried pellets of EVOH (A) or modified EVOH (C) as a sample, and the mixture was stirred at 95° C. for 6 hours. The resulting solution after the stirring was quantitatively analyzed by ion chromatography and the amounts of ions of Na, K, Mg and Ca were determined. The used column was ICS-C25 manufactured by Yokogawa Electric Corporation, and the eluent was an aqueous solution containing 5.0 mM tartaric acid and 1.0 mM 2,6-pyridinedicarboxylic acid. For the quantifications, employed were calibration curves prepared for aqueous solutions of sodium chloride, potassium chloride, magnesium chloride, and calcium chloride.

(5) Quantifications of Phosphate Ion and Trifluoromethane Sulfonate Ion in EVOH (A) and Modified EVOH (C)

Into 50 ml of a 0.01 N aqueous hydrochloric acid solution were added 10 g of dried pellets of EVOH (A) or modified EVOH (C) as a sample, and the mixture was stirred at 95° C. for 6 hours. The resulting solution after the stirring was quantitatively analyzed by ion chromatography and the amounts of phosphate ion and trifluoromethane sulfonate ion were determined. As the column, used was ICS-A23 (from Yokogawa Electric Corporation), for which the eluent was an aqueous solution containing 2.5 mM sodium carbonate and 1.0 mM sodium hydrogencarbonate. For the quantifications, employed were calibration curves prepared for aqueous solutions of sodium dihydrogenphosphate and sodium trifluoromethane sulfonate.

(6) Quantification of Zinc Ion and Yttrium Ion in Modified EVOH (C)

Into 50 ml of a 0.01 N aqueous hydrochloric acid solution were added 10 g of dried pellets of modified EVOH (C) as a sample, and the mixture was stirred at 95° C. for 6 hours. The aqueous solution after the stirring was analyzed by ICP emission analysis. As an apparatus, used was Optima 4300DV available from Perkin-Elmer Inc. As the measuring wavelength, used were 206.20 nm in the measurement of zinc ion and 360.07 nm in the measurement of yttrium ion. For the quantifications, employed were calibration curves prepared for standard solutions of zinc and yttrium, both commercially available.

(7) Melting Points of EVOH (A) and Modified EVOH (C)

The measurements of the melting points of EVOH (A) and modified EVOH (C) were carried out according to JIS K7121 using a differential scanning calorimeter (DSC) RDC220/SSC5200H Model (manufactured by Seiko Instruments & Electronics Ltd.). For temperature calibration, used are indium and lead.

Example 1

100 parts by weight of hydrous pellets (water content: 130% (dry basis)) of an ethylene-vinyl alcohol copolymer having an ethylene content of 32 mol %, a degree of saponification of 99.6% and an intrinsic viscosity of 0.0882 L/g were immersed and stirred in 370 parts by weight of an aqueous solution containing acetic acid and potassium dihydrogenphosphate in amounts of 0.1 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 53 ppm, a phosphoric acid compound content of 20 ppm (in terms of phosphate radical) and an alkaline earth metal salt content of 0 ppm. In addition, the dry pellets had an MFR of 8 g/10 minutes (at 190° C., under 2160 g load). The EVOH thus obtained was used as an EVOH (A). Moreover, 1,2-epoxybutane was used as a monofunctional epoxy compound (B) having a molecular weight of not more than 500.

Using a TEM-35BS extruder (37 mmφ, L/D=52.5) manufactured by Toshiba Machine Co., Ltd., a screw constitution, vents and a compression inlet were arranged as shown in FIG. 1. Barrel C was cooled with water. Barrels C2-C3 were set at 200° C. and barrels C4-C15 were set at 240° C. The extruder was driven at a screw rotation speed of 400 rpm. The EVOH (A) was fed from a resin feed opening of C1 at a rate of 11 kg/hr and was molten. Then, water and oxygen were removed through vent 1 and 1,2-epoxybutane was fed from a compression inlet of C9 at a rate of 2.5 kg/hr (pressure during the feed: 6 MPa). After that, unreacted 1,2-epoxybutane was removed through vent 2 and a modified EVOH (C) was thereby obtained. The modified EVOH (C) obtained had an MFR of 2.5 g/10 minutes (at 190° C., under 2160 g load) and a melting point of 141° C.

The chemical structure of the thus obtained modified EVOH (C) modified with 1,2-epoxybutane was determined by trifluoroacetylating the modified EVOH (C) and then subjecting it to NMR measurement according to the following procedures. At this time, model compounds shown below were prepared and peaks in the NMR measurement chart of the modified EVOH (C) were assigned through comparison with the NMR measurement charts of the model compounds.

(1) Trifluoroacetylation and NMR Measurement of Modified EVOH (C)

Figure 3:
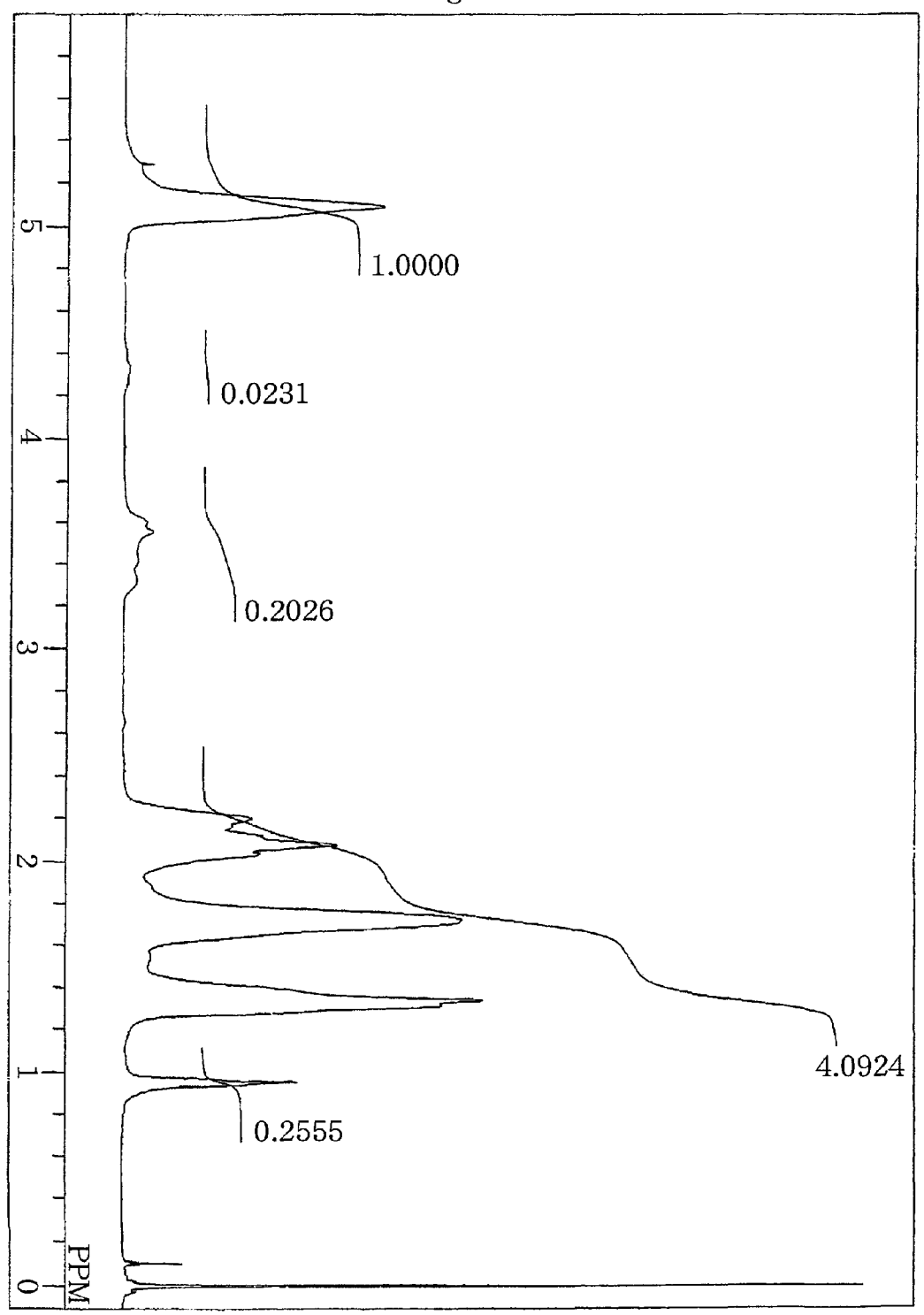
FIG. 3 is a diagram showing the $^1$H-NMR chart of the modified EVOH (C) obtained in Example 1.

The modified ethylene-vinyl alcohol copolymer (C) prepared above was pulverized to a particle size not greater than 0.2 mm and 1 g of this powder was placed into a 100 ml eggplant type flask. Furthermore, 20 g of dichloromethane and 10 g of trifluoroacetic anhydride were added and stirred at room temperature. When one hour had passed since the beginning of the stirring, the polymer dissolved completely. After additional stirring for one hour since the complete dissolution of the polymer, the solvent was removed using a rotary evaporator. The resulting trifluoroacetylated modified ethylene-vinyl alcohol copolymer (C) was dissolved in a concentration of 2 g/L in a mixed solvent of deuterate chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart obtained is shown in FIG. 3.

(2) Synthesis of 1-isopropoxy-2-butanol and 1-(1-isopropoxy-2-butoxy)-2-butanol

Into a 1 L separable flask equipped with a stirrer and a condenser, 180 g of isopropanol and 216 g of epoxybutane were introduced. After filling with nitrogen, 1.6 g of sodium was added and refluxed for 16 hours. After addition of 5 g of phosphoric acid to the mixture, 1-isopropoxy-2-butanol (boiling point: 100° C./120 mmHg) and 1-(1-isopropoxy-2-butoxy)-2-butanol (boiling point: 105° C./50 mmHg) were obtained by fractional distillation under reduced pressure. 1-isopropoxy-2-butanol thus obtained is a model compound in the case where one molecule of 1,2-epoxybutane reacted with a hydroxyl group of EVOH and 1-(1-isopropoxy-2-butoxy)-2-butanol is a model compound in the case where two or more molecules of 1,2-epoxybutane reacted with a hydroxyl group of EVOH.

(3) Synthesis and NMR Measurement of 1-isopropoxy-2-trifluoroacetoxy-butane

After introduction of 530 mg of 1-isopropoxy-2-butanol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2-trifluoroacetoxy-butane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 4.

Figure 5:
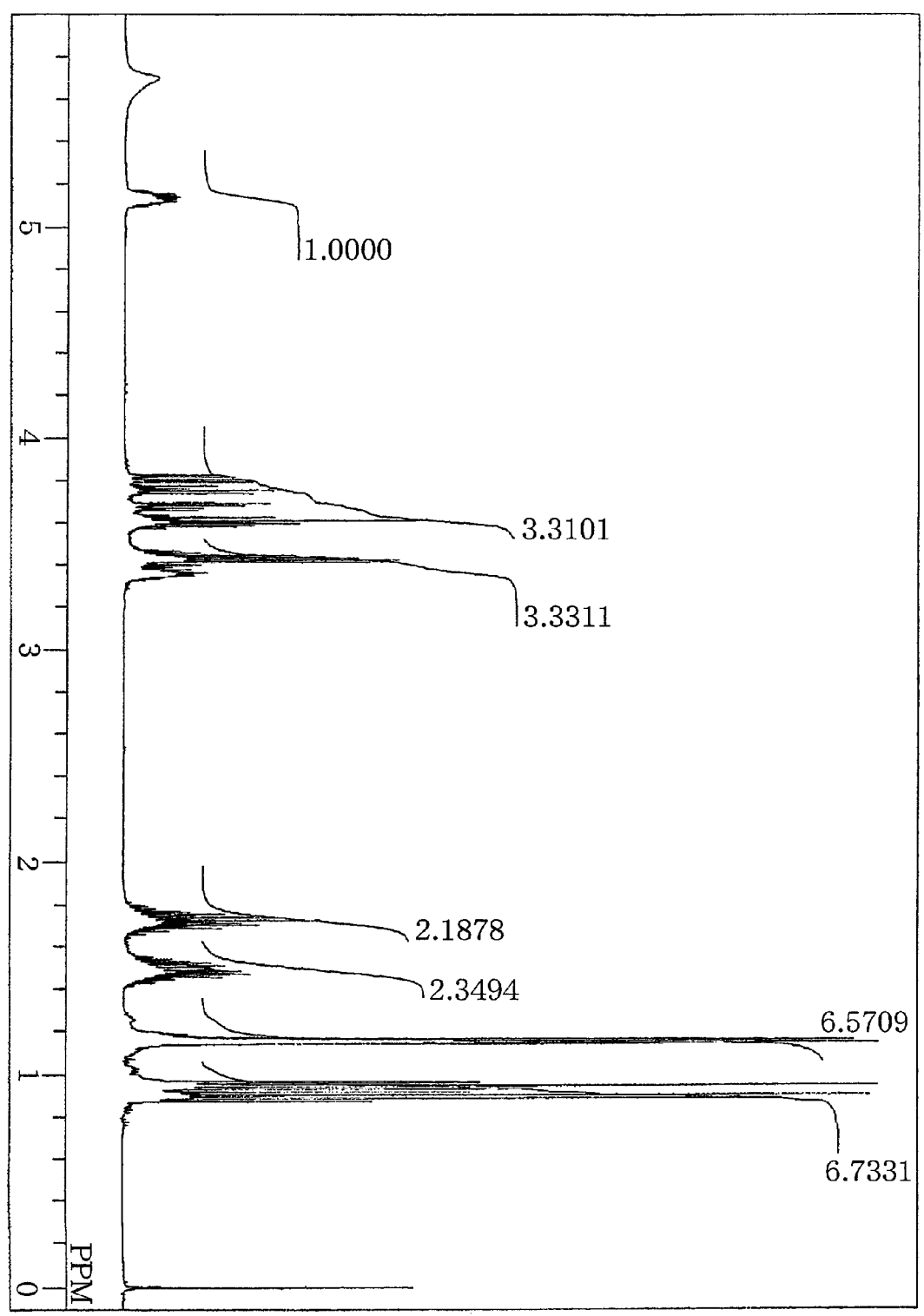
FIG. 5 is a $^1$H-NMR chart of 1-(1-isopropoxy-2-butoxy)-2-trifluoroacetoxy-butane, which is one of the model compounds.

(4) Synthesis and NMR Measurement of 1-(1-isopropoxy-2-butoxy)-2-trifluoroacetoxy-butane After introduction of 820 mg of 1-(1-isopropoxy-2-butoxy)-2-butanol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2-trifluoroacetoxy-butane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 5.

(5) Analysis of NMR Measurement Chart

Figure 4:
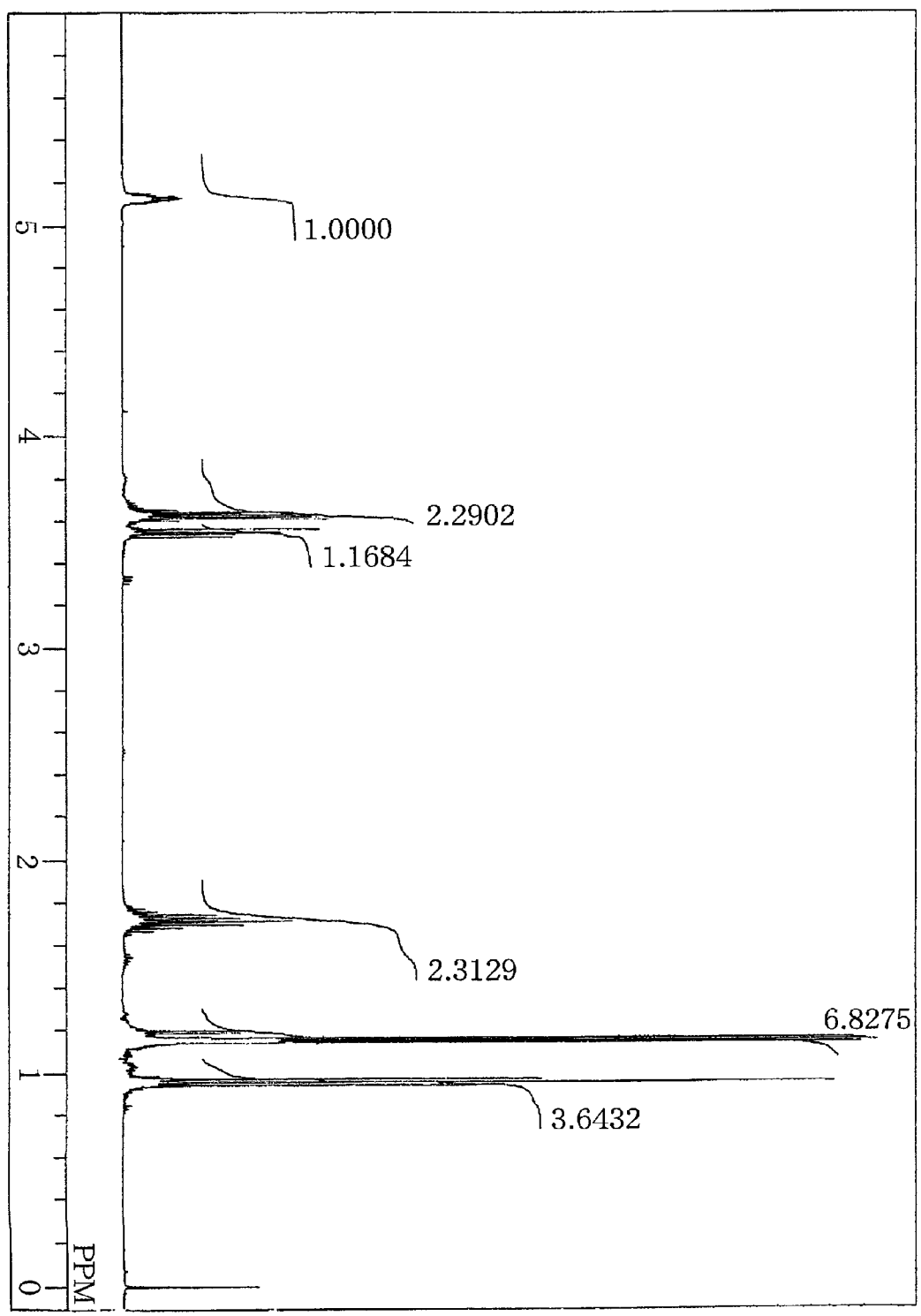
FIG. 4 is a diagram showing a $^1$H-NMR chart of 1-isopropoxy-2-trifluoroacetoxy-butane, which is one of the model compounds.

As is clear from FIG. 4, there was one signal due to methyl protons in the range of δ=0.8-1.1 ppm in the $^1$H-NMR of 1-isopropoxy-2-trifluoroacetoxy-butane. In addition, as is clear from FIG. 5, there were two signals due to methyl protons in the range of δ=0.8-1.1 ppm in the $^1$H-NMR of 1-(1-isopropoxy-2-butoxy)-2-trifluoroacetoxy-butane. On the other hand, as shown in FIG. 3, in the modified EVOH (C) prepared in Example 1, there was one signal due to methyl protons in the range of δ=0.8-1.1 ppm; the modified EVOH (C) prepared in Example 1 clearly had a structural unit (XII) shown below.

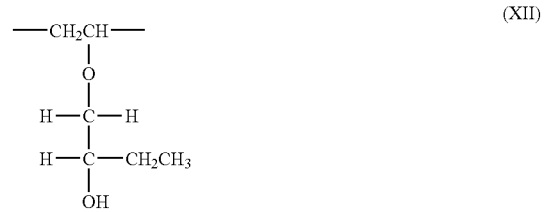

(XII)

For the chemical structure in the modified EVOH (C) modified with 1,2-epoxybutane, the content of each structural unit shown below was determined.

w: Ethylene content (mol %):
x: Content (mol %) of unmodified vinyl alcohol unit
y: Structural unit (mol %) represented by formula (XII) shown above
z: Structural unit (mol %) represented by formula (XIII) shown below

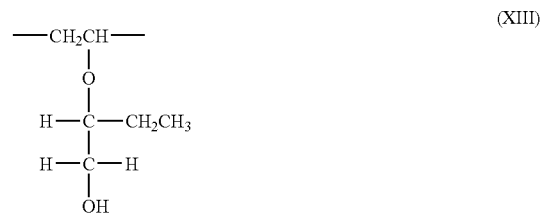

(XIII)

There are relations represented by the following equations (1)-(4) for the w to z defined above.

$$4w+2x+4y+4z=A \quad (1)$$

$$3y+2z=B \quad (2)$$

$$2z = C \tag{3}$$

$$x + y = D \tag{4}$$

It is to be noted that in equations (1)-(4), each of A through D is an integral value of the signal (s) detected within the range shown below in the $^1$H-NMR measurement of the modified EVOH (C).

A: Integral value of signal(s) of δ=1.1-2.4 ppm
B: Integral value of signal(s) of δ=3.1-3.8 ppm
C: Integral value of signal(s) of δ=4.1-4.5 ppm
D: Integral value of signal(s) of δ=4.8-5.5 ppm From equations (1)-(4), the ethylene content of the modified EVOH (C) is determined as follows:

Ethylene content (mol %) of modified $EVOH(C)$ $= \{w/(w + x + y + z)\} \times 100$ $= \{(3A - 2B - 4C - 6D)/(3A - 2B + 2C + 6D)\} \times 100$ Similarly, the content of structural unit (I) of the modified EVOH (C) is determined as follows:

Content (mol %) of structural unit $(I)$ in modified $EVOH(C)$ $= \{(y + z)/(w + x + y + z)\} \times 100$ $= \{(4B + 2C)/(3A - 2B + 2C + 6D)\} \times 100$ The modified EVOH (C) prepared in Example 1 had an ethylene content of 32 mol % and a structural unit (I) content of 4.8 mol %.

Using the thus-obtained modified EVOH (C), film formation was carried out under the extrusion conditions shown below by means of a film forming machine composed of a 40φ extruder (Plabor GT-40-A manufactured by Research Laboratory Of Plastics Technology Co., Ltd.) and a T-die. Thus, a monolayer film 25 μm in thickness was obtained.

Type: Single screw extruder (non-vent type)
L/D: 24
Bore diameter: 40 mmφ
Screw: Single-thread full-flight type, nitrided surface steel
Screw rotation speed: 40 rpm
Die: Coat hanger die of 550 mm in width
Gap between lips: 0.3 mm
Temperatures set for cylinders and die:
C1/C2/C3/adaptor/die=180/200/210/210/210 (° C.)

Using the monolayer film prepared above, an oxygen transmission rate, a carbon dioxide gas transmission rate, a Young's modulus, a tensile strength at yield, a tensile elongation at break and a haze were measured and a flexing resistance test was carried out.

(1) Measurement of Oxygen Transmission Rate

The monolayer film prepared above was moisture conditioned at 20° C. and 65% RH for 5 days. For two samples of the moisture-conditioned monolayer film, oxygen transmission rates were measured using an apparatus, MOCON OX-TRAN 2/20, manufactured by Modern Control, Inc. according to JIS K7126 (Equal Pressure Method) under a 20° C. and 65% RH condition and the average thereof was calculated. The oxygen transmission rate was 2.5 cc·20 μm/m$^2$·day·atm and a good gas barrier property was shown.

(2) Measurement of Carbon Dioxide Gas Transmission Rate

The monolayer film prepared above was moisture conditioned at 20° C. and 65% RH for 5 days. For two samples of the moisture-conditioned film, carbon dioxide gas transmission rates were measured using an apparatus, MOCON PERMA-TRAN C-IV, manufactured by Modern Control, Inc. according to JIS K7126 (Equal Pressure Method) under a 20° C.-65% RH condition and the average thereof was calculated. The carbon dioxide gas transmission rate was 11 cc·20 μm/m$^2$·day·atm and a good gas barrier property was shown.

(3) Measurement of Young's Modulus

The monolayer film prepared above was moisture conditioned in an atmosphere of 23° C. and 50% RH for 7 days, and then a specimen in the form of a strip 15 mm wide was made. Using this sample film, a Young's modulus was measured under conditions, a span of 50 mm and a tensile speed of 5 mm/min by an Autograph AGS-H manufactured by Shimadzu Corp. Measurements were conducted for ten samples and the average thereof was calculated. The Young's modulus was 46 kgf/mm$^2$.

(4) Measurements of Tensile Strength at Yield and Tensile Elongation at Break

The monolayer film prepared above was moisture conditioned in an atmosphere of 23° C. and 50% RH for 7 days, and then a specimen in the form of a strip 15 mm wide was made. Using this sample film, a tensile strength at yield and a tensile elongation at break were measured under conditions, a span of 50 mm and a tensile speed of 500 mm/min by an Autograph AGS-H manufactured by Shimadzu Corp. Measurements were conducted for ten samples and the average thereof was calculated. The tensile strength at yield and the tensile elongation at break were 5.3 kgf/mm$^2$ and 278%, respectively.

(5) Measurement of Haze

Using the monolayer film prepared above, a measurement of haze was conducted according to JIS D8741 using an integral type H.T.R meter manufactured by Nihon Seimitsu Kogaku Co., Ltd. The haze was 0.1%, and a very good transparency was shown.

(6) Evaluation of Flexing Resistance

From the monolayer film prepared above, fifty films 21 cm×30 cm were cut out. Following moisture conditioning at 20° C. and 65% RH for 5 days, every cut film was flexed 50 times, 75 times, 100 times, 125 times, 150 times, 175 times, 200 times, 225 times, 250 times or 300 times using a Gelbo Flex Tester manufactured by Rigaku Kogyo Co., Ltd. according to ASTM F392-74. And then the number of pinholes in the film was measured. For each number of flextures, measurements were conducted five times and the average thereof was used as the number of pinholes. The above measurements were plotted with numbers of flexures (P) as abscissa against numbers of pinholes (N) as ordinate. The number of flextures at which one pinhole is formed (Np1) is determined to two disits significant figures by extrapolation. As a result, Np1 was 160 times and an extremely superior flexing resistance was shown.

Next, using the modified EVOH (C) obtained, a multilayer sheet (ionomer resin layer/adhesive resin layer/modified EVOH (C) layer/adhesive resin layer/ionomer resin layer) was prepared by means of a three-kind five-layer coextrusion machine shown later under coextrusion molding conditions also described layer. The sheet constitution is as follows: the layers of the ionomer resin ("Himilan 1652" manufactured by Du Pont-Mitsui Polychemicals Co., Ltd.), both outermost layers: 250 μm each; the layers of the adhesive resin ("Admer NF500" manufactured by Mitsui Chemicals, Inc.): 30 μm each; and the layer of the modified EVOH (C): 90 μm.

The coextrusion molding conditions are as follows.
Layer constitution:
ionomer resin/adhesive resin/modified EVOH (C)/adhesive resin/ionomer resin
(thickness 250/30/90/30/250 in μm)
Extrusion temperature of each resin:
C1/C2/C3/die=170/170/220/220° C.
Specifications of extruder for each resin:
Ionomer resin: 32φ extruder, model GT-32-A (manufactured by Research Laboratory Of Plastics Technology Co., Ltd.)
Adhesive resin: 25φ extruder, model P25-18AC (manufactured by Osaka Seiki Co., Ltd.)
Modified EVOH (C): 20φ extruder for laboratory use, ME type CO-EXT (manufactured by Toyo Seiki Seisaku-Sho, Ltd.)
Specifications of T-die:
for 300 mm wide three-kind five-layer extrusion (manufactured by Research Laboratory Of Plastics Technology Co., Ltd.)
Temperature of cooling roll: 50° C.
Drawing speed: 4 m/min
The stretchability of the multilayer sheet obtained was evaluated in the manner described below.
(7) Evaluation of Stretchability The multilayer sheet prepared above was put in a pantograph type biaxial stretching machine manufactured by Toyo Seiki Seisaku-Sho, Ltd. and was subjected to simultaneous biaxial stretching at a draw ratio of 4×4 at 60° C.

The film appearance after the drawing was evaluated according to the following criteria.
Judgment: Criteria
A: There is neither unevenness nor local thickness deviation.
B: There is slight unevenness, but there is no local thickness deviation.
C: There are slight unevenness and slight local thickness deviation, but the film can be used practically.
D: There are severe unevenness and great local thickness deviation.
E: The film has a tear.

The film of this Example after the stretching have no unevenness or no local thickness deviation and, therefore, is rated as A.

The physical properties and the like of the modified EVOH (C) and the evaluation results and the like of the film are summarized in Table 1 and Table 2, respectively.

Example 2

A modified EVOH (C) having an MFR of 3 g/10 min (at 190° C. under a load of 2160 g) and a content of structural unit (I) of 3 mol % was obtained by performing extrusion under the same conditions as Example 1 except changing, in Example 1, the feed rate of the EVOH (A) from the resin feed opening of C1 to 16 kg/hr and the feed rate of 1,2-epoxybutane from the compression inlet of C9 to 1.2 kg/hr.

Using the thus obtained modified EVOH (C), a monolayer and multilayer films were produced in the same manner as Example 1. These films were measured for their oxygen transmission rate, carbon dioxide gas transmission rate, Young's modulus, tensile strength at yield, tensile elongation at break and haze and were evaluated for their flexing resistance and stretchability. The physical properties and the like of the modified EVOH (C) and the evaluation results and the like of the film are summarized in Table 1 and Table 2, respectively.

Example 3

A modified EVOH (C) having an MFR of 2.8 g/10 min (at 190° C. under a load of 2160 g) and a content of structural unit (I) of 5 mol % was obtained by performing extrusion under the same conditions as Example 1 except changing, in Example 1, the feed rate of the EVOH (A) from the resin feed opening of C1 to 16 kg/hr and feeding epoxypropane in place of 1,2-epoxybutane as a monofunctional epoxy compound having a molecular weight of not more than 500 at a rate of 2.4 kg/hr from the compression inlet of C9.

Using the thus obtained modified EVOH (C), a monolayer and multilayer films were produced in the same manner as Example 1. These films were measured for their oxygen transmission rate, carbon dioxide gas transmission rate, Young's modulus, tensile strength at yield, tensile elongation at break and haze and were evaluated for their flexing resistance and stretchability. The physical properties and the like of the modified EVOH (C) and the evaluation results and the like of the film are summarized in Table 1 and Table 2, respectively.

Example 4

A modified EVOH (C) having an MFR of 1.8 g/10 min (at 190° C. under a load of 2160 g) was obtained by performing extrusion under the same conditions as Example 1 except changing, in Example 1, the feed rate of the EVOH (A) from the resin feed opening of C1 to 15 kg/hr and feeding glycidol in place of 1,2-epoxybutane as a monofunctional epoxy compound having a molecular weight of not more than 500 at a rate of 2.5 kg/hr from the compression inlet of C9.

The chemical structure of the thus obtained modified EVOH (C) modified with glycidol was determined by trifluoroacetylating the modified EVOH (C) and then subjecting it to NMR measurement according to the following procedures. At this time, model compounds shown below were prepared and peaks in the NMR measurement chart of the modified EVOH (C) were assigned through comparison with the NMR measurement charts of the model compounds.

(1) Trifluoroacetylation and NMR Measurement of Modified EVOH (C)

Figure 6:
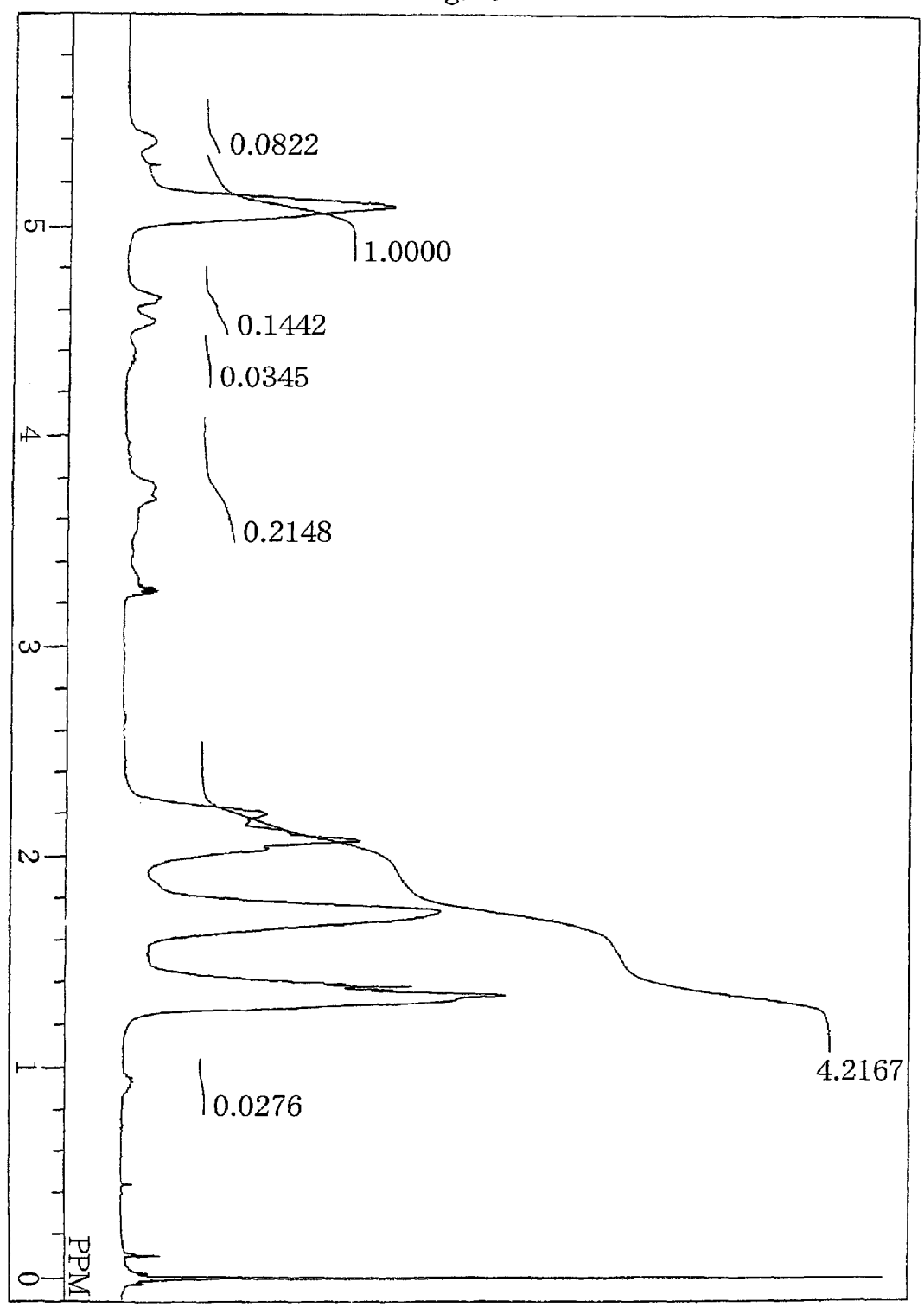
FIG. 6 is a $^1$H-NMR chart of the modified EVOH (C) obtained in Example 4.

The modified ethylene-vinyl alcohol copolymer (C) prepared above was pulverized to a particle size not greater than 0.2 mm and 1 g of this powder was placed into a 100-ml eggplant type flask. Furthermore, 20 g of dichloromethane and 10 g of trifluoroacetic anhydride were added and stirred at room temperature. When one hour had passed since the beginning of the stirring, the polymer dissolved completely. After additional stirring for one hour since the complete dissolution of the polymer, the solvent was removed using a rotary evaporator. The resulting trifluoroacetylated modified ethylene-vinyl alcohol copolymer (C) was dissolved in a concentration of 2 g/L in a mixed solvent of deuterated chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart obtained is shown in FIG. 6.

(2) Synthesis of 3-isopropoxy-1,2-propanediol

Into a 3-L separable flask equipped with a stirrer and a condenser, 1200 g of isopropanol was introduced. Then 4.6 g of sodium was added and heated to 80° C. to dissolve. After complete dissolution of the sodium, 300 g of glycidol was dropped at 80° C. over 1 hour. After completion of the dropping, stirring was conducted for 3 hours. Then the stirring was stopped and the mixture was cooled to room temperature. At this time, the mixture separated into an upper layer and a lower layer. The upper layer was isolated and concentrated by an evaporator. Furthermore, 3-isopropoxy-1,2-propanediol (boiling point: 60° C./2 mmHg) was obtained through distillation under reduced pressure. 3-Isopropoxy-1,2-propanediol thus obtained is a model compound in the case where one molecule of glycidol reacted with a hydroxyl group of EVOH.

(3) Synthesis and NMR Measurement of 1-isopropoxy-2,3-ditrifluoroacetoxy-propane After introduction of 270 mg of 3-isopropoxy-1,2-propane diol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2,3-ditrifluoroacetoxy-propane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 7.

(4) Analysis of NMR Measurement Chart

Figure 7:
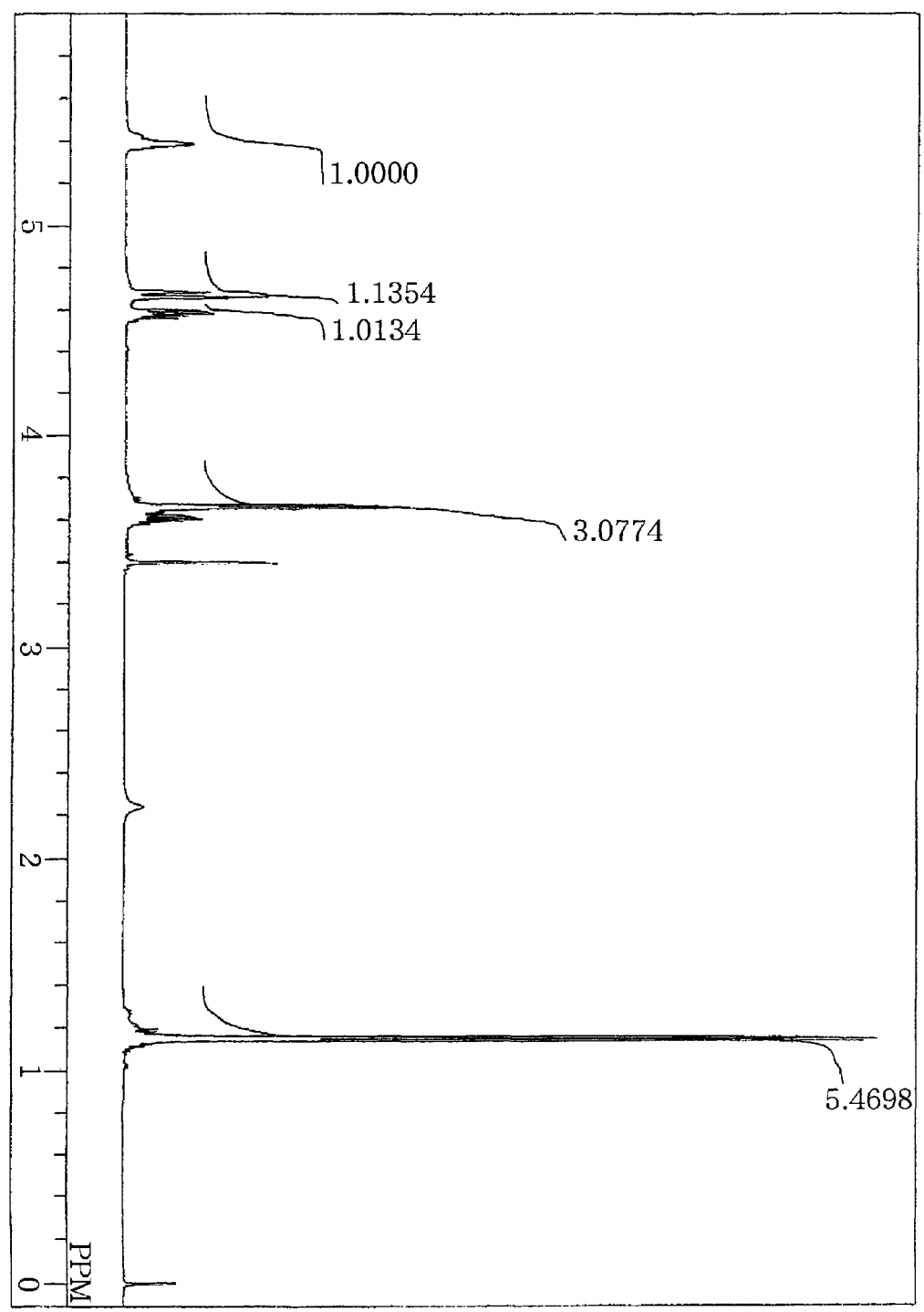
FIG. 7 is a $^1$H-NMR chart of 1-isopropoxy-2,3-ditrifluoroacetoxy-propane, which is one of the model compounds.

As is clear from a comparison of FIG. 6 to FIG. 7, the $^1$H-NMR of the model compound 1-isopropoxy-2,3-ditrifluoroacetoxy-propane and the $^1$H-NMR of the modified EVOH (C) prepared in Example 4 had common characteristic signals at δ 3.5-3.9 ppm, 4.5-4.8 ppm and 5.3-5.5 ppm. When comparing the model compound 1-isopropoxy-2,3-ditrifluoroacetoxy-propane to the modified EVOH (C) prepared in Example 4, the ratio of an integral value of a signal at δ 3.5-3.9 ppm to an integral value of a signal at δ 4.5-4.8 ppm was about 3:2 for both compounds, which agreed very well with respect to the ratio. The facts described above clearly show that the modified EVOH (C) obtained in Example 4 has the structural unit (XIV) shown below.

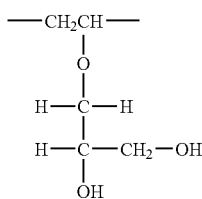

(XIV)

For the chemical structure in the modified EVOH (C) modified withglycidol, the content of each structural unit shown below was determined.

w: Ethylene content (mol %):

x: Content (mol %) of unmodified vinyl alcohol unit y: Structural unit (mol %) represented by formula (XIV) shown above z: Structural unit (mol %) represented by formula (XV) shown below

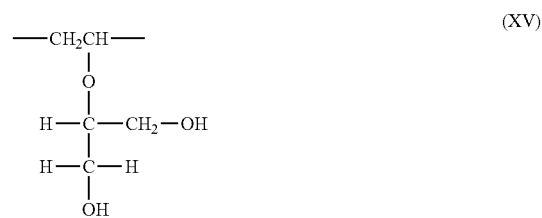

(XV)

There are relations represented by the following equations (5)-(8) for the w to z defined above.

$$4w+2x+2y+2z=A \quad (5)$$

$$4z=B \quad (6)$$

$$2y=C \quad (7)$$

$$x+y=D \quad (8)$$

It is to be noted that in equations (5)-(8), each of A through D is an integral value of the signal (s) detected within the range shown below in the $^1$H-NMR measurement of the modified EVOH (C).

A: Integral value of signal (s) of δ 1.1-2.4 ppm
B: Integral value of signal (s) of δ 4.2-4.5 ppm
C: Integral value of signal (s) of δ 4.5-4.8 ppm
D: Integral value of signal (s) of δ 4.8-5.6 ppm From equations (5)-(8), the ethylene content of the modified EVOH (C) is determined as follows:

$$\text{Ethylene content (mol \%) of modified } EVOH(C)$$
$$= \{w/(w+x+y+z)\} \times 100$$
$$= \{(2A-B-4D)/(2A+B+4D)\} \times 100$$

Similarly, the content of structural unit (I) of the modified EVOH (C) is determined as follows:

$$\text{Content (mol \%) of structural unit } (I) \text{ in modified } EVOH(C)$$
$$= \{(y+z)/(w+x+y+z)\} \times 100$$
$$= \{(2B+4C)/(2A+B+4D)\} \times 100$$

The modified EVOH (C) prepared in Example 4 had an ethylene content of 32 mol % and a structural unit (I) content of 5 mol %.

Using the thus obtained modified EVOH (C), a monolayer and multilayer films were produced in the same manner as Example 1. These films were measured for their oxygen transmission rate, carbon dioxide gas transmission rate, Young's modulus, tensile strength at yield, tensile elongation at break and haze and were evaluated for their flexing resistance and stretchability. The physical properties and the like of the modified EVOH (C) and the evaluation results and the like of the film are summarized in Table 1 and Table 2, respectively.

Example 5

100 parts by weight of hydrous pellets (water content: 130% (dry basis)) of an ethylene-vinyl alcohol copolymer having an ethylene content of 44 mol %, a degree of saponification of 99.6% and an intrinsic viscosity of 0.0855 L/g were immersed and stirred in 370 parts by weight of an aqueous solution containing acetic acid and potassium dihydrogenphosphate in amounts of 0.12 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 62 ppm, a phosphoric acid compound content of 20 ppm (in terms of phosphate radical) and an alkaline earth metal salt content of 0 ppm. In addition, the dry pellets had an MFR of 12 g/10 min (at 190° C. under a load of 2160 g). The EVOH thus obtained was used as an EVOH (A). Moreover, glycidol was used as an epoxy compound (B).

Using a TEM-35BS extruder (37 mmφ, L/D=52.5) manufactured by Toshiba Machine Co., Ltd., a screw constitution, vents and a compression inlet were arranged as shown in FIG. 1. Barrel C1 was cooled with water. Barrels C2-C3 were set at 200° C. and barrels C4-C15 were set at 240° C. The extruder was driven at a screw rotation speed of 400 rpm. The EVOH (A) was fed from a resin feed opening of C1 at a rate of 15 kg/hr and was molten. Then, water and oxygen were removed through vent 1 and glycidol was fed through a compression inlet of C9 at a rate of 2.5 kg/hr (pressure during the feed: 7 MPa). After that, unreacted glycidol was removed through vent 2, yielding a modified EVOH (C) comprising a modified EVOH (C) having an MFR of 1.6 g/10 min (at 190° C. under a load of 2160 g) and a structural unit (I) content of 6 mol %.

Using the thus obtained modified EVOH (C), a monolayer and multilayer films were produced in the same manner as Example 1. These films were measured for their oxygen transmission rate, carbon dioxide gas transmission rate, Young's modulus, tensile strength at yield, tensile elongation at break and haze and were evaluated for their flexing resistance and stretchability. The physical properties and the like of the modified EVOH (C) and the evaluation results and the like of the film are summarized in Table 1 and Table 2, respectively.

Example 6

A mixed solution was obtained by mixing 28 parts by weight of zinc acetylacetonato monohydrate and 957 parts by weight of 1,2-dimethoxyethane. To the resulting mixed solution, 15 parts by weight of trifluoromethane sulfonic acid was added under stirring, yielding a solution containing a catalyst (D). In other words, prepared was a solution in which 1 mol of trifluoromethane sulfonic acid was mixed per 1 mol of zinc acetylacetonato monohydrate.

100 parts by weight of hydrous pellets (water content: 130% (dry basis)) of an ethylene-vinyl alcohol copolymer having an ethylene content of 32 mol %, a degree of saponification of 99.6% and an intrinsic viscosity of 0.0882 L/g were immersed and stirred in 370 parts by weight of an aqueous solution containing acetic acid and potassium dihydrogenphosphate in amounts of 0.1 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 53 ppm, a phosphoric acid compound content of 20 ppm (in terms of phosphate radical) and an alkaline earth metal salt (Mg salt or Ca salt) content of 0 ppm. In addition, the dry pellets had an MFR of 8 g/10 min (at 190° C. under a load of 2160 g). The EVOH thus obtained was used as an EVOH (A). Moreover, epoxypropane was used as a monofunctional epoxy compound (B) having a molecular weight of not more than 500.

Figure 2:
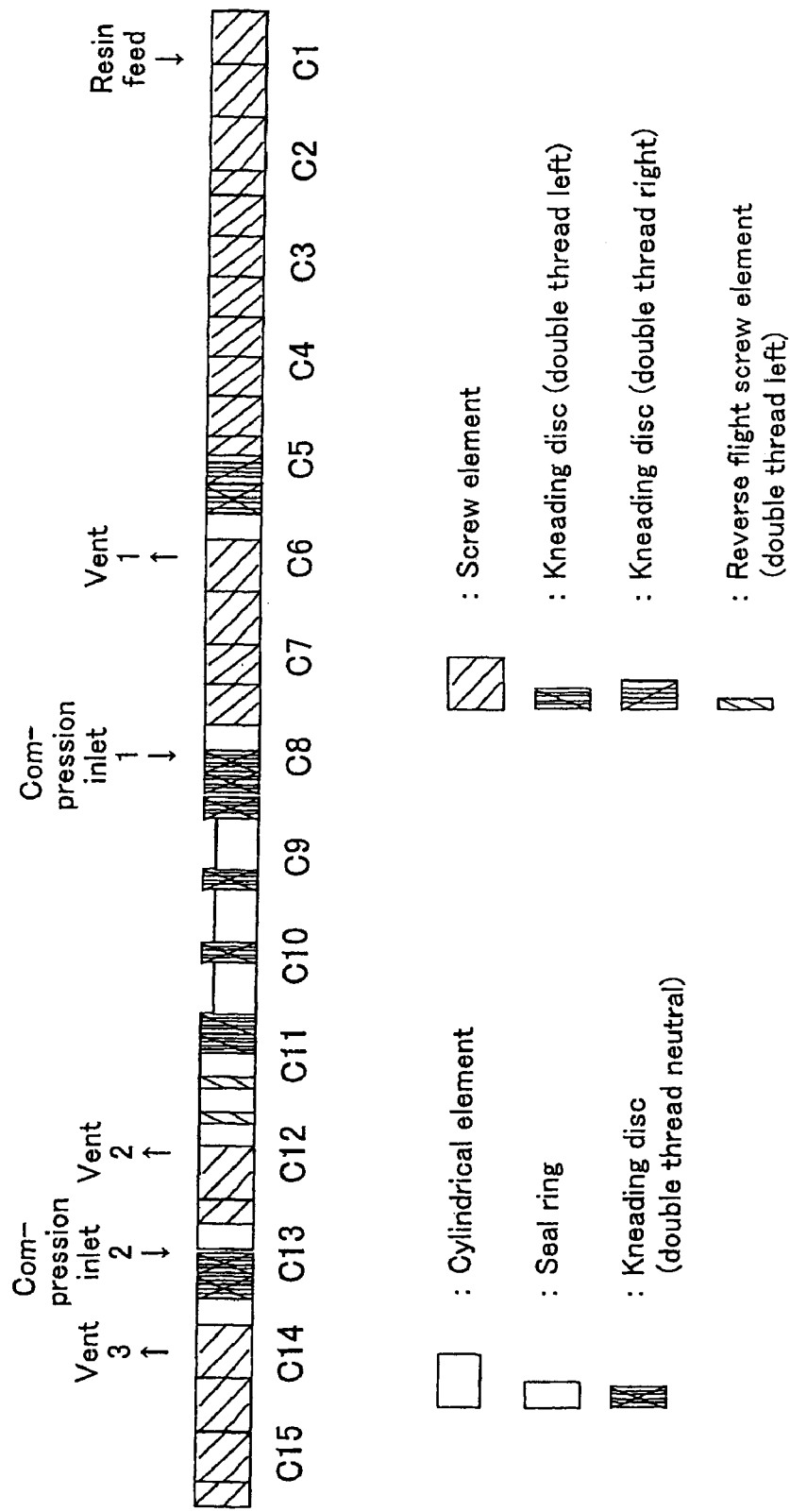
FIG. 2 is a schematic view of the constitution of the extruder used for the production of modified EVOHs (C) in Examples 6-10.

Using a TEM-35BS extruder (37 mmφ, L/D=52.5) manufactured by Toshiba Machine Co., Ltd., a screw constitution, vents and compression inlets were arranged as shown in FIG. 2. Barrel C1 was cooled with water. Barrels C2-C15 were set at 200° C. The extruder was driven at a screw rotation speed of 250 rpm. The EVOH (A) was fed from a resin feed opening of C1 at a rate of 11 kg/hr. The inner pressure at vent 1 was reduced to 60 mmHg. Epoxypropane and the solution of the catalyst (D) prepared by the method mentioned above were fed through a compression inlet of C8 after mixing thereof so that the epoxypropane and the catalyst solution were fed at rates of 1.5 kg/hr and 0.22 kg/hr, respectively (pressure during the feed: 3 MPa). Subsequently, unreacted epoxypropane was removed through vent 2 under atmospheric pressure and then an aqueous trisodium ethylenediaminetetraacetate trihydrate solution of a concentration of 8.2% by weight was added as a catalyst deactivator (E) through a compression inlet 2 of C13 at a rate of 0.11 kg/hr.

The mixing ratio of the monofunctional epoxy compounds (B) during the melt-kneading operation was 13.6 part by weight per 100 parts by weight of the EVOH (A). The catalyst (D) was added in an amount of 2 μmol/g, in terms of molar number of metal ion based on the weight of the EVOH (A). The ratio (E/D) of the molar number of the catalyst deactivator (E) to the molar number of the metal ion contained in the catalyst (D) was 1.

The inner pressure at vent 3 was reduced to 20 mmHg and the moisture was thereby removed. Thus, a modified EVOH (C) was obtained. The modified EVOH (C) obtained had an MFR of 7 g/10 min (at 190° C. under a load of 2160 g) and a melting point of 132° C. The zinc ion content was 120 ppm (1.9 μmol/g) and the alkali metal salt content was 138 ppm (5.9 μmol/g) in terms of metal elements [sodium: 130 ppm (5.7 μmol/g); potassium: 8 ppm (0.2 μmol/g)]. The trifluoromethane sulfonic acid ion content was 280 ppm (1.9 μmol/g). The alkali metal ion content was 3.1 times (in molar ratio) the trifluoromethane sulfonic acid ion.

The chemical structure of the thus obtained modified EVOH (C) modified with epoxypropane was determined by trifluoroacetylating the modified EVOH (C) and then subjecting it to NMR measurement according to the following procedures.

Figure 8:
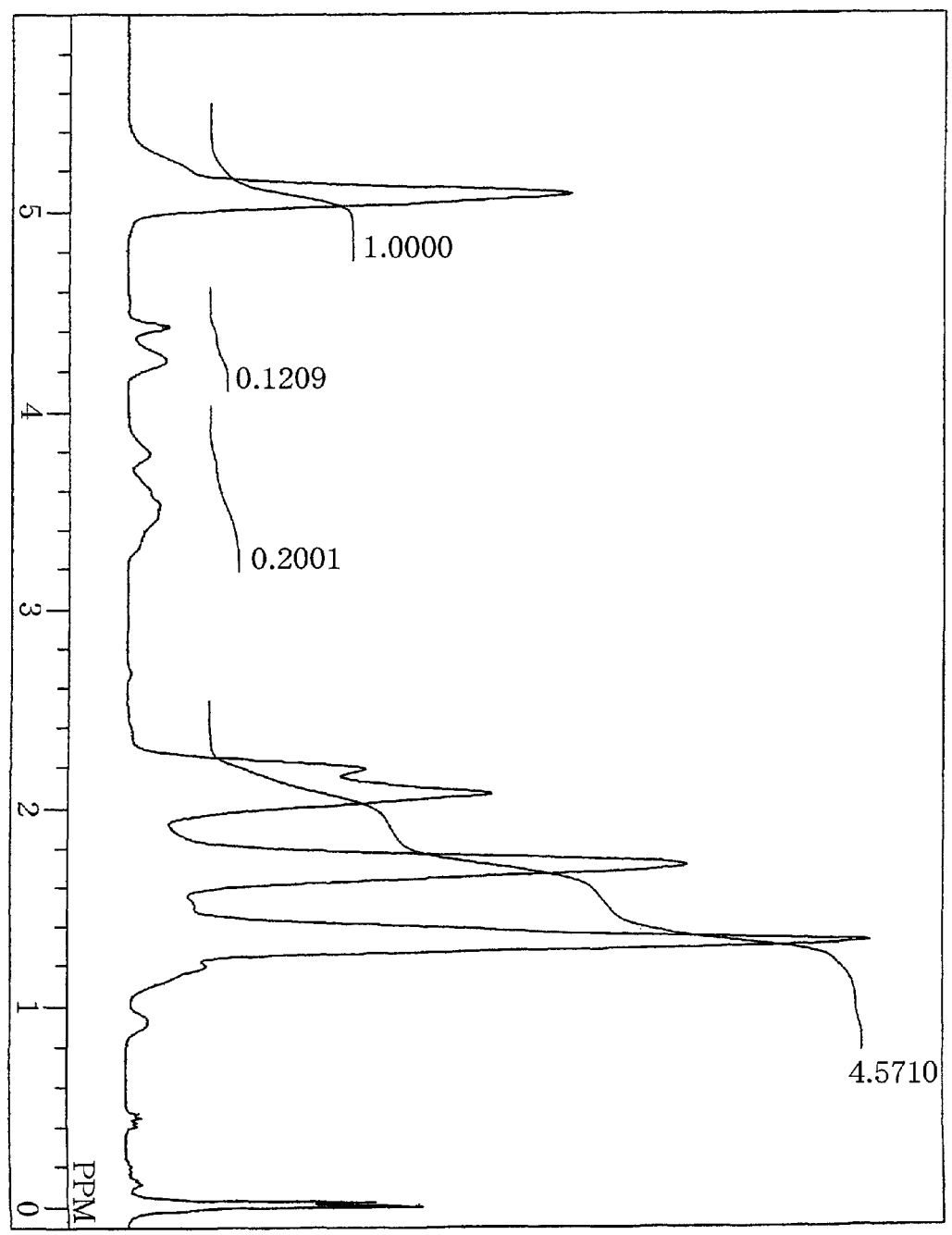
FIG. 8 is a $^1$H-NMR chart of the modified EVOH (C) obtained in Example 6.

The modified EVOH (C) prepared above was pulverized to a particle size not greater than 0.2 mm and 1 g of this powder was placed into a 100 ml eggplant type flask. Furthermore, 20 g of dichloromethane and 10 g of trifluoroacetic anhydride were added and stirred at room temperature. When one hour had passed since the beginning of the stirring, the modified EVOH (C) dissolved completely. After additional stirring for one hour since the complete dissolution of the modified EVOH (C), the solvent was removed using a rotary evaporator. The resulting trifluoroacetylated modified EVOH (C) was dissolved in a concentration of 2 g/L in a mixed solvent of deuterated chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart is shown in FIG. 8.

For the chemical structure in the modified EVOH (C) modified with epoxypropane, the content of each structural unit shown below was determined.

w: Ethylene content (mol %):
x: Content (mol %) of unmodified vinyl alcohol unit
y: Structural unit (mol %) represented by formula (XVI) shown below
z: Structural unit (mol %) represented by formula (XVII) shown below

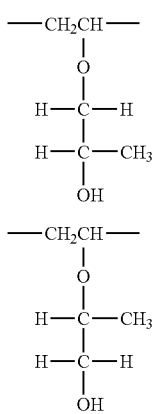

(XVI)

(XVII)

There are relations represented by the following equations (9)-(12) for the w to z defined above.

$$4w+2x+5y+5z=A \quad (9)$$

$$3y+2z=B \quad (10)$$

$$2z=C \quad (11)$$

$$x+y=D \quad (12)$$

It is to be noted that in equations (9)-(12), each of A through D is an integral value of the signal(s) detected within the range shown below in the $^1$H-NMR measurement of the modified EVOH (C).

A: Integral value of signal(s) of δ 1.1-2.5 ppm
B: Integral value of signal(s) of δ 3.1-4 ppm
C: Integral value of signal(s) of δ 4.1-4.6 ppm
D: Integral value of signal(s) of δ 4.8-5.6 ppm From equations (9)-(12), the ethylene content of the modified EVOH (C) is determined as follows:

$$\text{Ethylene content (mol \%) of modified } EVOH(C)$$
$$= \{w/(w+x+y+z)\} \times 100$$
$$= \{(2A-2B-3C-4D)/(2A-2B+C+4D)\} \times 100$$

Similarly, the content of structural unit (I) of the modified EVOH (C) is determined as follows:

$$\text{Content (mol \%) of structural unit } (I) \text{ in modified } EVOH(C)$$
$$= \{(y+z)/(w+x+y+z)\} \times 100$$
$$= \{(8B+4C)/(6A-6B+3C+12D)\} \times 100$$

The modified EVOH (C) prepared in Example 6 had an ethylene content of 32 mol % and a structural unit (I) content of 5.5 mol %.

Using the thus obtained modified EVOH (C), a monolayer and multilayer films were produced in the same manner as Example 1. These films were measured for their oxygen transmission rate and haze and were evaluated for their flexing resistance and stretchability. The physical properties and the like of the modified EVOH (C) and the evaluation results and the like of the film are summarized in Table 1 and Table 2, respectively.

Example 7

Into a polyethylene bag, introduced was 5 kg of pellets of an EVOH having an ethylene content of 44 mol %, a degree of saponification of 99.8%, an intrinsic viscosity of 0.096 L/g and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Then, an aqueous solution was prepared by dissolving 27.44 g (0.125 mol) of zinc acetate dihydrate and 15 g (0.1 mol) of trifluoromethane sulfonic acid in 500 g of water. The aqueous solution was added to the EVOH in the bag. The EVOH to which a catalyst solution had been added in the way described above was heated at 90° C. for 5 hours under occasional shaking with the opening of the bag closed. Thus the EVOH was impregnated with the catalyst solution. The resulting EVOH was dried at 90° C. under vacuum to yield an EVOH including a catalyst (D) containing zinc ion.

As EVOH (A), used was a blend obtained by dry blending 10 parts by weight of the EVOH including a catalyst (D) containing zinc ion to 90 parts by weight of the EVOH having an ethylene content of 44 mol %, a degree of saponification of 99.8% and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Moreover, 1,2-epoxybutane was used as a monofunctional epoxy compound (B) having a molecular weight of not more than 500.

TEM-35BS extruder (37 mmφ, L/D=52.5) manufactured by Toshiba Machine Co., Ltd. was used, and screw constitution, vents and compression inlets were arranged to show it in FIG. 2. Barrel C1 was cooled with water. Barrels C2-C3 were set at 200° C. and barrels C4-C15 were set at 220° C. The extruder was driven at a screw rotation speed of 200 rpm. The EVOH (A) comprising the dry blended mixture and containing the catalyst (D) was fed from a resin feed opening of C1 at a rate of 11 kg/hr. Then, the inner pressure at vent 1 was reduced to 60 mmHg and epoxybutane was fed through a compression inlet of C8 at a rate of 2.5 kg/hr (pressure during the feed: 3.5 MPa). The inner pressure at vent 2 was reduced to 200 mmHg to remove unreacted epoxybutane. An aqueous trisodium ethylenediaminetetraacetate trihydrate solution of a concentration of 8.2% by weight was added through a compression inlet 2 of C13 at a rate of 0.14 kg/hr.

The mixing ratio of the monofunctional epoxy compounds (B) during the melt-kneading operation was 22.7 parts by weight per 100 parts by weight of the EVOH (A). The catalyst (D) was added in an amount of 2.5 μmol/g in terms of molar number of metal ion based on the weight of the EVOH (A). The ratio (E/D) of the molar number of the catalyst deactivator (E) to the molar number of the metal ion contained in the catalyst (D) was 1.

The inner pressure at vent 3 was reduced to 20 mmHg and the moisture was thereby removed. Thus, a modified EVOH (C) was obtained. The above-mentioned modified EVOH (C) obtained had an MFR of 5 g/10 min (at 190° C. under a load of 2160 g) and a melting point of 109° C. The zinc ion content was 150 ppm (2.3 μmol/g) and the alkali metal salt content was 168 ppm (7.1 μmol/g) in terms of metal elements [sodium: 160 ppm (6.9 μmol/g); potassium: 8 ppm (0.2 μmol/g)]. The trifluoromethane sulfonic acid ion content was 270 ppm (1.8 μmol/g). The alkali metal ion content was 3.9 times (in molar ratio) the trifluoromethane sulfonic acid ion.

The thus obtained modified EVOH (C) had an ethylene content of 44 mol % and a structural unit (I) content of 7 mol %.

Using the thus obtained modified EVOH (C), a monolayer and multilayer films were produced in the same manner as Example 1. These films were measured for their oxygen transmission rate and haze and were evaluated for their flexing resistance and stretchability. The physical properties and the like of the modified EVOH (C) and the evaluation results and the like of the film are summarized in Table 1 and Table 2, respectively.

Example 8

An EVOH including a catalyst containing yttrium ion was obtained by performing operations the same as those of Example 7 except using 42.26 g (0.125 mol) of yttrium acetate tetrahydrate in place of 27.44 g (0.125 mol) of zinc acetate dihydrate.

A modified EVOH (C) was obtained in the same manner as Example 7 except using the EVOH prepared above which included a catalyst containing yttrium ion. At this time, the mixing ratio of the monofunctional epoxy compounds (B) was 22.7 part by weight per 100 parts by weight of the EVOH (A). The catalyst (D) was added in an amount of 2.5 μmol/g in terms of molar number of metal ion based on the weight of the EVOH (A). The ratio (E/D) of the molar number of the catalyst deactivator (E) to the molar number of the metal ion contained in the catalyst (D) was 1.

The above-mentioned modified EVOH (C) had an MFR of 6 g/10 min (at 190° C. under a load of 2160 g) and a melting point of 147° C. The yttrium ion content was 210 ppm (2.4 μmol/g) and the alkali metal salt content was 178 ppm (7.5 μmol/g) in terms of metal elements [sodium: 170 ppm (7.3 μmol/g); potassium: 8 ppm (0.2 μmol/g)]. The trifluoromethane sulfonic acid ion content was 290 ppm (1.9 μmol/g). The alkali metal ion content was 3.9 times (in molar ratio) the trifluoromethane sulfonic acid ion. The above-mentioned modified EVOH (C) had an ethylene content of 44 mol % and a structural unit (I) content of 2.3 mol %.

Using the thus obtained modified EVOH (C), a monolayer and multilayer films were produced in the same manner as Example 1. These films were measured for their oxygen transmission rate and haze and were evaluated for their flexing resistance and stretchability. The physical properties and the like of the modified EVOH (C) and the evaluation results and the like of the film are summarized in Table 1 and Table 2, respectively.

Example 9

A modified EVOH (C) was obtained in the same manner as Example 6 except stopping the feed of the solution of catalyst (D) and the aqueous solution of catalyst deactivator. The EVOH (C) had an MFR of 3.7 g/10 min (at 190° C. under a load of 2160 g), a zinc ion content of 0 ppm and an alkali metal salt content was 8 ppm (all was potassium) in terms of metal elements. The trifluoromethane sulfonic acid ion content was 0 ppm. The resulting modified EVOH (C) had an ethylene content of 32 mol % and a structural unit (I) content of 1.8 mol %.

Using the thus obtained modified EVOH (C), a monolayer and multilayer films were produced in the same manner as Example 1. These films were measured for their oxygen transmission rate and haze and were evaluated for their flexing resistance and stretchability. The physical properties and the like of the modified EVOH (C) and the evaluation results and the like of the film are summarized in Table 1 and Table 2, respectively.

Example 10

A modified EVOH (C) was obtained in the same manner as Example 7 except using no catalyst (D) and no catalyst deactivator (E).

The EVOH (C) had an MFR of 1.8 g/10 min (at 190° C. under a load of 2160 g), a zinc ion content of 0 ppm and an alkali metal salt content was 15 ppm (sodium: 5 ppm, potassium: 10 ppm) in terms of metal elements. The trifluoromethane sulfonic acid ion content was 0 ppm. The resulting modified EVOH (C) had an ethylene content of 44 mol % and a structural unit (I) content of 1.5 mol %.

Using the thus obtained modified EVOH (C), a monolayer and multilayer films were produced in the same manner as Example 1. These films were measured for their oxygen transmission rate and haze and were evaluated for their flexing resistance and stretchability. The physical properties and the like of the modified EVOH (C) and the evaluation results and the like of the film are summarized in Table 1 and Table 2, respectively.

Comparative Example 1

100 parts by weight of hydrous pellets (water content: 130% (dry basis)) of an EVOH having an ethylene content of 32 mol %, a degree of saponification of 99.6% and an intrinsic viscosity of 0.0959 L/g were immersed and stirred in 370 parts by weight of an aqueous solution containing acetic acid and potassium dihydrogenphosphate in amounts of 0.1 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 53 ppm, a phosphoric acid compound content of 20 ppm (in terms of phosphate radical) and an alkaline earth metal salt content of 0 ppm. In addition, the dry pellets had an MFR of 4.5 g/10 min (at 190° C. under a load of 2160 g).

A monolayer film and a multilayer film were produced in the same manner as Example 1 except using the above-mentioned unmodified EVOH (A) in place of the modified EVOH (C) used in Example 1. These films were measured for their oxygen transmission rate, carbon dioxide gas transmission rate, Young's modulus, tensile strength at yield, tensile elongation at break and haze and were evaluated for their stretchability.

In addition, the flexing resistance was evaluated in a way described below. Using pellets of the above-mentioned unmodified EVOH (A) and a film forming machine comprising a 40 φ extruder and a T-die, film formation was carried out at an extrusion temperature of 180-210° C. and a T-die temperature of 210° C. to yield a film 25 μm thick. Subsequently, prepared were forty monolayer films which were made of the EVOH prepared above and cut into 21 cm×30 cm. Following moisture conditioning at 20° C. and 65% RH for 5 days, every cut film was flexed 25 times, 30 times, 35 times, 40 times, 50 times, 60 times, 80 times or 100 times using a Gelbo Flex Tester manufactured by Rigaku Kogyo Co. Ltd. according to ASTM F392-74. And then the number of pinholes in the film was measured. For each number of flextures, measurements were conducted five times and the average thereof was used as the number of pinholes. The above measurements were plotted with numbers of flexures (P) as abscissa against numbers of pinholes (N) as ordinate. The number of flextures at which one pinhole is formed (Np1) is determined by extrapolation. Np1 of this comparison film in question was 34 times.

The physical properties and the like of the EVOH (A) and the evaluation results and the like of the film are summarized in Table 1 and Table 2, respectively.

Comparative Example 2

100 parts by weight of hydrous pellets (water content: 130% (dry basis)) of an EVOH having an ethylene content of 44 mol %, a degree of saponification of 99.61 and an intrinsic viscosity of 0.0948 L/g were immersed and stirred in 370 parts by weight of an aqueous solution containing acetic acid and potassium dihydrogenphosphate in amounts of 0.12 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 62 ppm, a phosphoric acid compound content of 20 ppm (in terms of phosphate radical) and an alkaline earth metal salt content of 0 ppm. In addition, the dry pellets had an MFR of 5.5 g/10 min (at 190° C. under a load of 2160 g).

A monolayer film and a multilayer film were produced in the same manner as Example 1 except using the above-mentioned unmodified EVOH (A) in place of the modified EVOH (C) used in Example 1. These films were measured for their oxygen transmission rate, carbon dioxide gas transmission rate, Young's modulus, tensile strength at yield, tensile elongation at break and haze and were evaluated for their stretchability. In addition, the flexing resistance was evaluated in the same way as Comparative Example 1. The physical properties and the like of the EVOH (A) and the evaluation results and the like of the film are summarized in Table 1 and Table 2, respectively.

Comparative Example 3

A modified EVOH (C) comprising an EVOH modified with bisphenol A diglycidyl ether having an MFR of 2.5 g/10 min (at 190° C. under a load of 2160 g load) was obtained by performing extrusion under the same conditions as Example 1 except changing, in Example 1, the feed rate of the EVOH (A) from the resin feed opening of C1 to 15 kg/hr and feeding bisphenol A diglycidyl ether (manufactured by Tokyo Kasei Kogyo Co., Ltd.) in place of epoxybutane at a rate of 120 g/hr from the compression inlet of C9.

Using the thus obtained modified EVOH (C), a monolayer and multilayer films were produced in the same manner as Example 1. These films were measured for their oxygen transmission rate, carbon dioxide gas transmission rate, Young's modulus, tensile strength at yield, tensile elongation at break and haze and were evaluated for their flexing resistance and stretchability. The physical properties and the like of the modified EVOH (C) and the evaluation results and the like of the film are summarized in Table 1 and Table 2, respectively.

Comparative Example 4

Extrusion was carried out under the same conditions as Comparative Example 3 except changing the rate of the bisphenol A diglycidyl ether fed from the compression inlet of C9 to 600 g/hr. However, during the reaction, gelation of the resin in the extruder made it impossible for the resin to be extruded.

TABLE 1

| | Method for the production of modified EVOH (C) | | | | | Characteristics of modified EVOH (C) *1) | | | |
|---|---|---|---|---|---|---|---|---|---|
| | MFR of EVOH (A) (g/10 min) | Epoxy compound (B) | Amount of (B) *2) (part by weight) | Metal ion of catalyst (D) | Melt-kneading temperature (° C.) | Ethylene content (mol %) | Structural unit (I) content (mol %) | Melting point (° C.) | MFR (g/10 min) |
| Example 1 | 8 | 1,2-Epoxy butane | 22.7 | No catalyst | 240 | 32 | 4.8 | 141 | 2.5 |
| Example 2 | 8 | 1,2-Epoxy butane | 7.5 | No catalyst | 240 | 32 | 3 | 155 | 3 |
| Example 3 | 8 | Epoxy propane | 15.0 | No catalyst | 240 | 32 | 5 | 135 | 2.8 |
| Example 4 | 8 | Glycidol | 16.7 | No catalyst | 240 | 32 | 5 | 135 | 1.8 |
| Example 5 | 12 | Glycidol | 16.7 | No catalyst | 240 | 44 | 6 | 127 | 1.6 |
| Example 6 | 8 | Epoxy propane | 13.6 | Zinc ion | 200 | 32 | 5.5 | 132 | 7 |
| Example 7 | 5 | 1,2-Epoxy butane | 22.7 | Zinc ion | 220 | 44 | 7 | 109 | 5 |
| Example 8 | 5 | 1,2-Epoxy butane | 22.7 | Yttrium ion | 220 | 44 | 2.3 | 147 | 6 |
| Example 9 | 8 | Epoxy propane | 13.6 | No catalyst | 200 | 32 | 1.8 | 168 | 3.7 |
| Example 10 | 5 | 1,2-Epoxy butane | 22.7 | No catalyst | 220 | 44 | 1.5 | 155 | 1.8 |
| Comparative Example 1 | 4.5 | Not melt-kneaded with epoxy compound (B). | | | | 32 | 0 | 183 | 4.5 |
| Comparative Example 2 | 5.5 | Not melt-kneaded with epoxy compound (B). | | | | 44 | 0 | 165 | 5.5 |
| Comparative Example 3 | 8 | *3) | 0.8 | No catalyst | 240 | 32 | —*4) | — | 2.5 |
| Comparative Example 4 | 8 | *3) | 4.0 | No catalyst | 240 | No modified EVOH (C) was obtained. | | | |

*1) In Comparative Examples 1 and 2, values for EVOH (A) are shown.
*2) The amount of epoxy compound (B) is indicated in part by weight per 100 parts by weight of EVOH (A).
*3) Bisphenol A diglycidyl ether
*4) Not measured

TABLE 2

|  | Oxygen transmission rate *1) | Carbon dioxide gas transmission rate *1) | Young's modulus (kgf/mm²) | Tensile strength at yield (kgf/mm²) | Tensile elongation at break (%) | Haze (%) | Flexing resistance (Np1) *2) | Stretchability |
|---|---|---|---|---|---|---|---|---|
| Example 1 | 2.5 | 11 | 46 | 5.3 | 278 | 0.1 | 160 | A |
| Example 2 | 1 | 4.4 | 98 | 6.0 | 254 | 0.1 | 110 | C |
| Example 3 | 1.2 | 5.4 | 53 | 5.5 | 283 | 0.1 | 150 | A |
| Example 4 | 0.7 | 3.7 | 22 | 3.1 | 292 | 0.1 | 180 | A |
| Example 5 | 2.7 | 13 | 15 | 3.4 | 336 | 0.1 | 220 | A |
| Example 6 | 1.5 | —*3) | — | — | — | 0.1 | 160 | A |
| Example 7 | 10 | — | — | — | — | 0.1 | 300 | A |
| Example 8 | 3 | — | — | — | — | 0.1 | 120 | B |
| Example 9 | 0.7 | — | — | — | — | 0.1 | 80 | C |
| Example 10 | 2.7 | — | — | — | — | 0.1 | 90 | C |
| Comparative Example 1 | 0.3 | 1.8 | 205 | 7.9 | 191 | 0.4 | 34 | E |
| Comparative Example 2 | 1.5 | 6.2 | 145 | 7.0 | 224 | 0.3 | 47 | E |
| Comparative Example 3 | 1 | 4.7 | 211 | 8.2 | 232 | 0.4 | 50 | E |

*1) Unit: cc · 20 μm/m² · day · atm
*2) Np1: The number of flexures until one pinhole is formed.
*3) Not measured As shown above, the modified EVOHs (C) containing a structural unit (I) (Examples 1-10) have oxygen transmission rates increased to some extent in comparison to the unmodified EVOHs (A) (Comparative Examples 1 and 2), but they are improved greatly in transparency, flexibility, flexing resistance and stretchability. In addition, because the melting point is lowered, the modified EVOHs (C) can be melt molded at lower temperatures. On the other hand, in Comparative Example 3 where bisphenol-A diglycidyl ether, which is a polyfunctional epoxy compound, was used instead of a monofunctional epoxy compound (B) having a molecular weight of not more than 500, no effects were obtained in improvement in the above-mentioned transparency, flexibility, flexing resistance and stretchability.

In Examples 6-8 where a catalyst (D) was used, an EVOH (A) and a monofunctional epoxy compound (B) were reacted successfully with good efficiency even they were melt-kneaded at relatively low temperatures of 200-220° C. and modified EVOHs (C) having large contents of structural unit (I) were successfully obtained. There are almost no changes in MFR of the modified EVOHs (C) in comparison to the MFR of the starting EVOHs (A). The catalyst (D) containing a zinc ion (Examples 6 and 7) is superior to the catalysts (D) containing an yttrium ion (Example 8) in the effect of promoting a reaction between an EVOH and a monofunctional epoxy compound (B).

Contrarily, in Examples 9 and 10 where melt kneading was carried out at relatively low temperatures of 200-220° C. while using no catalyst (D), what were obtained are only modified EVOHs (C) with smaller contents of structural unit (I) in comparison to Examples 6-8 mentioned above. In addition, in Examples 1-5, 9 and 10 where no catalyst (D) was used, the MFRs of the resulting modified EVOHs (C) were lower than the MFRs of the starting EVOHs (A).

The flexing resistance, flexibility and stretchability are improved and the melting point becomes lower with increase in content of structural unit (I). Therefore, it is possible to set an appropriate content of structural unit (I) for each application in view of the balance between those properties and the oxygen transmission rate.

Example 11

"UE320" manufactured by Japan Polychem Co., Ltd. (MFR=0.7 g/10 min at 190° C. under a load of 2160 g) was used as a linear low density polyethylene (LLDPE), "Admer NF500" manufactured by Mitsui Chemicals, Inc. (MFR=1.8 g/10 min at 230° C.-2160 g) was used as an adhesive resin, and the modified EVOH (C) prepared in Example 1 was used as a barrier material. A three-kind five-layer parison having a layer constitution, LLDPE/adhesive resin/barrier material/adhesive resin/LLDPE, by use of a blow molding machine TB-ST-6P manufactured by Suzuki Seiko-sho, Co., Ltd. while setting extrusion temperature for each resin and die temperature to 210° C. The parison was blown in a mold at 15° C. and cooled for 20 seconds, yielding a 500-mL bottle comprising a multilayer blow molded article. The bottle had a total layer thickness of 500 μm and a layer constitution: (inside) LLDPE/adhesive resin/barrier material/adhesive resin/LLDPE (outside)=210/20/30/20/220 μm. The bottle wasable to be molded without any special problems. In addition, the bottle had a good appearance.

Example 12

A multilayer film (nylon 6 resin/barrier material/adhesive resin/LLDPE resin) was produced under the conditions shown below by use of a four-kind four-layer coextrusion machine using the modified EVOH (C) prepared in Example 1 as a barrier material. The constitution of the film comprises 10 μm of the nylon 6 resin ("Ube nylon 1022B" manufactured by Ube Industries, Ltd.), 20 μm of the barrier material, 10 μm of the adhesive resin ("Admer NF500" manufactured by Mitsui Chemicals, Inc.) and 60 μm of the LLDPE resin ("ULTZEX 3520L" manufactured by Mitsui Chemicals, Inc.)

The coextrusion molding conditions are as follows.
Layer constitution:
nylon 6 resin/barrier material/adhesive resin/LLDPE resin (thickness 10/20/10/60 in μm)
Extrusion temperature of nylon 6 resin:
C1/C2/C3/C4=230/240/250/250° C.
Extrusion temperature of adhesive resin:
C1/C2/C3=170/170/220/220° C.
Extrusion temperature of barrier material:
C1/C2/C3/C4=175/210/230/230° C.
Extrusion temperature of LLDPE resin:
C1/C2/C3=170/170/220/220° C.

Temperature of adapter: 250° C.
Temperature of die: 250° C.
Specifications of extruder for each resin and T-die:
Nylon 6 resin: 40 φ extruder, model UT-40-H (manufactured by Research Laboratory Of Plastics Technology Co., Ltd.)
Adhesive resin: 40 φ extruder, model 10VSE-40-22 (manufactured by Osaka Seiki Co., Ltd.)
Barrier material: 40 φ extruder, model VSVE-40-24 (manufactured by Osaka Seiki Co., Ltd.)
LLDPE resin: 65 φ model 20VS-65-22 (manufactured by Osaka Seiki Co., Ltd.)
T-die: for 650 mm wide four-kind four-layer extrusion (manufactured by Research Laboratory Of Plastics Technology Co., Ltd.)
Temperature of cooling roll: 30° C.
Drawing speed: 8 m/min A thermoformed container was obtained by thermoforming the resulting multilayer film so that the LLDPE resin may come to the inner layer side of the container by use of a thermoforming machine (R530 manufactured by Multivac Inc.). Specifically, a thermoformed container was obtained by heating the multilayer film at a mold temperature of 100° C. for 2 seconds and thermoforming it into a shape of the mold (rectangular solid 130 mm long, 110 mm wide and 60 mm deep) by use of compressed air (pressure: 5 kgf/cm$^2$).

The appearance of the thermoformed container obtained was observed visually. The container was stretched uniformly without any unevenness or local thickness deviation. Moreover, it had good transparency and also had good appearance.

Example 13

A multilayer sheet (polypropylene resin/adhesive resin/barrier material/adhesive resin/polypropylene resin) was produced under the conditions shown below by use of a three-kind five-layer coextrusion machine using the modified EVOH (C) prepared in Example 1 as a barrier material. The constitution of the film comprises 420 μm of the polypropylene resin ("Idemitsu Polypropylene E-203G" made by Idemitsu Petrochemical Co., Ltd.) of the inner and outer layers, 40 μm of the adhesive resin ("Admer QF551" manufactured by Mitsui Chemicals, Inc.) and 80 μm of the barrier material of the middle layer.

A thermoformed container was obtained by thermoforming the resulting multilayer sheet by use of a thermoforming machine (a vacuum-pressure deep drawing molding machine, model FX-0431-3 manufactured by Asano Laboratories Co., Ltd.) into a shape of a round cup (mold shape: upper part 75 mmφ, lower part 60 mmφ, depth 75 mm, drawn ratio S=1.0) at a sheet temperature of 160° C. using compressed air (pressure: 5 kgf/cm$^2$).

The molding conditions are as follows.
Temperature of heater: 400° C.
Plug: 45φ×65 mm
Temperature of plug: 150° C.
Temperature of mold: 70° C.

The appearance of the cup-shaped thermoformed container obtained was observed visually. The container was stretched uniformly without any unevenness or local thickness deviation. Moreover, it had good transparency and also had good appearance.

Example 14

A multilayer film (polystyrene resin/adhesive resin/barrier material/adhesive resin/polystyrene resin) was produced under the conditions shown below by use of a three-kind five-layer coextrusion machine using the modified EVOH (C) prepared in Example 1 as a barrier material. The constitution of the film comprises 425 μm of the polystyrene resin ("Idemitsu Polystyrol ET-61" manufactured by Idemitsu Petrochemical Co., Ltd.) of the inner and outer layers, 50 μm of the adhesive resin ("Melthene M-5420" manufactured by Tosoh Corp.) and 50 μm of the barrier material of the middle layer.

A thermoformed container was obtained by thermoforming the resulting multilayer sheet by use of a thermoforming machine (a vacuum-pressure deep drawing molding machine, model FX-0431-3 manufactured by Asano Laboratories Co., Ltd.) into a shape of a round cup (mold shape: upper part 75 mmφ, lower part 60 mmφ, depth 75 mm, drawn ratio S=1.0) at a sheet temperature of 150° C. using compressed air (pressure: 5 kgf/cm$^2$).

The molding conditions are as follows.
Temperature of heater: 400° C.
Plug: 45φ×65 mm
Temperature of plug: 120° C.
Temperature of mold: 70° C.

The appearance of the thermoformed container obtained was observed visually. The container had no cracks, no unevenness and no local thickness deviation and was stretched uniformly. Moreover, it had good transparency and also had good appearance.

Example 15

The modified EVOH (C) prepared in Example 1 was used as a barrier material, a maleic anhydride-modified polyethylene "Admer NF500" manufactured by Mitsui Chemicals, Inc.) was used as an adhesive resin and a water-crosslinkable polyethylene ("Mordakes" manufactured by Sumitomo Bakelite Co., Ltd.) was used as a crosslinkable polyolefin. Each of the above-mentioned resins was supplied to a coextrusion molding machine ("M50/28D" manufactured by Leonard Co.) for multilayer pipe production to produce a multilayer pipe with an outer diameter of 20 mm comprising (outer layer) barrier material/adhesive resin layer/crosslinkable polyolefin (inner layer). The thicknesses of the outer layer, the adhesive resin layer and the inner layer in the multilayer pipe obtained were 100 μm, 50 μm and 1850 μm, respectively. The inner layer of the resulting multilayer pipe was water-cross linked by passing water vapor (temperature 150° C.; pressure 4 kg/cm$^2$) through the multilayer pipe for 3 minutes. Then the oxygen barrier property of this multilayer pipe was measured by a method described below. The oxygen barrier property was evaluated based on the increase speed of dissolved oxygen. The smaller the increasing speed of dissolved oxygen, the better the oxygen barrier property.

By circulating water from which dissolved oxygen had been removed by use of a packed tower containing metallic tin through the resulting pipe, the increase speed of the dissolved oxygen in the water at 70° C. was measured under conditions: 20° C. and 65% RH. The increase speed μg/liter·hr used herein indicates that the dissolved oxygen increases at a rate of μg/hr per liter of water in the pipe. In other words, when V1 cc represents the volume of the water in the whole apparatus including the pipe, V2 cc represents the volume of the water in the pipe and B μg/liter·hr represents the increase per unit time in the oxygen concentration in the water circulated in the apparatus, the above-mentioned increase speed of dissolved oxygen (A μg/liter·hr) is a value calculated from $A=B(V1/V2)$.

The multilayer pipe had an increase speed of dissolved oxygen of 25 μg/liter·hr, showing good oxygen barrier property.

Example 16

A polyester based thermoplastic polyurethane ("Kuramilon U-2190" manufactured by Kuraray Co., Ltd.) was used as a thermoplastic polyurethane elastomer, the modified EVOH (C) prepared in Example 1 was used as a barrier material, and a resin composition comprising 70 parts by weight of an ethylene-vinyl acetate copolymer ("Evaflex EV-460" manufactured by Du Pont-Mitsui Polychemicals Co., Ltd.) and 30 parts by weight of a maleic anhydride-modified ethylene-vinyl acetate copolymer based adhesive resin ("Admer VF500" manufactured by Mitsui Chemicals, Inc.) was used as a sealant layer.

Using the resins and resin composition described above, coextrusion was carried out under the conditions shown below to yield a multilayer film having a layer constitution, thermoplastic polyurethane elastomer (50 μm)/barrier material (10 μm)/sealant material (30 μm).

The polymerization conditions are as follows.
Layer constitution:
Thermoplastic polyurethane elastomer/barrier material/sealant layer (thickness 50/10/30 in μm)
Extrusion temperature of thermoplastic polyurethane elastomer:
C1/C2/C3=195/200/200° C.
Extrusion temperature of barrier material:
C1/C2/C3=175/210/210° C.
Extrusion temperature of sealant material:
C1/C2/C3=150/200/210° C.
Temperature of die: 210° C.
Specifications of extruder for each resin and T-die:
Thermoplastic polyurethane elastomer:
20φ extruder for laboratory use, ME type CO-EXT (manufactured by Toyo Seiki Seisaku-Sho, Ltd.)
Barrier material:
25φ extruder, model P25-18AC (manufactured by Osaka Seiki Co., Ltd.)
Sealant material:
32φ extruder, model GT-32-A (manufactured by Research Laboratory Of Plastics Technology Co., Ltd.)
T-die:
for 300 mm wide three-kind three-layer extrusion (manufactured by Research Laboratory Of Plastics Technology Co., Ltd.)
Temperature of cooling roll: 50° C.
Drawing speed: 4 m/min The multilayer film prepared above was moisture conditioned at 20° C. and 65% RH for 5 days. For the above-mentioned two moisture-conditioned samples, oxygen transmission rates were measured using an apparatus, MOCON OX-TRAN 2/20, manufactured by Modern Control, Inc. according to JIS K7126 (Equal Pressure Method) under a 20° C.-65% RH condition and the average thereof was calculated. The oxygen transmission rate of the multilayer film of this Example was 4.5 cc/m²·day·atm.

Figure 9:
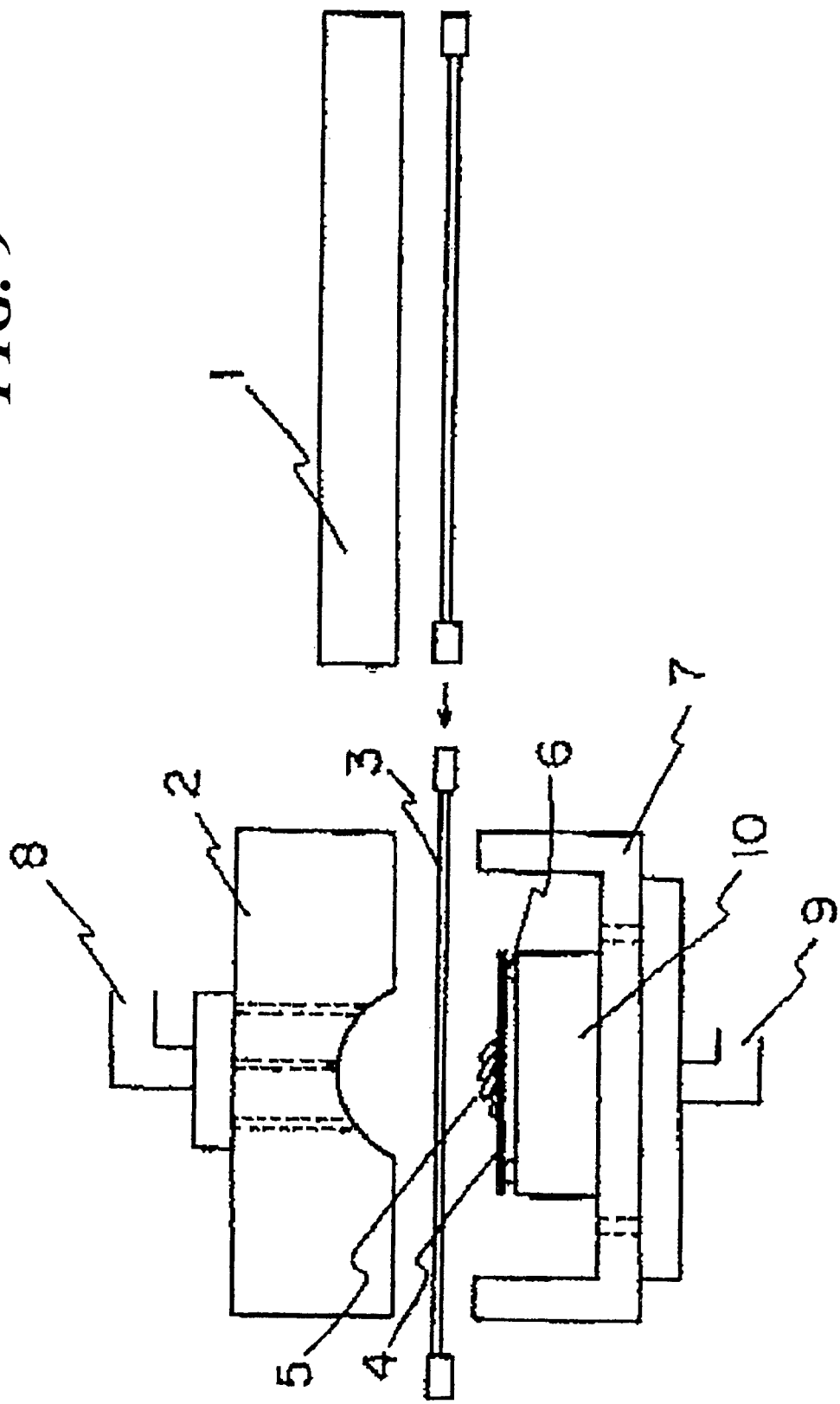
FIG. 9 is a diagram showing the outline of the manufacturing process of a skin packaging material.
Figure 10:
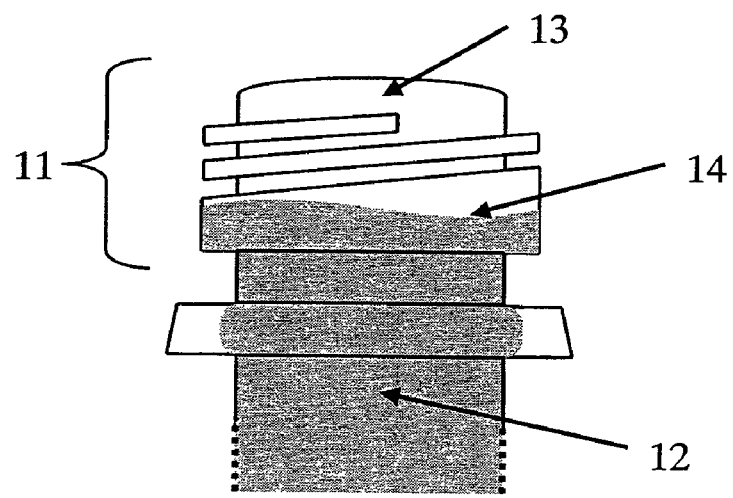
FIG. 10 is a schematic view showing part of a bottomed parison having a good leading edge.
Figure 11:
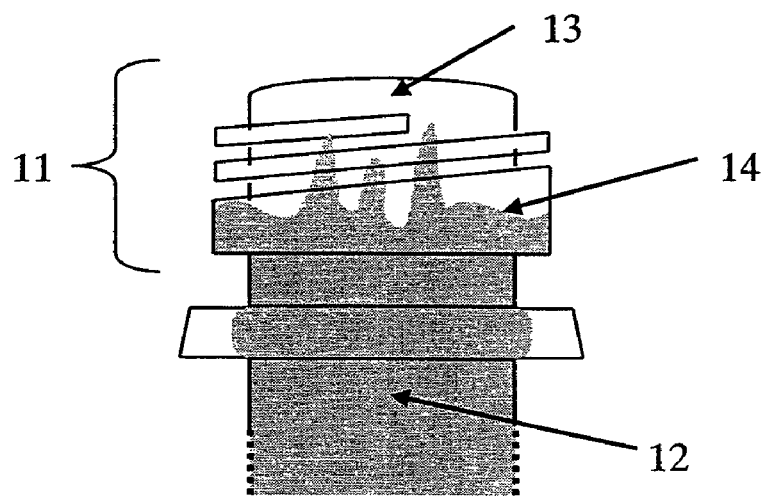
FIG. 11 is a schematic view showing part of a bottomed parison having a bad leading edge.

Then, using the multilayer film, the skin packaging aptitude was evaluated. On a two-layer film, as a lid material 4, which comprised a 100-μm thick polyethylene terephthalate film ("Lumirror #100" manufactured by Toray Industries, Inc.) and a 40-μm thick ethylene-vinyl acetate copolymer film ("Lamilon SR-L10" manufactured by Sekisui Film Nishinippon Co., Ltd.) laminated together by dry lamination, a content (sliced ham) 5 was placed while the ethylene-vinyl acetate copolymer layer was faced with the sliced ham. Then, the film for evaluation was subjected to skin packaging using a skin packaging test machine (a vacuum-pressure deep drawing molding machine, model FX-0431-3, manufactured by Asano Laboratories Co., Ltd.) (see FIG. 9).

The film was preheated with a preheater 1 set at 100° C. Then the aforementioned multilayer film 3 was vacuum formed by means of an upper mold 2 (temperature controlling device) kept at 90° C. Subsequently, the upper mold 2 and a lower mold 7 were mated together and then the inside of the molds was brought into vacuum by degassing through vacuuming tubes 8 and 9. After the inside of the molds reached vacuum, a heat sealer 6 mounted on a heat sealer base 10 was actuated to heat seal in circular shape around the sliced ham. Then the inside of the mold was brought back to the atmospheric pressure, yielding a skin package in which the film for evaluation was shaped in tight contact with the surface of the content, sliced ham.

For the formed skin package, the appearance of the package was evaluated with respect to two points, followability to the shape of the content (degree of deformation of the content) and a state of the wrinkle formed. As a result, in the skin package comprising the multilayer film of the present invention, there was almost no change in the shape of the content and the film followed the shape of the content well. In addition, no wrinkles were formed and, therefore, good contactibility was shown.

Example 17

The modified EVOH (C) prepared in Example 1 was used as a barrier material, "Eveflex EV-340" manufactured by Du Pont-Mitsui Polychemicals Co., Ltd. was used as an EVA resin, and "Admer VF-600" manufactured by Mitsui Chemicals, Inc. was used as an adhesive resin. Using the above-mentioned resins, a multilayer sheet having a layer constitution, EVA resin/adhesive resin/barrier material/adhesive resin/EVA resin (=300/50/50/50/300 μm), was produced under the following conditions by use of a three-kind five-layer coextrusion machine.

The polymerization conditions are as follows.
Layer constitution:
EVA resin/adhesive resin/barrier material/adhesive resin/ EVA resin
(thickness 300/50/50/50/300 in μm)
Extrusion temperature of each resin:
C1/C2/C3/die=170/170/220/220° C.
Specifications of extruder for each resin and T-die:
EVA resin:
32φ extruder, model GT-32-A (manufactured by Research Laboratory Of Plastics Technology Co., Ltd.)
Adhesive resin:
25φ extruder, model P25-18AC (manufactured by Osaka Seiki Co., Ltd.)
Barrier material:
20φ extruder for laboratory use, ME type CO-EXT (manufactured by Toyo Seiki Seisaku-Sho, Ltd.)
T-die:
for 300 mm wide 3-kind 5-layer extrusion (manufactured by Research Laboratory Of Plastics Technology Co., Ltd.)
Temperature of cooling roll: 50° C.
Drawing speed: 4 m/min The multilayer sheet prepared above was put in a pantograph type biaxial stretching machine manufactured by Toyo Seiki Seisaku-Sho, Ltd. and was subjected to simultaneous biaxial stretching at a draw ratio of 3×3 at 70° C. The multilayer sheet mentioned above showed good stretchability. After the drawing, the multilayer drawn film had few cracks, little unevenness and little local thickness deviation and, therefore, had a good appearance (transparency, gels and pimples).

The multilayer film prepared above was moisture conditioned at 20° C.-100% RH for 5 days. For the above-mentioned two moisture-conditioned samples, oxygen transmission rates were measured using an apparatus, MOCON OX-TRAN 2/20, manufactured by Modern Control, Inc. according to JIS K7126 (Equal Pressure Method) under a 20° C.-100% RH condition and the average thereof was calculated. The oxygen transmission rate of the multilayer drawn film of this Example was 6.8 cc/m$^2$·day·atm and a good gas barrier property was shown.

Moreover, the heat shrinkability obtained when the multilayer drawn film prepared above is used as a heat shrinkable film was evaluated according the method described below. Specifically, the above multilayer drawn film was immersed in hot water at 90° C. for one minute, and the area shrinkage percentage was determined. The multilayer drawn film of this Example had an area shrinkage percentage of 58% and, therefore, showed a good heat shrinkability.

Example 18

A thermoplastic polyester resin was produced according to the method mentioned below.

A slurry comprising 100,000 parts by weight of terephthalic acid and 44,830 parts by weight of ethylene glycol was prepared and 0.010 part by weight of germanium dioxide, 0.010 part by weight of phosphorous acid and 0.010 part by weight of tetraethylammonium hydroxide were added thereto. The resulting slurry was heated under pressure (absolute pressure of 2.5 kg/cm$^2$) at 250° C. for esterification to a degree of esterification up to 95%, thereby giving an oligomer. The resulting oligomer was subjected to melt polycondensation under a reduced pressure of 1 mmHg at a temperature of 270° C. to obtain a polyester having an intrinsic viscosity of 0.50 dl/g. The resulting polyester was extruded through a nozzle into a strand, cooled with water, and pelletized into columnar pellets (diameter: about 2.5 mm, length: about 2.5 mm). The resulting pellets were pre-dried at 160° C. for 5 hours and crystallized. Thus was obtained a polyester prepolymer.

The structural unit contents of the resulting polyester prepolymer were measured by NMR. The terephthalic acid unit content, the ethylene glycol unit content and the content of diethylene glycol unit by-produced in the polyester were 50.0 mol %, 48.9 mol % and 1.1 mol %, respectively. The terminal carboxyl group content and the melting point of the polyester were measured according to the methods mentioned hereinabove to be 38 microequivalents/g and 253° C., respectively. The resulting pellets were pre-dried at 160° C. for 5 hours and crystallized. Thus was obtained a crystallized polyester prepolymer.

The crystallized polyester prepolymer was subjected to solid-phase polymerization in a rolling-type, vacuum, solid-phase polymerization device, under a reduced pressure of 0.1 mmHg at 220° C. for 10 hours, into a polyester resin having an increased molecular weight.

The characteristic values of the thermoplastic polyester resin obtained were measured according to the methods mentioned below.

(1) Structural Unit Contents in Polyester:

The content of each structural unit in a polyester was determined from a $^1$H-NMR (nuclear magnetic resonance) spectrum (measured by "JNM-GX-500" manufactured by JEOL Ltd.) of the polyester using deuterated trifluoroacetic acid as a solvent.

(2) Intrinsic Viscosity of Polyester:

A sample was taken out of the polyester layer of the body part of a multilayer container, and its intrinsic viscosity was measured in an equiweight mixed solvent of phenol and tetrachloroethane, at 30° C. using an Ubbelohde's viscometer (model "HRK-3" manufactured by Hayashi Seisakusho Co. Ltd.).

(3) Glass Transition Temperature and Melting Point of Polyester:

A sample is taken out of the polyester layer of the body part of a multilayer container, and its glass transition temperature and melting point were measured by differential scanning colorimetry (DSC) according to JIS K7121 using a differential scanning colorimeter (DSC) of model RDC220/SSC5200H manufactured by Seiko Instruments & Electronics Ltd. Precisely, in the device, the sample was kept at 280° C. for 5 minutes, then cooled to 30° C. at a cooling rate of 100° C./min, kept at the temperature for 5 minutes, and then heated at a heating rate of 10° C./min. For temperature calibration, used are indium and lead. The glass transition temperature as referred to herein indicates the midway glass transition temperature (Tmg) according to JIS K7121, and the melting point also referred to herein indicates the peak point in melting (Tpm) according to the same.

The contents of terephthalic acid unit, ethylene glycol unit and diethylene glycol unit in the thermoplastic polyester resin obtained were 50.0 mol %, 48.9 mol % and 1.1 mol %, respectively. The intrinsic viscosity, the melting point and the glass transition temperature were 0.83 dl/g, 252° C. and 80° C., respectively.

Using the modified EVOH (C) prepared in Example 1 and the thermoplastic polyester (PES) prepared by the method described above, obtained was a two-kind three-layer parison of PES/modified EVOH (C)/PES, through coinjection molding using a coinjection stretch blow molding machine (model SL160, four cavities) manufactured by KORTEC/HUSKY. Concretely, the temperature of the PES injection zone was 280° C.; the temperature of the modified EVOH (C) injection zone was 210° C.; the temperature of the hot runner block in which the PES and the modified EVOH (C) were combined was 270° C.; the temperature of the injection mold core was 10° C.; and the temperature of the injection mold cavity was 10° C.

When the parison was observed visually, no streaks were found and, therefore, the leading edge of the modified EVOH (C) layer in the opening of the parison was in a good condition.

Thereafter, stretch blow molding was carried out by heating the parison to 105° C. at a surface temperature using a stretch blow molding machine (model LB01, one 530-mL cavity) manufactured by Crupp Corpoplast Maschinenbau, to give a two-kind three-layer type multilayer injection blow molded container. When the blow molded container was observed visually, neither streaks, bubbles nor gels were found and, therefore, the container had a good appearance. Using the multilayer blow molded container obtained, the incidence of delamination in the container, the haze of the container body and the oxygen transmission rate of the container were measured by the methods shown below.

(1) Incidence of Delamination in Multilayer Container:

100 molded bottles each are filled with water as a content and hermetically sealed with a stopper under normal pressure. Each bottle with its body being kept horizontally was spontaneously dropped from a height of 60 cm onto a triangular stand having a length of 20 cm and having an angle of 90° at its chip that faces the dropping bottle. The dropping test was effected only once, in which the chip of the stand is targeted to the center of the body of the bottle. From the number of the bottles in which delamination occurred, the incidence of delamination was calculated according to the following equation:

Incidence of delamination=[(number of bottles in which delamination occurred)/100]×100(%)

(2) Haze of Multilayer Container:

The body of a bottle obtained was divided into four equal portions around the circumference at its center, and the internal haze of each of those four portions was measured with a Poic integrating-sphere light transmittance/complete light reflectance meter (HR-100 Model from Murakami Color Technology Laboratories) according to ASTM D1003-61. The data were averaged and the resulting mean value indicated the haze of the bottle.

(3) Oxygen Transmission Rate of Multilayer Container:

A bottle obtained was conditioned at 20° C. and 65% RH, and the oxygen transmission rate per one bottle (cc/container·day·atm) was measured using an oxygen transmission rate meter (OX-TRAN-10/50A manufactured by Modern Control, Inc.).

The above-mentioned evaluation results are summarized in Table 3. In addition, when the appearance of a container produced by stretch blow molding this parison was observed, neither streaks, bubbles nor gels were found and, therefore, the container had a good appearance.

Example 19

Evaluation was carried out in the same manner as Example 18 except using the modified EVOH (C) prepared in Example 2 as a modified EVOH (C). The results are shown in Table 3.

Example 20

Evaluation was carried out in the same manner as Example 18 except using the modified EVOH (C) prepared in Example 3 as a modified EVOH (C). The results are shown in Table 3.

Example 21

Evaluation was carried out in the same manner as Example 18 except using the modified EVOH (C) prepared in Example 4 as a modified EVOH (C). The results are shown in Table 3.

Example 22

Evaluation was carried out in the same manner as Example 18 except using the modified EVOH (C) prepared in Example 5 as a modified EVOH (C). The results are shown in Table 3.

Comparative Example 5

Evaluations of moldability of a parison, incidence of delamination of a container, haze of a container body and oxygen transmission rate of a container were carried out in the same manner as Example 18 except using an unmodified EVOH having an ethylene content of 32 mol %, a degree of saponification of 99.6%, an intrinsic viscosity of 0.0959 L/g and an MFR of 4.5 g/10 min (at 190° C. and under a load of 2160 g) in place of the modified EVOH (C). The results are shown in Table 3. The contents of phosphate radical, Na ion and Mg ion in the EVOH were measured to be 120 ppm, 110 ppm and 55 ppm, respectively.

Comparative Example 6

An evaluation was carried out in the same manner as Example 1 except using an unmodified EVOH having an ethylene content of 44 mol %, a degree of saponification of 99.6%, an intrinsic viscosity of 0.0948 L/g and an MFR of 5.5 g/10 min (at 190° C. and under a load of 2160 g) in place of the modified EVOH (C). The results are shown in Table 3. The contents of phosphate radical, Na ion and Mg ion in the EVOH composition were measured to be 35 ppm, 105 ppm and 5 ppm, respectively.

Comparative Example 7

An evaluation was carried out in the same manner as Example 18 except using an EVOH composition obtained by dry blending 100 parts by weight of an unmodified EVOH having an ethylene content of 32 mol %, a degree of saponification of 99.8% and an MFR of 1.2 g/10 min (at 190° C. and under a load of 2160 g) and 100 parts by weight of an EVOH having an ethylene content of 32 mol %, a degree of saponification of 97.0% and an MFR of 1.2 g/10 min (at 190° C. and under a load of 2160 g), followed by pelletizing the resulting blend through a 20 mmϕ twin screw extruder at 200° C., and then drying the resulting pellets under reduced pressure at 80° C. for 16 hours in place of the modified EVOH (C). The results are shown in Table 3. The contents of phosphate radical, Na ion and Mg ion in the EVOH composition were measured to be 90 ppm, 75 ppm and 45 ppm, respectively.

Comparative Example 8

An evaluation was carried out in the same manner as Example 18 except using an EVOH composition obtained by dry blending 70 parts by weight of an unmodified EVOH having an ethylene content of 32 mol %, a degree of saponification of 99.7% and an MFR of 4.0 g/10 min (at 190° C. and under a load of 2160 g), 30 parts by weight of an EVOH having an ethylene content of 44 mol %, a degree of saponification of 96.5% and an MFR of 5.1 g/10 min (at 190° C. and under a load of 2160 g) and 0.016 part by weight of a hydrotalcite compound ("DHT-4A" manufactured by Kyowa Chemical Industry Co., Ltd.), followed by pelletizing the resulting blend through a 20 mmϕ twin screw extruder at 200° C. and then drying the resulting pellets under reduced pressure at 80° C. for 16 hours in place of the modified EVOH (C). The results are shown in Table 3. The contents of phosphate radical, Na ion and Mg ion in the EVOH composition were measured to be 90 ppm, 50 ppm and 20 ppm, respectively.

TABLE 3

| | | EVOH forming the middle layer | | | | | |
|---|---|---|---|---|---|---|---|
| | Epoxy compound (B) | Structural unit (I) content (mol %) | Ethylene content (mol %) | Moldability of parison *1 | Incidence of delamination (%) | Haze (%) | Oxygen transmission rate *2 |
| Example 18 | 1,2-Epoxy butane | 4.8 | 32 | ○ | 5 | 2.7 | 0.019 |
| Example 19 | 1,2-Epoxy butane | 3 | 32 | ○ | 4 | 2.5 | 0.017 |
| Example 20 | Epoxy propane | 5 | 32 | ○ | 4 | 2.2 | 0.018 |
| Example 21 | Glycidol | 5 | 32 | ○ | 0 | 2.8 | 0.022 |
| Example 22 | Glycidol | 6 | 44 | ○ | 0 | 3.1 | 0.029 |

TABLE 3-continued

| | | EVOH forming the middle layer | | | | | |
|---|---|---|---|---|---|---|---|
| | Epoxy compound (B) | Structural unit (I) content (mol %) | Ethylene content (mol %) | Moldability of parison *1) | Incidence of delamination (%) | Haze (%) | Oxygen transmission rate *2) |
| Comparative Example 5 | Unmodified EVOH | | 32 | x | 95 | 2.5 | 0.011 |
| Comparative Example 6 | Unmodified EVOH | | 44 | x | 85 | 2.9 | 0.019 |
| Comparative Example 7 | Blend of EVOH of a low degree of saponification | | 32*3) | ○ | 10 | 2.7 | 0.030 |
| Comparative Example 8 | Blend of hydrotalcite and EVOH of a low degree of saponification | | 36*3) | ○ | 12 | 4.0 | 0.035 |

*1) ○: A parison after molding had a leading edge of good conditions. x: A parison after molding had a leading edge of bad conditions.
*2) Unit: cc/container · day · atm
*3) Average of ethylene contents of two kinds of EVOHs As shown in Examples 18-22, the coinjection stretch blow molded containers using a modified EVOH (C) of the present invention are superior in moldability of a parison, delamination resistance, transparency and oxygen gas barrier property. In contrast to this, Comparative Examples 5 and 6, in which an unmodified EVOH was used, the moldability of a parison and delamination resistance are very poor. In addition, in Comparison Example 7 where an EVOH of a low degree of saponification was incorporated, the incidence of delamination and the oxygen transmission rate increase. Furthermore, in Comparison Example 8 where an EVOH of a low degree of saponification and hydrotalcite were incorporated, the incidence of delamination, the haze and the oxygen transmission rate increase.

In other words, the coinjection stretch blow molded container of the present invention can prevent delamination caused by impact without having an adhesive resin layer and it is superior in transparency and gas barrier properties. The containers are suitable for preserving various materials therein in good condition for a long period of time, and are especially useful as those for various beverages such as carbonated beverages, beer, wine and others, and also for various edibles or cosmetics.

INDUSTRIAL APPLICABILITY

The modified EVOH (C) of the present invention is superior in barrier properties, transparency, stretchability, flexibility and flexing resistance. Therefore, it is suitably used as a barrier material and can be used for various applications. Examples of preferable embodiments include compositions, films, sheets, pipes, hoses, extrusion molded articles, extrusion blow molded articles, profile molded articles, thermoformed articles, multilayer structures, coextruded films, coextruded sheets, multilayer pipes, multilayer hoses, coextrusion blow molded containers, coinjection blow molded containers, drawn films, heat shrinkable films, wallpaper, decoration boards, flexible packaging materials, fuel pipes, pipes for warm water circulation and fuel hoses.

The invention claimed is:

1. A method for producing a modified ethylene-vinyl alcohol copolymer (C) comprising reacting an ethylene-vinyl alcohol copolymer (A) with a monofunctional epoxy compound (B) having a molecular weight of not more than 500,
wherein the reaction between the ethylene-vinyl alcohol copolymer (A) and the monofunctional epoxy compound (B) is carried out in an extruder, and
wherein the ethylene-vinyl alcohol copolymer (A) and the monofunctional epoxy compound (B) are melt kneaded in the extruder in the presence of a catalyst (D) comprising an ion of a metal which belongs to Groups 3-12 of the periodic table, wherein the catalyst (D) comprises a sulfonic acid ion.

2. A method for producing a modified ethylene-vinyl alcohol copolymer (C) comprising reacting an ethylene-vinyl alcohol copolymer (A) with a monofunctional epoxy compound (B) having a molecular weight of not more than 500,
wherein the reaction between the ethylene-vinyl alcohol copolymer (A) and the monofunctional epoxy compound (B) is carried out in an extruder,
wherein the ethylene-vinyl alcohol copolymer (A) and the monofunctional epoxy compound (B) are melt kneaded in the extruder in the presence of a catalyst (D) comprising an ion of a metal which belongs to Groups 3-12 of the periodic table, and
wherein the ethylene-vinyl alcohol copolymer (A) and the monofunctional epoxy compound (B) are melt kneaded in the presence of the catalyst (D) and, following an addition of a catalyst deactivator (E), the melt kneading is further carried out.

3. The method for producing a modified ethylene-vinyl alcohol copolymer (C) according to claim 2, wherein the catalyst deactivator (E) is a chelating agent.

4. The method for producing a modified ethylene-vinyl alcohol copolymer (C) according to claim 2, wherein a ratio (E/D) of the molar number of the catalyst deactivator (E) to the molar number of the metal ion contained in the catalyst (D) is 0.2-10.

5. The method for producing a modified ethylene-vinyl alcohol copolymer (C) according to claim 2, wherein the ethylene-vinyl alcohol copolymer (A) and the monofunctional epoxy compound (B) are melt kneaded in the presence of the catalyst (D) and, following a removal of an unreacted monofunctional epoxy compound (B), the catalyst deactivator (E) is added.

6. A method for producing a modified ethylene-vinyl alcohol copolymer (C) comprising reacting an ethylene-vinyl alcohol copolymer (A) with a monofunctional epoxy compound (B) having a molecular weight of not more than 500,
wherein the reaction between the ethylene-vinyl alcohol copolymer (A) and the monofunctional epoxy compound (B) is carried out in an extruder, and
wherein the ethylene-vinyl alcohol copolymer (A) and the monofunctional epoxy compound (B) are melt kneaded in the extruder in the presence of a catalyst (D) comprising an ion of a metal which belongs to Groups 3-12 of the periodic table, and wherein the modified ethylene-vinyl alcohol copolymer (C) is a modified ethylene-vinyl alcohol copolymer having an ethylene content of 5-55 mol % and comprising 0.3-40 mol % of the following structural unit (I):

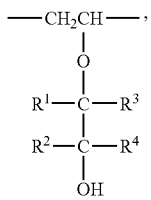

wherein $R^1$, $R^2$, $R^3$ and $R^4$ denote a hydrogen atom, an aliphatic hydrocarbon group having 1-10 carbon atoms, an alicyclic hydrocarbon group having 3-10 carbon atoms or an aromatic hydrocarbon group having 6-10 carbon atoms; $R^1$, $R^2$, $R^3$ and $R^4$ may be the same group or different; $R^3$ and $R^4$ may be combined together; and $R^1$, $R^2$, $R^3$ and $R^4$ may have a hydroxyl group, a carboxyl group or a halogen atom.

7. The method for producing a modified ethylene-vinyl alcohol copolymer (C) according to claim 6, wherein both $R^1$ and $R^2$ are hydrogen atoms.

8. The method for producing a modified ethylene-vinyl alcohol copolymer (C) according to claim 6, wherein one of said $R^3$ and $R^4$ is an aliphatic hydrocarbon group having 1-10 carbon atoms and the other is a hydrogen atom.

9. The method for producing a modified ethylene-vinyl alcohol copolymer (C) according to claim 6, wherein one of said $R^3$ and $R^4$ is a substituent represented by $(CH_2)_i OH$, wherein i is an integer of 1-8, and the other is a hydrogen atom.

10. The method for producing a modified ethylene-vinyl alcohol copolymer (C) according to claim 1, wherein the content of alkali metal ion is 1 to 50 times, in molar ratio, the content of the sulfonic acid ion.

11. The method for producing a modified ethylene-vinyl alcohol copolymer (C) according to claim 2, comprising reacting 100 parts by weight of the ethylene-vinyl alcohol copolymer (A) with 1-50 parts by weight of the monofunctional epoxy compound (B).

12. The method for producing a modified ethylene-vinyl alcohol copolymer (C) according to claim 2, wherein the ethylene-vinyl alcohol copolymer (A) has an ethylene content of 5-55 mol % and a degree of saponification of not less than 90%.

13. The method for producing a modified ethylene-vinyl alcohol copolymer (C) according to claim 2, wherein the ethylene-vinyl alcohol copolymer (A) has an alkali metal salt content of not more than 50 ppm in terms of the metal.

14. The method for producing a modified ethylene-vinyl alcohol copolymer (C) according to claim 2, wherein the ethylene-vinyl alcohol copolymer (A) has an alkaline earth metal salt content of not more than 20 ppm in terms of the metal.

15. The method for producing a modified ethylene-vinyl alcohol copolymer (C) according to claim 2, wherein the monofunctional epoxy compound (B) is an epoxy compound having 2-8 carbon atoms.

16. The method for producing a modified ethylene-vinyl alcohol copolymer (C) according to claim 2, wherein the monofunctional epoxy compound (B) is added to the ethylene-vinyl alcohol copolymer (A) in a molten state in the extruder.

17. The method for producing a modified ethylene-vinyl alcohol copolymer (C) according to claim 2, wherein the catalyst (D) comprises a zinc ion.

18. The method for producing a modified ethylene-vinyl alcohol copolymer (C) according to claim 2, wherein 0.1-20 μmol/g of the catalyst (D), in terms of the molar number of the metal ion based on the weight of the ethylene-vinyl alcohol copolymer (A), is present.

19. The method for producing a modified ethylene-vinyl alcohol copolymer (C) according to claim 2, wherein a mixture of the monofunctional epoxy compound (B) and the catalyst (D) is added to the ethylene-vinyl alcohol copolymer (A) in a molten state.

20. The method for producing a modified ethylene-vinyl alcohol copolymer (C) according to claim 6, wherein the copolymer (C) has an oxygen transmission rate at 20° C. and 65% RH of not more than 100 cc·20 μm/m²·day·atm.

21. The method for producing a modified ethylene-vinyl alcohol copolymer (C) according to claim 6, wherein the copolymer (C) has a carbon dioxide gas transmission rate at 20° C. and 65% RH of not more than 500 cc·20 μm/m²·day·atm.

22. The method for producing a modified ethylene-vinyl alcohol copolymer (C) according to claim 6, wherein the copolymer (C) has a Young's modulus in a tensile strength/elongation measurement at 23° C. and 50% RH of not more than 140 kgf/mm².

23. The method for producing a modified ethylene-vinyl alcohol copolymer (C) according to claim 6, wherein the copolymer (C) has, in a tensile strength/elongation measurement at 23° C. and 50% RH, a tensile strength at yield of 0.5-7 kgf/mm² and a tensile elongation at break of not less than 150%.

* * * * *